United States Patent
Ranel et al.

(10) Patent No.: US 11,789,516 B2
(45) Date of Patent: Oct. 17, 2023

(54) DEVICE, METHOD AND SYSTEM FOR TRANSPARENTLY CHANGING A FREQUENCY OF AN INTERCONNECT FABRIC

(71) Applicant: Intel Corporation, Santa Clara, CA (US)

(72) Inventors: Chen Ranel, Shoham (IL); Christopher J. Lake, Folsom, CA (US); Hem Doshi, Folsom, CA (US); Ido Melamed, Kfar-Saba (IL); Vijay Degalahal, Bangalore (IN); Yevgeni Sabin, Haifa (IL); Reena Patel, El Dorado Hills, CA (US); Yoav Ben-Raphael, Haifa (IL); Nimrod Angel, Haifa (IL); Efraim Rotem, Haifa (IL); Shaun Conrad, El Dorado Hills, CA (US); Tomer Ziv, Rishon Lezion (IL); Nir Rosenzweig, Givat Ella (IL); Esfir Natanzon, Haifa (IL); Yoni Aizik, Haifa (IL); Arik Gihon, Rishon le Zion (IL); Natanel Abitan, Beit Yitzhak (IL)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 17/440,688

(22) PCT Filed: May 22, 2020

(86) PCT No.: PCT/US2020/034346
§ 371 (c)(1),
(2) Date: Sep. 17, 2021

(87) PCT Pub. No.: WO2020/242991
PCT Pub. Date: Dec. 3, 2020

(65) Prior Publication Data
US 2022/0179473 A1 Jun. 9, 2022

Related U.S. Application Data

(60) Provisional application No. 62/852,948, filed on May 24, 2019.

(51) Int. Cl.
*G06F 1/00* (2006.01)
*G06F 1/324* (2019.01)

(52) U.S. Cl.
CPC .................................. *G06F 1/324* (2013.01)

(58) Field of Classification Search
CPC ... G06F 1/324; G06F 1/08; G06F 1/10; G06F 1/3206; G06F 1/3296; G06F 1/206; Y02D 10/00
See application file for complete search history.

(56) References Cited

U.S. PATENT DOCUMENTS 6,292,038 B1   9/2001  Stachura et al.
6,777,993 B1 *  8/2004  Bain ........................ H03K 5/13
                                                                  327/248

(Continued)

FOREIGN PATENT DOCUMENTS

KR       20030058249         7/2003

OTHER PUBLICATIONS

International Preliminary Report on Patentability from PCT/US2020/034346 dated Dec. 2, 2021, 7 pgs.

(Continued)

*Primary Examiner* — Xuxing Chen
(74) *Attorney, Agent, or Firm* — NICHOLSON DE VOS WEBSTER & ELLIOTT LLP

(57) ABSTRACT

Techniques and mechanisms for transparently transitioning an interconnect fabric between a first frequency and a second frequency. In an embodiment, the fabric is coupled to an end point device via an asynchronous device. One or more nodes of the fabric operate in a first clock domain based on a clock signal, while the end point device operates in a different clock domain. Controller circuitry changes a frequency of the clock signal by stalling the clock signal throughout a first period of time which is greater than a duration of three cycles of a lower one of the first frequency or the second frequency. After the first period of time, cycling of the clock signal is provided at the second frequency. In another embodiment, the asynchronous device enables the frequency change without preventing communication with the end point device.

20 Claims, 21 Drawing Sheets

(56) References Cited

U.S. PATENT DOCUMENTS

| | | | |
|---|---|---|---|
| 7,349,629 B1 | 3/2008 | Soderberg et al. | |
| 11,431,328 B1* | 8/2022 | Wong | H03K 5/00006 |
| 2002/0184546 A1 | 12/2002 | Sherburne, Jr. | |
| 2005/0213699 A1* | 9/2005 | Boerstler | H03K 23/667 |
| | | | 377/47 |
| 2006/0187226 A1 | 8/2006 | Bruno et al. | |
| 2011/0133793 A1 | 6/2011 | Wheelock et al. | |
| 2015/0180484 A1 | 6/2015 | Portmann et al. | |
| 2017/0250695 A1 | 8/2017 | Lee et al. | |
| 2018/0017988 A1 | 1/2018 | Kommrusch et al. | |

OTHER PUBLICATIONS

International Search Report and Written Opinion from PCT/US2020/034346 dated Sep. 3, 2020, 10 pgs.
European Search Report and Search Opinion, EP App. No. 20814321.4, dated May 30, 2023, 7 pages.

* cited by examiner

1000

1010
Delivering power via a rail from a voltage regulator to respective circuits of a first IC chip and a second IC chip, wherein a first power management (PM) circuit of the first IC chip is communicatively coupled to a second PM circuit of the second IC chip

1012
Sending, from the first PM circuit to the second PM circuit, a first message indicating a first transition between modes of power consumption by the first IC chip

1014
Sending a second message, based on the first message, from the second PM circuit to an agent which is one of the voltage regulator or a third PM circuit of a third IC chip, wherein the second message requests a second transition of a mode of power consumption or power delivery by the agent, wherein one of the first transition or the second transition is based on the other of the first transition or the second transition

FIG. 10
DEVICE, METHOD AND SYSTEM FOR TRANSPARENTLY CHANGING A FREQUENCY OF AN INTERCONNECT FABRIC

CLAIM OF PRIORITY

This Application is a National Stage Entry of, and claims priority to, PCT Patent Application No. PCT/US2020/034346, filed on May 22, 2020 and titled "DEVICE, METHOD AND SYSTEM FOR TRANSPARENTLY CHANGING A FREQUENCY OF AN INTERCONNECT FABRIC," which claims the benefit of priority to U.S. Provisional Patent Application No. 62/852,948, filed May 24, 2019 and titled "Apparatus and Method to allow parallel platform and processor wakeup from deep sleep; to optimize battery life in a processor; to prevent processor wakeup in a log sleep duration due to temperature changes, for accurate measurement and reporting of sleep state exit latency, for maximal current for integrated regulator using dynamic voltage control; and for seamless I/O devices interconnect fabric frequency transition," which is herein incorporated by reference in its entirety.

BACKGROUND

1. Technical Field

This disclosure generally relates to integrated circuits and more particularly, but not exclusively, to managing a delivery or consumption of power with a processor.

2. Background Art

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated.

Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc., become even more prevalent (from inclusion in the typical computer, automobiles, and televisions to biotechnology).

BRIEF DESCRIPTION OF THE DRAWINGS

The various embodiments of the present invention are illustrated by way of example, and not by way of limitation, in the figures of the accompanying drawings and in which:

FIG. 10 illustrates a flow diagram showing features of a method to determine a utilization of power by multiple integrated circuit chips according to an embodiment.

DETAILED DESCRIPTION

Figure 1A:
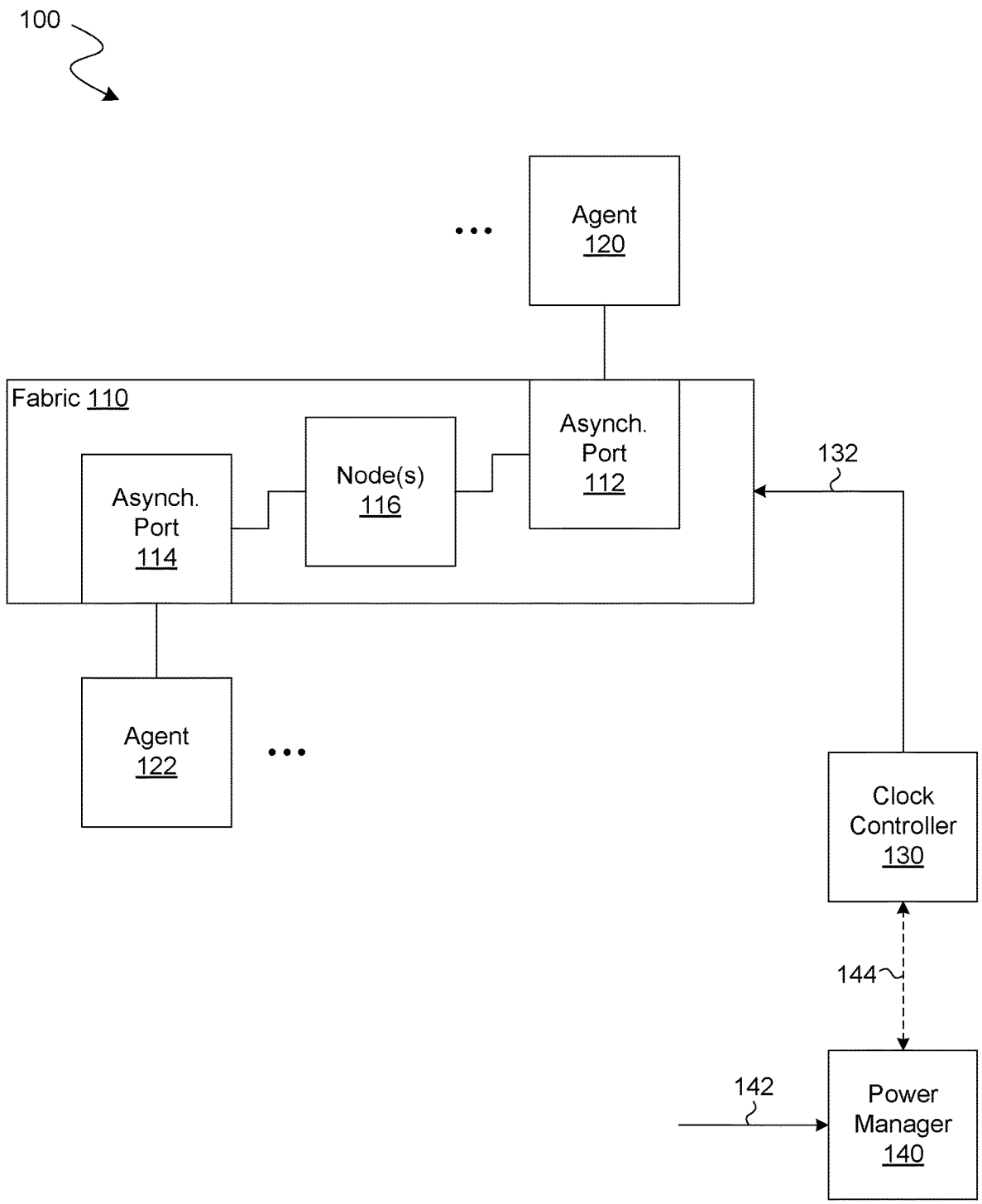
FIGS. 1A, 1B illustrate functional block diagrams each showing features of a respective device to regulate communication via an interconnect fabric according to a corresponding embodiment.

Fabric is interconnect hardware (HW) for connecting multiple blocks (e.g., logic circuit blocks) to a dedicated destination (e.g., access main memory). Fabric latency and bandwidth (BW) characterization determine influence on the performance and Quality-of-service (QoS) of the system. Fabric operating frequency is a meant for the fabric BW capabilities. A tradeoff between supplying the required BW vs. the consumed power requires a dynamic change in frequency operating point. Fabric frequency transition effects multiple agents using the fabric for their normal operation. A seamless transition is required to allow frequency transition while allowing non interruptible execution for the connected agents. A non-negotiable transition is required to allow BW satisfaction at any condition. A responsive switch is required to allow immediate transition to peak BW. Past generations fabric frequency transition intrusively involved the fabric agents. As such, the fabric frequency transition forced the agents to stop using the fabric, draining all the outstanding traffic and included interaction with the central power management unit. Such fabric frequency transition is intrusive to activity of the system, results in lower performance and slow transition, and is complex as it involves multiple domains.

Some embodiments allows a fabric frequency change w/o interacting with the agents that are connected to the fabric. All the agents have an asynchronous clock crossing between an internal clock of the agent and a clock of the fabric. The clock change is glitch free controlled by a global agent while the fabric agents oblivious to the clock change. The embodiments allow for seamless frequency transition on a fabric that allows mitigating power vs. performance tradeoffs by implementing a fabric traffic band width tracer. As such, the frequency of the fabric is kept at the level required for supplying the agent traffic bandwidth.

External voltage regulator area and cost are sensitive to the maximal current it may support. Modern CPU performance is limited by power delivery cost and area by reducing the required currents, a CPU may increase its performance. One way to solve this issue is to use fixed input voltage for an integrated buck voltage regulator. Another way is to use dynamic input voltage control that ensures minimal functional voltage for the regulator to minimize stress on the regulators. These solutions, however, may not take advantage of the face that a buck regulator reduces its input current when the input voltage increases.

Some embodiments describe a hardware and/or software solution that changes the voltage determination policy by including a scheme that increases the input voltage to reduce the consumed current. This may be done in order to make sure the external regulator current is within the capability. Such implementation allows increased frequency with a same power delivery solution.

In order to save power, when a CPU is idle, the CPU is sent by the OS (operating system) to a sleep state (e.g., package C state). The depth of the sleep state is determined by the latency of the exit time, among other factors. The deeper the sleep state is, the more amount of power can be saved. The CPU needs to comply with the OS and devices' advertised latency tolerance. Therefore, it is desirable to be able to accurately measure the exit latency from a given sleep state. In addition, this latency can be reported back to the OS for the OS to be able to take informative decisions regarding the sleep state it chooses.

In some embodiments, each agent in the CPU that has a wake capability (e.g., Universal Serial Bus (USB) controller that can be woken up by a mouse move) logs on a local clock the time it received the wake indication. Upon a full wakeup, the CPU (or system-on-chip SoC) will query the agent to understand how much time has passed on the agent local clock since the wakeup request. This is added to the SoC wakeup time, and may be reported back to the OS.

By taking the actual latency instead of the worst case one, the apparatus and method of various embodiments are able to provide a tighter measurement of the sleep state latency, and therefore reduce the worst case exit latency. Reduced sleep state exit latency leads to more time spent in deeper sleep states, which leads to a reduced power and improved battery life.

Existing power delivery solution are often restricted by hard limits (that must not be exceeded). This may include maximum power due to battery capability limitation (e.g., PL4 in Intel architectures) or voltage regulator maximal current capability. Complying with these limits may require lowering a CPU performance (for example frequency reduction). In some cases, these limitations may restrict a single power domain which includes logic circuits that are controlled by different power management agents. For example, a rail which is shared across chip-lets. At runtime, each power management agent (PMA) may require, for the respective logic circuit it controls, a lesser amount than the overall potential may use. For example, an agent may potentially run at frequency $f_{actual} < f_{max}$. In this case, freeing up the unused "budget" and transferring it to circuit logic controlled by one PMA may increase the performance of the circuit logic controlled by another PMA.

Existing power delivery implementation may also include power features which are constrained by a maximal power or current capability. This may include switching to a lower power state or to an auxiliary rail. In case that the limitation spans across more than one PMA, there is a need to restrict all PMAs in a way that the sum of each PMA limit do not exceed the overall limit.

One way to solve the above problem is to use non-blocking maximum current or power interfaces. This may include notification for a future event (e.g., tracking of battery state of change and lowering of maximum power). Another way to solve the above problem is to use blocking interfaces with a single PMA. However, notification for a future event cannot support fast changing of the limitations, and is prone to issues due to timing assumptions of the flows. Further, blocking interfaces cannot span to topologies covering more than a single power management domain.

In some embodiments, maximal power or current transfer between two agents is achieved by a request and acknowledgement interface between two agents (or an acknowledgement without a corresponding request). The request signifies the requested or allocated maximum power/current budget (e.g., depending on which use case). The acknowledgement signifies that the receiver has fulfilled all the required action to comply with the new limitation (or to another value supplied by the acknowledgement). Once the acknowledgement is observed by the initiator, it knows that it can safely preform actions based on the new level of the receiving side. In some examples, the flow is blocking for a budget increase and may not be blocking for budget reduction.

Such mechanism allows hard limit breakdown between several components within a single SoC (like budget transfer between processor cores in a multi-core design), between chip-lets (like CPU and PCH). Also, this mechanism allows a PMA controlling a voltage regulator to initiate a flow that enters a deeper power state in a safe manner, without concerns that other consumers may require higher capabilities. Such mechanism may be also extended to a software/firmware or software/hardware to allow complicated platform enabling.

When the processor going to a deep sleep state, there are still some voltage rails that need to provide power supply that are required for the maintenance of the operation of the processor. The power delivery element that delivers the voltage and current to this rail is used to operate at its optimal working point to reduce the power even more. To maintain a working point, an estimation of the maximum (max) current being drawn by the processor from the power delivery element is desired. The more accurate this estimation is, the better the efficiency of the power delivery element is, and therefore—its power is lower.

Maximal drawn current is heavily dependent on the temperature of the processor. When the temperature is lower, leakage is reduced, hence power requirements are reduced. However, when processor goes into a deep sleep state, it does not track the temperature. Moreover, a processor (e.g., CPU) can go to sleep at a given temperature, and heat up from that point by e.g., taking it out of an air conditioned room and into a hot ambient temperature. One way to mitigate issues related to high temperature in sleep state is to consider a worst case temperature of a general processor specification to be 125 deg. C. at design time for sleep state to able to handle cases in which the processor heats up while it is at sleep state. Alternatively, the processor can wake up frequently (e.g., every few seconds) to make sure temperature is within the required limit. Worst case temperature based solution yields worst case current requirement, which usually places the power delivery element in a non-optimal conditions, hence increases power consumption from the power delivery element and the processor. Alternatively, if a processor is waking up frequently, each wakeup requires many resources to be up and running, including the power supply unit, and possible the platform fan. This solution results in both power consumption and acoustic noises. Therefore, to be able to accurately estimate current requirements, the temperature is desired to be monitored by an external agent, and power delivery element is desired to be adapt to the new operating (e.g., temperature) conditions.

Some embodiments define a manager (software or hardware) of the power delivery element that uses minimum set of resources, and a temperature measurement element that can generate a wake interrupt to the manager of the power delivery element. Power delivery manager program the thermal monitor element to some thresholds. When the thermal element crosses these thresholds, it wakes up the power delivery manager, which in turn changes the working conditions of the power delivery element. As such, the processor can be put to long periods of sleep without degrading power.

In a sleep state, voltage rails used by processor (e.g., CPU) components may be removed. For example, power supply to the rails is cut off. When a voltage rail is removed, the CPU is required to save the content that used to reside on the voltage rail, so it can be restored later on when the CPU wakes up. The content can be saved in an internal memory within the CPU, often SRAMs (static random access memory) that operate on a voltage rail that is not removed (e.g., is powered on). Alternatively, the content can be stored to an external memory (e.g., outside of the processor component) by the CPU, in sleep states in which the memory content remains valid across sleep states. Saving to local SRAM is quicker than storing to external memory, but the SRAMs consume power. Selecting a right destination for saving the content is a function of power dissipation of the SRAMs, energy required to write/load memory content, and how often the operation is being done.

One way to select the right destination for saving the content is to statically select (e.g., at boot time) whether to always write content to external memory, or to avoid writing to external memory and keep the contents in the local SRAM. However, such static selection is sub-optimal in terms of energy consumption, and results in reducing battery life.

In some embodiments, at pre-silicon time, power consumption of the internal SRAM array and energy for writing and restoring from an external DRAM is characterized. In some embodiments, a mechanism is implemented in the CPU to select whether to save content to the internal SRAM or the external DRAM based on the above parameters, and the expected wakeup time.

When a processor (e.g., a CPU) is not fully utilized, in order to save power, it is placed in a sleep state (e.g., package C state). In a deep sleep state, there can be some processor voltage rails that are turned off using a power gate that is placed on the platform mother board. To allow proper operation when the processor is woken up, the rail needs to be turned on. Opening a platform power gate consumes time. Time varies with the quality of the components, and it is OEM (original equipment manufacturer) tradeoff between cost and latency. The latency of the power gate impacts how fast the processor will wake-up from the sleep state. Low wake up latency is desired to make sure the processor can go in and out of the sleep states often, in order to reduce power. When platform power gates are used, processor may have to wait until the platform power gate is open to begin its wakeup process.

Some embodiments describe apparatus and method to wake up a processor from a sleep state together with opening the platform power gate. In some embodiments, the processor wait for the power gate to be fully open just immediately prior to using this voltage rail in the processor. The apparatus allows for parallel wakeup of the processor (e.g., CPU) and platform rail, it allows OEMs to place inexpensive power gates, which can have increased latency characteristics, since the wakeup latency will be in parallel to the CPU exit latency. This reduces BOM (bill-of-material) cost for the OEM without any impact on power or performance Transitioning a Frequency of an Interconnect Fabric Usage of an interconnect fabric (such as primary scalable fabric, or "PSF") by a CPU typically changes at runtime with a wide range of required operating bandwidth. In order to optimize the system power while satisfying the performance and quality of service the PSF frequency is changed at run time. For optimized frequency selection non-blocking activity is enabled and allows high transition rates.

In some embodiments, a power management (PM) unit in a CPU interacts with a clock control unit to stop a fabric clock while agents coupled to the fabric are running on a glitch free manner A clock provided to nodes of the fabric stops for some number of clock cycles—e.g., 4 cycles—and then continues in a new frequency while the agents are unaware of the transition. Such a fast clock switch uses specific clock dividers for the desired frequencies, in some embodiments. Additionally or alternatively, a PM unit detects at runtime the traffic over the fabric and signals a clock controller to set a fabric clock frequency to track the desired traffic in a tight manner, which (for example) allows for low frequency, low power when the traffic is low, and high frequency high power only when the traffic is high. The superfast frequency transition allows a tight control over the fabric traffic.

FIG. 1A shows features of a device 100 to regulate communication via an interconnect fabric according to an embodiment. Device 100 is one example of an embodiment wherein one or more integrated circuit (IC) chips comprise component devices—e.g., including, for example, any of various switches, bridges, or routers—which are interconnected with each other as a network of nodes that facilitate communication between end point devices. Some or all of the nodes operate based on a clock signal which is provided to regulate communication in the network. Various embodiments transition such a clock signal between two frequencies, wherein the transition is transparent to one or more end point devices.

The term "interconnect fabric" (or, for brevity, "fabric") is used herein to refer to a network of interconnected nodes that variously provide functionality for switched communication between various ones of a processor core, memory controller, cache, PCIE I/O circuit and/or other such end point devices. As used herein, "end point device" refers to a device which is coupled to a fabric, and which is operable to serve as a source and/or a target of a communication that is performed at least in part with the fabric. "Agent" is also used herein, in the context of frequency transitions of a fabric, to refer to an end point device which is coupled to such a fabric.

As shown in FIG. 1A, device 100 comprises a fabric 110 which includes one or more nodes 116 which are coupled to provide switched communication between various end point devices (e.g., including the illustrative agents 120, 122 shown). Some or all such end point devices are each coupled to fabric 110 via a respective asynchronous device which is to function as an asynchronous clock crossing element between a first clock domain of fabric 110 and another clock domain which includes the end point device in question. For example, fabric 110 comprises asynchronous ports 112, 114 by which agents 120, 122 (respectively) are coupled to fabric 110. Such an arrangement of asynchronous ports 112, 114 facilitates a frequency change of a clock domain which includes the one or more nodes 116, without requiring agents 120, 122 to stop or otherwise modify communication processes that would otherwise be performed in the absence of such a frequency change.

For example, device 100 further comprises a clock controller 130 which is coupled to provide a clock signal 132 to the one or more nodes 116. Based on clock signal 132, the one or more nodes 116 participate in communications between two or more end point devices—e.g., including communications with agent 120 via asynchronous port 112 and/or communications with agent 122 via asynchronous port 114. Such communications take place while the two or more end point devices each operate according to a respective clock signal other than clock signal 132—e.g., wherein a first clock domain comprises the one or more nodes 116, and a second clock domain comprises agent 120.

In one such embodiment, clock controller 130 provide functionality to change a frequency of the first clock domain while a frequency of the second clock domain remains unchanged. By way of illustration and not limitation, device 100 further comprises a power manager 140 which is coupled to receive a signal 142 which specifies or otherwise indicates that a power state transition of device 100 is to be performed, where the power state transition includes or is otherwise based on a change to the frequency of the first clock domain. Signal 142 is provided by any of a variety of sources which are internal (or alternatively, external) to device 100—e.g., wherein generation of signal 142 includes one or more operations which, for example, are adapted from conventional power management techniques for initiating a power state transition. Some embodiments are not limited to a particular source from which signal 142 is received by power manager 140, or a particular basis on which signal 142 is generated.

Based on signal 142, power manager 140 participates in a communication 144 of one or more signals to change a frequency of clock signal 132. For example, power manager 140 communicates to clock controller 130 a control signal which indicates that the first clock domain is to be transitioned from the first frequency to a second frequency. In response to such a control signal, clock controller 130 stalls clock signal 132—that is, stops a cycling by clock signal 132—for the duration of a first period of time which (for example) is greater than a duration of three cycles of a lower one of the first frequency or the second frequency. In various embodiments, such stalling of the the clock signal allows for a multiplexing or other switching between two clock dividers (or other suitable circuitry) that each correspond to a different respective one of the first frequency or the second frequency.

After the first period of time has expired, clock controller 130 begins to cycle clock signal 132 at the second frequency. Since agent 120 is coupled to the one or more nodes 116 via asynchronous port 112 (and or since agent 122 is coupled to one or more nodes 116 via agent 122), the frequency change to the first clock domain is transparent to some or all end point devices coupled to fabric 110. For example, agent 120 is to be able to communicate with asynchronous port 112 throughout the first period of time, and/or agent 122 is to be able to communicate with asynchronous port 114 throughout the first period of time. In one such embodiment, one or both of asynchronous ports 112, 114 are buffered asynchronous ports to variously receive and buffer data during the first period of time.

Figure 1B:
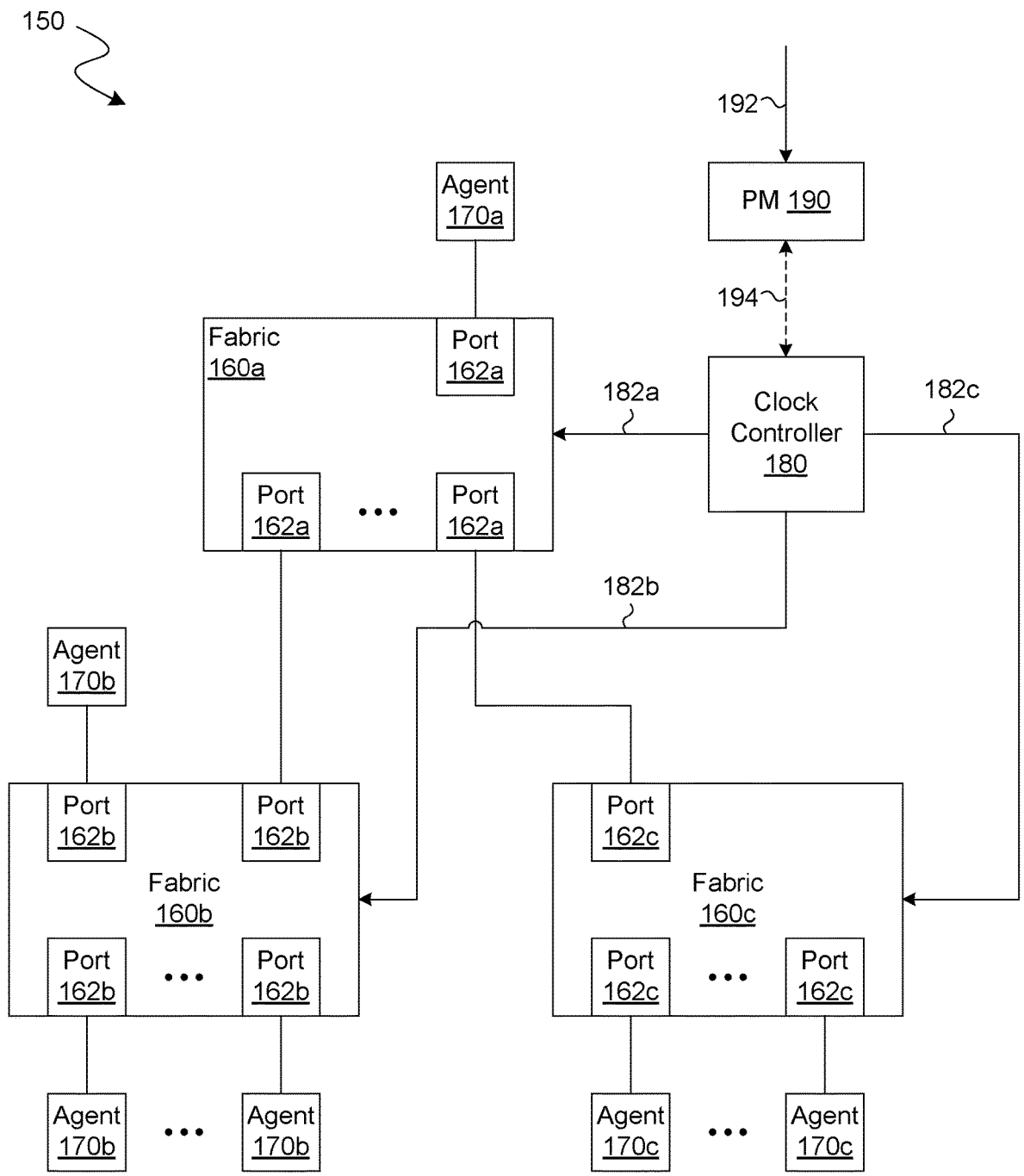

FIG. 1B shows features of a device 150 to regulate a frequency of an interconnect fabric according to another embodiment. Device 150 is one example of an embodiment wherein one or more IC chips multiple interconnect fabrics are variously coupled to one another and to multiple end point devices, wherein control circuitry provides functionality to variously perform respective frequency transitions of the fabrics. The various frequency transitions are independent of each other, for example, and are transparent to some or all end point devices which are coupled to the fabrics. Device 150 includes some or all features of device 100, for example.

As shown in FIG. 1B, device 150 comprises fabrics 160a, 160b, 160c and various end point devices coupled thereto. By way of illustration and not limitation, asynchronous ports 162a of fabric 160a facilitate coupling of fabric 160a to one or more end point devices (such as the illustrative agent 170a shown) and to each of fabrics 160b, 160c. Furthermore, asynchronous ports 162b of fabric 160b similarly facilitate coupling of fabric 160b to various agents 170b and to fabric 160a, wherein asynchronous ports 162c of fabric 160c variously couple fabric 160c to agents 170c and to fabric 160a.

In the example embodiment shown, agent 170a is coupled to communicate with some or all of agents 170b via fabrics 160a, 160b, and is further coupled to communicate with some or all of agents 170c via fabrics 160a, 160c. Alternatively or in addition, a given one of agents 170b is coupled to communicate with some or all of agents 170c via each of fabrics 160a, 160b, 160c. However, the particular number and arrangement of fabrics 160a, 160b, 160c—and the particular number and arrangement of agents 170a, 170b, 170c—is merely illustrative of one embodiments. Other embodiment have any of a variety of combinations of more, fewer, and/or differently configured fabrics and/or end point devices.

In one such embodiment, a first clock domain, including one or more nodes (not shown) of fabric 160a, is provided with a clock signal 182a from a clock controller 180 of device 150. Similarly, clock controller 180 provides other clock signals 182b, 182c for (respectively) a second clock domain of fabric 160b, and a third clock domain of fabric 160c.

Clock controller 130 provides functionality to selectively change the respective frequencies of some or all of clock signals 182a, 182b, 182c—e.g., responsive to power management circuitry (PM) 190 that, for example, corresponds functionally to power manager 140. By way of illustration and not limitation, PM 190 is coupled to receive a signal 192 which specifies or otherwise indicates that a power state transition of device 100 is to be performed, where the power state transition includes or is otherwise based on one or more of clock signals 182a, 182b, 182c each being subjected to a respective frequency change.

Based on signal 192, power manager 190 participates in a communication 194 of one or more signals to facilitate the one or more frequency changes. For example, for a given one of clock signals 182a, 182b, 182c, power manager 140 communicates to clock controller 130 a control signal which indicates that the clock signal is to be transitioned from the current frequency to a next frequency. In response to such a control signal, clock controller 130 stalls the clock signal in question, the stalling for a predetermined period of time which is greater than a duration of three cycles of a lower one of the current frequency or the next frequency. After an expiration of the predetermined period of time, clock controller 130 begins to cycle that clock signal at indicate next frequency. In one such embodiment, one of clock signals 182a, 182b, 182c is subjected to a frequency change while respective frequencies of the others of clock signals 182a, 182b, 182c remain unchanged. At some other time during operation of device 150, a different one (and, for example, only one) of clock signals 182a, 182b, 182c is similarly subjected to a frequency change which is transparent to agents 170a, 170b, 170c.

Figure 2:
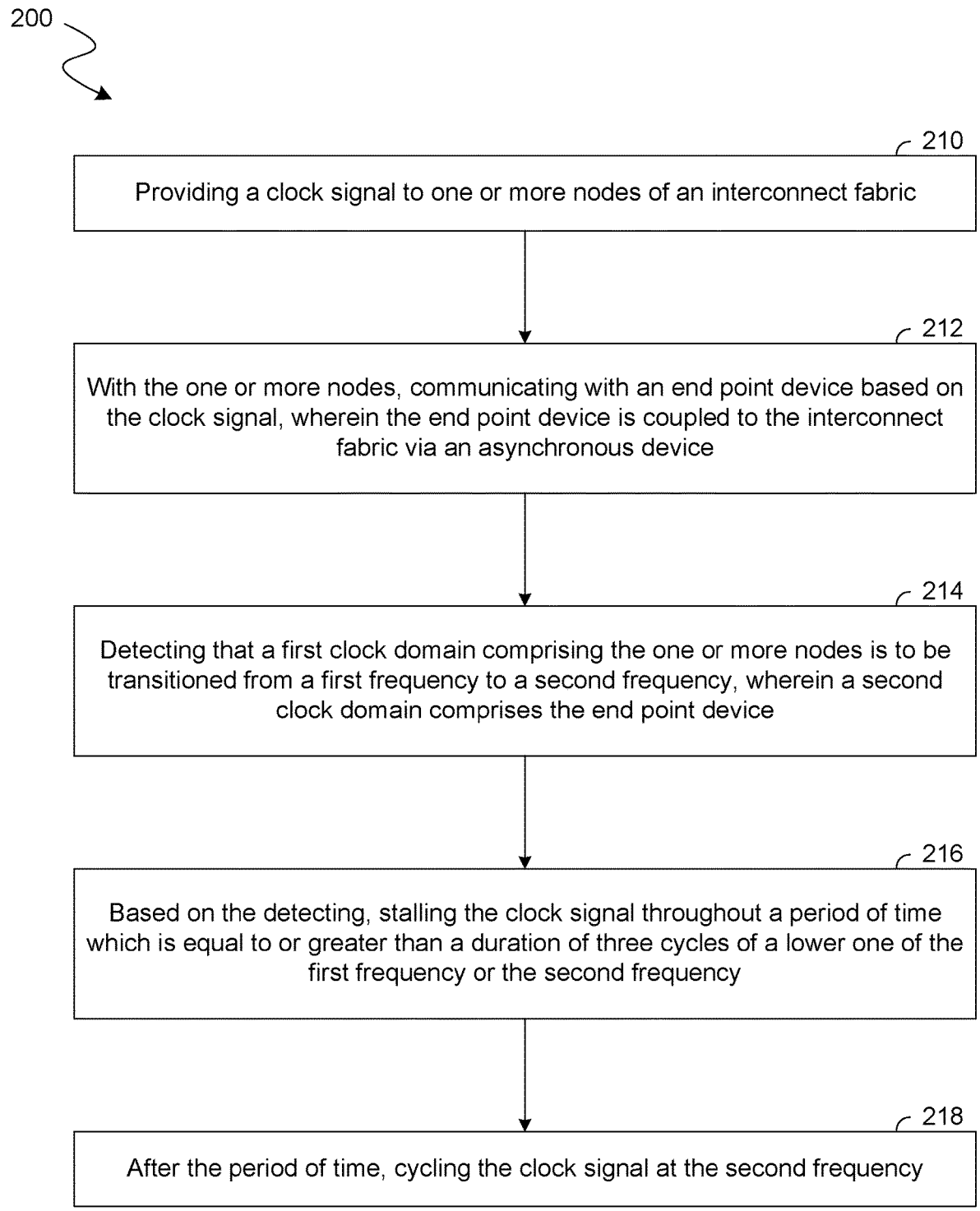
FIG. 2 illustrates a flow diagram showing features of a method to change a frequency of an interconnect fabric according to an embodiment.

FIG. 2 shows features of a method 200 to change a frequency of an interconnect fabric according to an embodiment. Method 200 is one example of an embodiment wherein a clock domain, which includes nodes of a fabric, is subjected to a frequency change that is transparent to one or more end point devices that are coupled to the fabric. Method 200 is performed with circuitry which provides functionality of one of devices 100, 150 (for example).

As shown in FIG. 2, method 200 comprises (at 210) providing a clock signal to one or more nodes of an interconnect fabric—e.g., wherein the providing includes clock controller 130 providing a first frequency of cycling by a clock signal 132 which is sent to fabric 110. Method 200 further comprises (at 212) the one or more nodes communicating with an end point device based on the clock signal, wherein the end point device is coupled to the interconnect fabric via an asynchronous device. The asynchronous device comprises an asynchronous buffered (or alternatively, unbuffered) port of the fabric, for example. In an embodiment, the communicating at 212 takes place while the one or more nodes operate in a first clock domain (based on the clock signal which is provided at 210), and while the end point device operates in a second clock domain based on a different clock signal.

Method 200 further comprises (at 214) detecting that the first clock domain is to be transitioned from a first frequency to a second frequency—e.g., wherein the detecting includes or is otherwise based on information such as that which is communicated to power manager 140 via signal 142. Based on the detecting at 214, method 200 further performs (at 216) stalling the clock signal throughout a first period of time which is greater than a duration of three cycles of a lower one of the first frequency or the second frequency. By way of illustration and not limitation, the first period of time is equal to or less than a duration of five cycles of the lower one of the first frequency or the second frequency (e.g., wherein the clock signal is stalled for four cycles of the lower frequency).

In one such embodiment, method 200 further comprises storing a value at a mode register or other suitable circuitry of a controller (e.g., one of clock controllers 130, 180) prior to the detecting at 214. The value, specifies or otherwise indicates the first period of time, is accessed in response to the detecting at 214, wherein the stalling at 216 is further based on the stored value.

After the first period of time of the stalling at 216, method 200 (at 218) begins a cycling of the clock signal at the second frequency which was detected at 214. For example, in one embodiment wherein method 200 is performed at device 100, the detecting at 214 comprises power manager 140 communicating to clock controller 130 a first control signal which includes an identifier of the second frequency. Subsequently—e.g., after clock controller 130 acknowledges a receipt of the first control signal—power manager 140 further communicates to clock controller 130 a second control signal to trigger the stalling at 216, and the subsequent cycling at 218. In various embodiment, method 200 further comprises a communicating by the end point device with the asynchronous device during the first period of time—e.g., wherein the frequency change of the first clock domain is transparent to the end point device.

In various embodiments, method 200 further comprises additional operations (not shown) whereby different interconnect fabrics—e.g., provided at a single IC chip or multiple IC chips—are variously subjected to respective frequency changes independent of each other—e.g., where such frequency changes are transparent to end point devices that are coupled to communicate via the interconnect fabrics. By way of illustration and not limitation, in various embodiments method 200 further comprises providing a second clock signal to a second one or more nodes of a second interconnect fabric which is coupled to the interconnect fabric described above. In one such embodiment, the end point device is coupled to the first interconnect fabric via the second interconnect fabric. While the second clock signal is cycling at some third frequency, a controller—e.g., providing functionality of clock controller 180—detects that a second clock domain (including the second one or more nodes) is to be transitioned from the third frequency to a fourth frequency. Based on such detecting, the controller stalls the second clock signal throughout a second period of time which (for example) is greater than one period of the third frequency. Subsequently, after the second period of time, the controller beings to cycle the second clock signal at the fourth frequency.

Figure 3:
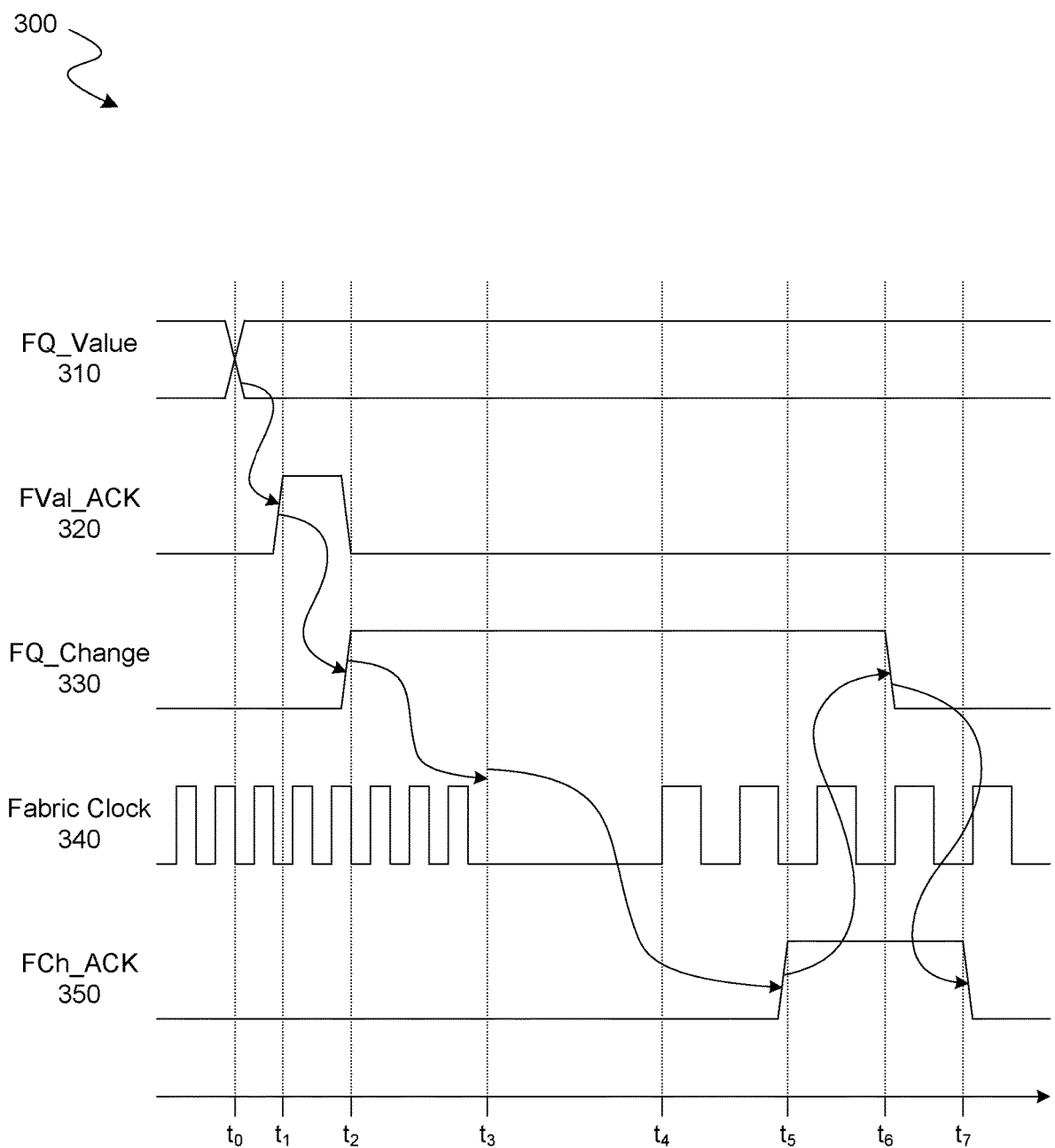
FIG. 3 illustrates a timing diagram showing signals which are variously communicated to facilitate the changing of a frequency of an interconnect fabric according to an embodiment.

FIG. 3 shows a timing diagram 300 illustrating signals which are variously communicated between devices of an IC chip (or of multiple interconnected IC chips) to change the frequency of a clock domain according to an embodiment. Communications such as those shown in timing diagram 300 are performed with one of devices 100, 150 and/or according to method 200, for example. In the illustrative scenario shown by timing diagram 300, communications are variously sent between a power manager and a clock controller (e.g., between power manager 140 and clock controller 130, respectively).

For example, the power manager communicates a signal FQ_Value 310 to the clock controller at time to, where FQ_Value 310 specifies a next target frequency to be provided with a fabric clock signal 340 (e.g., with one of clock signals 132, 182a, 182b, 182c). Subsequently, at a time $t_1$, the clock controller asserts a signal FVal_ACK 320 to acknowledge back to the power manager the target frequency which was most recently indicated by FQ_Value 310. At a time $t_2$, the power manager asserts a signal FQ_Change 330 to cause the clock controller to trigger a transition of fabric clock signal 340 from a currently implemented frequency to the target frequency indicated by FQ_Value 310.

In response to the assertion of FQ_Change 330, the clock controller—at a time $t_3$—stalls fabric clock signal 340 for a period of time ($t_4$-$t_3$) which is longer than at least one cycle of the frequency prior to time $t_3$. In various embodiments, such stalling of the the clock signal allows for a multiplexing or other switching between two clock dividers (or other suitable circuitry) that each correspond to a different respective frequency. After the period of time ($t_4$—$t_3$) expires, the clock controller begins to cycle fabric clock signal 340 at the target frequency which was indicated by FQ_Value 310 at time to. At a time $t_5$, the clock controller asserts a signal FCh_ACK 350 to acknowledge back to the power manager that the transition of fabric clock signal 340 to the target frequency has completed. In response to the assertion of signal FCh_ACK 350 at time $t_5$, the power manager deasserts signal FQ_Change 330 at a time $t_6$. Finally, the clock controller deasserts signal FCh_ACK 350 and at a time $t_7$.

Managing Two-Stage Voltage Regulation with a Processor

External voltage regulators area and cost is sensitive to the maximal current it may support. Modern CPU performance is limited by power delivery cost and area and by reducing the required currents, a CPU may increase its performance. Some embodiments facilitate operation of a system which includes: a two (or more) stage voltage conversion scheme where the scheme has two consecutive stages where: the first stage has dynamic set voltage capability; and the second stage regulator efficiency profile guarantees that increasing the input voltage would result in reduced input current (e.g. buck regulator). In some embodiments, the system includes an agent capable of determining the voltage level defined by the first stage.

In some embodiments, the agent is a power management agent (PMA) that is capable of determining the voltage level defined by the first stage. This agent can leverage the efficiency profile of the second stage, and reduce the current with increased voltage in order to consume the same amount of power (or peak potential power) using a first stage regulator capable of delivering less current.

For example, an SoC with integrated buck regulators may want to support a state with a peak potential power of 150 W when the buck minimal input voltage is 1.5V. This could be achieved by utilizing a first stage regulator capable of providing 100 A. However, if the integrated regulator can sustain up to, for example, 2V (assuming no increased losses in elevated voltage), this scenario can be supported using a first stage regulator capable of providing 75 A. To do so, the power management agent would need to identify that the target scenario cannot be achieved by running at the minimal input voltage (since that may use more input current) but may be supported if the voltage would have been increased. In some embodiments, the policy described above is applied to a fully integrated voltage regulator (FIVR).

Figure 4:
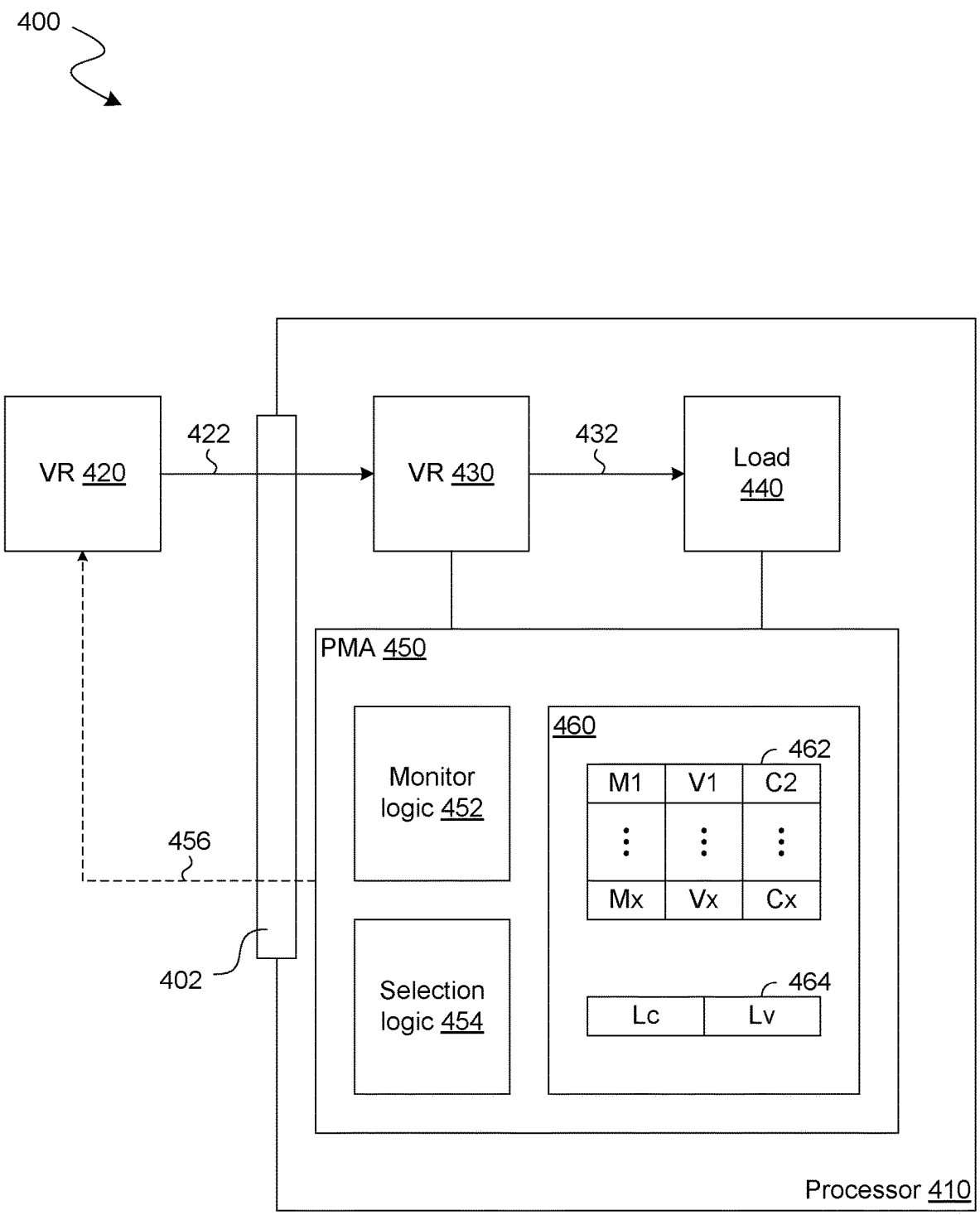
FIG. 4 illustrates a functional block diagram showing features of a system to determine a delivery of power to a processor according to an embodiment.

FIG. 4 shows features of a system 400 to determine a delivery of power to a processor according to an embodiment. System 400 is one example of an embodiment wherein a processor is operable configure a mode of an external voltage regulator which delivers power to the processor—e.g., wherein the mode is to mitigate a draw of current from the voltage regulator. In various embodiments, system 400 further includes other features of the processor 600, of one of devices 100, 150, and/or of one or more of the systems 900, 1200, 1400 or 1700 described herein—e.g., where system 400 is further operable to perform one or more of the methods 200, 800, 1000, 1300, 1500, 1800 described herein.

As shown in FIG. 4, system 400 comprises a processor 410 and a voltage regulator (VR) 420 which is coupled thereto via a hardware interface 402 of processor 410. Processor 410 comprises another voltage regulator VR 430 which is coupled to receive a voltage 422 from VR 420, and to generate a voltage 432 based on voltage 422. With voltage 432, power is delivered to one or more circuit resources of VR 430, such as the illustrative load 440 shown.

VR 430 comprises any of a variety of converter circuits which are suitable to provide an output voltage under various conditions of an input current and/or various conditions of an input voltage. By way of illustration and not limitation, VR 430 comprises a low drop out ("LDO") converter circuit, a switched capacitor converter circuit, a bypass converter circuit and/or other such circuitry which (for example) is adapted from conventional techniques for regulating a voltage to deliver processor power. Such conventional techniques are not limiting on some embodiments, and are not detailed herein to avoid obscuring certain features of various embodiments. In some embodiments, VR 430 is a fully integrated voltage regulator (FIVR) of an IC chip which includes processor 410.

VR 420 comprises any of various buck (or other) converter circuits which support operation according to any of multiple modes for delivering power with voltage 422. In some embodiments, given converter circuit of VR 420 includes, or is coupled to, switch circuitry which determines a modulation (or other characteristic) of an output which is to be provided with that given converter circuit. Alternatively or in addition, VR 420 comprises multiple converter circuits and switch circuitry to selectively couple a given one of the multiple converter circuits to an output which provides voltage 422.

For example, configuring a mode of VR 420 comprises operating circuitry of VR 420 to switchedly couple one such converter circuit to processor 410 and, for example, to switchedly decouple processor 410 from one or more other converter circuit of VR 420. Alternatively or in addition, configuring a mode of VR 420 comprises configuring a type of modulation and/or other operation by a given converter circuit.

By way of illustration and not limitation, the multiple modes of VR 420 include modes which each provide a different respective phase count for a multi-phase buck converter. Alternatively or in addition, the multiple modes of VR 420 include modes which provide different respective types of modulations including one or more types of pulse width modulation (PWM) and/or one or more types of pulse frequency modulation (PFM). Alternatively or in addition, the multiple modes of VR 420 include one or more continuous conduction modes and/or one or more discontinuous conduction modes.

In some embodiments, operational states of VR 430 (the operational states to variously generate voltage 432 based on voltage 422) each correspond to a respective one or more power delivery requirements including, for example, a respective threshold minimum level of voltage 422 and/or a respective threshold minimum current which VR 430 is to draw from VR 420. Similarly, modes of VR 420 each correspond to a respective one or more power delivery requirements including, for example, a respective threshold maximum current which VR 420 is to provide to VR 430.

To facilitate the delivery of power to load 440 using VR 420 and VR 430, processor 410 further comprises a power management agent (PMA) 450 which provides functionality to leverage an efficiency profile that is exhibited by VR 430. In an embodiment, PMA 450 identifies and exploits an opportunity configure a mode of VR 420 to reduce electrical current which is drawn by VR 430—e.g., where the reduction is associated with an increased level of voltage 422—while continuing to satisfy one or more power delivery requirements of VR 430. In one such embodiment, PMA 450 controls a transition between modes of VR 420, where power delivered to processor 410 changes very little (if at all) due to the transition, but where the transition mitigates a risk of VR 420 exceeding a threshold maximum of current drawn by VR 430.

In the example embodiment shown, monitor logic 452 of PMA 450 comprises hardware and/or executing software which monitors one or more conditions of power delivery to processor 410—e.g., including one or more performance characteristics of VR 430 and/or load 440. For example, monitor logic 452 is coupled to one or both of VR 430 and load 440, and regularly detects to identify one or more performance requirements of VR 430, a power state (actual or expected) of processor 410, and/or the like.

In various embodiment, monitor logic 452 receives an indication of a condition of the power delivery to processor 410. For example, monitor logic 452 identifies a power state to which processor 410 is to be transitioned. Alternatively, monitor logic 452 identifies an opportunity to reduce a level of current drawn by VR 430 while processor 410 is to remain in a currently-implemented power state.

Based on the indication of a power delivery condition, monitor logic 452 signals selection logic 454 of PMA 450 to utilize some predetermined configuration state which indicates performance characteristics of VR 420 and VR 430. For example, PMA 450 includes, is coupled to access, or otherwise operates based on configuration state (e.g., including the illustrative reference information 460 shown) which specifies or otherwise indicates whether a given mode of VR 430 accommodates one or more performance requirements of VR 430. Reference information 460 is provided, for example, by a manufacturer of one or both of processor 410 and VR 420, or by a distributor, retailer, engineer or other external agent—e.g., wherein the received reference information comprises updated performance characteristic information. Some embodiments are not limited with respect to a particular source from which, and/or mechanism by which, reference information 460 is provided to processor 410.

In the example embodiment shown, reference information 460 comprises a table 462 (or other suitable data structure) which modes M1, . . . , Mx of VR 420 as corresponding with respective levels V1, . . . , Vx of the voltage 422, and also with respective threshold maximum current levels C2, . . . , Cx which VR 420 is able to provide to VR 430. For example, during the mode M1 of VR 420, voltage 422 is provided at up to a level V1, wherein VR 430 is able to draw current at up to a level C2. By contrast, during the mode Mx of VR 420, voltage 422 is provided at up to a level Vx, wherein VR 430 is able to draw current at up to a level Cx. In one such embodiment, reference information 460 further comprises limit information 464 which specifies or otherwise indicates a minimum level Lv of voltage 422 that is required for operation of VR 430, and/or a minimum level Lc of current needed by VR 430 from VR 420.

In an embodiment, selection logic 454 performs an evaluation, based on reference information 460, to determine that a first mode of VR 430 is compatible with a threshold maximum current of VR 420, whereas a second mode of VR 430 is incompatible with the threshold maximum current of VR 420. By way of illustration and not limitation, selection logic 454 identifies some one or more modes of VR 420 (e.g., including the first mode and the second mode) as satisfying a threshold minimum voltage which is required by VR 430 for a currently-implemented power state—or alternatively, for an expected next power state—of processor 410. The identified modes each correspond to a different respective current level of a plurality of maximum current levels (such as the illustrative current levels C2, . . . , Cx shown) which VR 420 is able to output. Subsequently, selection logic 454 selects the first mode, from among the identified one or more modes, based on a determination that a first current level corresponding to the first mode is a lowest one of the plurality of current levels. Based on such an evaluation, PMA 450 communicates a control signal 456 to transition VR 420 to the selected mode.

In an example scenario according to one embodiment, load 440 requires 10 Watts (WITH) of power, wherein a maximum current output that VR 420 can provide 7 Amps (A), and wherein a minimum voltage that VR 430 needs to receive is 1.5 Volts (V). In one such embodiment, a first available mode of VR 430 would meet the 10 WITH power requirement by providing voltage 422 at 2.0 V while VR 430 draws 6 A. By contrast, a second available mode of VR 430 would meet the 10 WITH power requirement by providing voltage 422 at up to 1.5 V while VR 430 draws up to 8 A. Since the second mode risks a violation of the 7 A maximum current constraint by VR 420, selection logic 454 selects the first mode over the second mode, and control signal 456 communicates that VR 420 is to operate according to the selected first mode.

Figure 5:
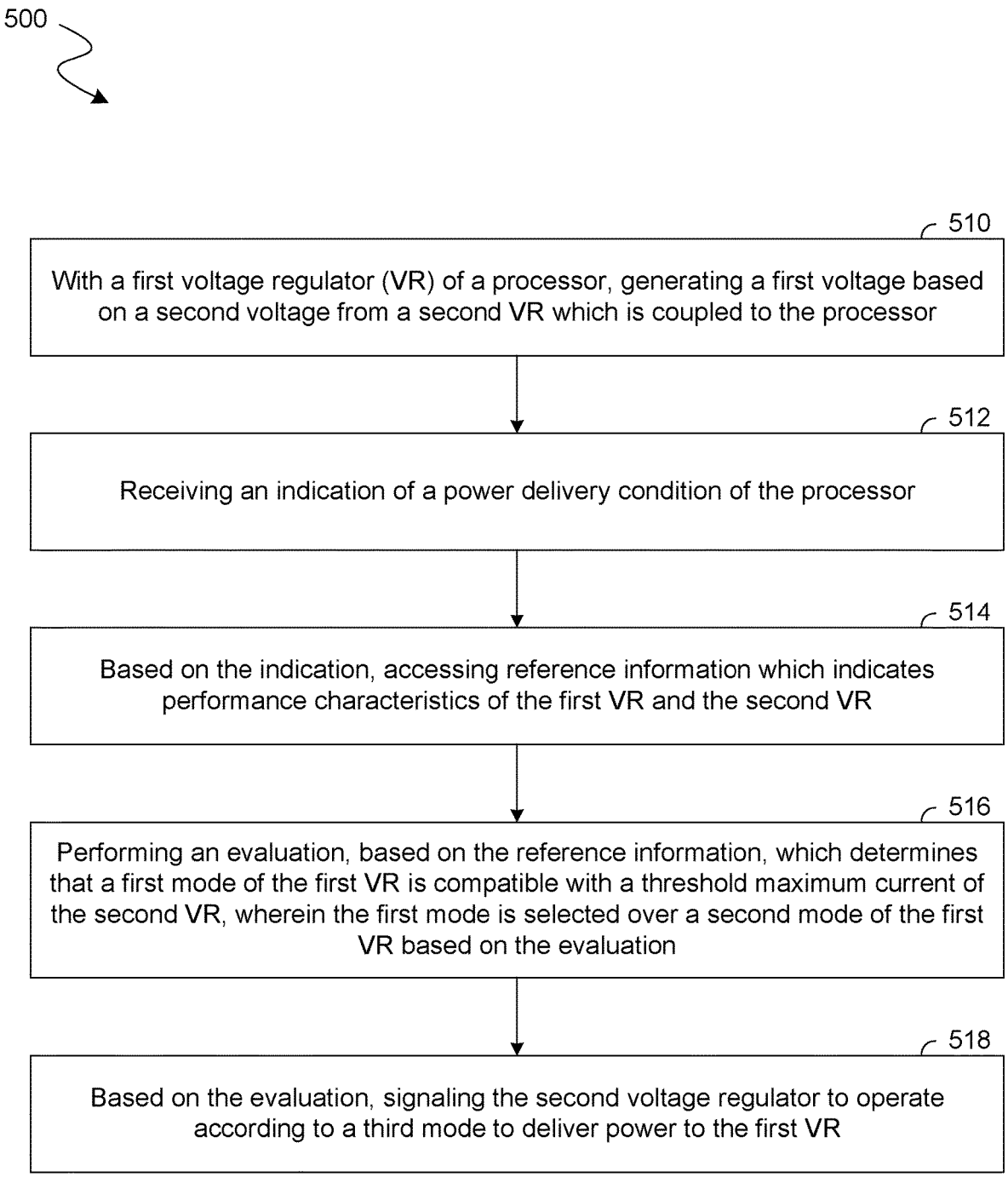
FIG. 5 illustrates a flow diagram showing features of a method to manage power delivery with a voltage regulator according to an embodiment.

FIG. 5 shows features of a method 500 to manage power delivery with a voltage regulator according to an embodiment. Method 500 is one example of an embodiment wherein a processor accesses reference information that describes one or more performance characteristics of an external voltage regulator. Based on such an access, the processor signals the external voltage regulator to transition to a mode of operation which, for example, reduced a level of a current being provided to the processor. In various embodiments, method 500 is performed with circuitry which provides functionality of system 400.

As shown in FIG. 5, method 500 comprises (at 510) generating a first voltage with a first voltage regulator of a processor, where the first voltage is generated based on a second voltage from a second voltage regulator which is coupled to the processor. In one such embodiment, the processor provides functionality of processor 410—e.g., where the first voltage regulator and second voltage regulator correspond functionally to VR 430 and VR 420, for example.

Method 500 further comprises (at 512) receiving an indication of a power delivery condition of the processor. Receiving the indication at 512 comprises identifying a power state to which the processor is to be transitioned. For example, power management circuitry or other suitable logic of such the processor (e.g., the logic providing functionality of monitor logic 452) is configured to monitor one or more operational, environmental and/or other conditions of the processor. Such monitoring uses any of various techniques and/or mechanisms that, for example, are adapted from conventional power management techniques, which are not detailed herein and are not limiting on various embodiments. Based on such monitoring, the logic detects a condition which exists (or is expected to exist) during a current or future delivery of power to the processor and/or in the processor. For example, the logic identifies one or more of a power state to which the processor is to be transitioned, a currently enforced or anticipated voltage requirement, a currently enforced or anticipated current requirement, an opportunity to reduce a level of current (or voltage), and/or the like.

Method 500 further comprises (at 514) accessing reference information, the accessing based on the receiving at 512, which indicates performance characteristics of the first voltage regulator and the second voltage regulator. The accessing at 514 comprises, for example, selection logic 454 of PMA 450 accessing one or both of table 462 and limit information 464. In various embodiments, method 500 further comprises receiving the reference information from an external agent—e.g., wherein PMA 450 is preprogrammed or otherwise configured, in advance of the receiving at 512, with operational parameters for one or both of VR 420, VR 430. In one such embodiment, receiving the reference information comprises receiving updated performance characteristic information—e.g., wherein one or more values of table 462 and/or limit information 464 are updated one or more times during a life cycle of system 400.

Method 500 further comprises (at 516) performing an evaluation, based on the reference information, which determines that a first mode of the first voltage regulator is compatible with a threshold maximum current of the second voltage regulator, wherein the first mode is selected over a second mode of the first VR based on the evaluation (where the first and second modes are to variously provide the first voltage based on the second voltage from the second voltage regulator). For example, the evaluation determines that, of the first mode and the second mode, only the first mode is compatible with the threshold maximum current of the second voltage regulator. In one such embodiment, performing the evaluation at 516 comprises identifying a threshold minimum voltage requirement of the first voltage regulator, and further identifying those available modes of the second voltage regulator which satisfy the threshold minimum voltage requirement. Based on such identifying, method 500 performs a selection of the first mode from among the identified available modes. In one such embodiment, the identified modes each correspond to a different respective current level of a plurality of levels of a current output from the second voltage regulator, wherein the selection is based on a determination that a first current level corresponding to the first mode is a lowest one of the plurality of current levels.

Method 500 further comprises (at 518) signaling the second voltage regulator, based on the evaluation performed at 516, to operate according to a selected ("third") mode to deliver power to the first voltage regulator. In one such embodiment, the indication is received at 512 during a given power state of the processor, wherein the processor maintains that same power state after a transition of the second voltage regulator to the selected third mode.

Determining a Latency of a Power State Transition by a Processor

Both an operating system (OS) and devices communicate their latency requirements to a CPU while the CPU is up and running, and prior to entering sleep state. Such a CPU publishes its exit latency per a given sleep state to the OS and/or OEM devices, for example. This exit latency information can be stored in register (e.g., model specific register (MSR)) accessible to the OS. While the CPU is at a sleep state, it needs be able to wake up in response to a predefined trigger event. Such events can be triggered by a device, or internal reasons (e.g., timer that is expired, wakeup due to temperature exceeding thresholds, etc.). If a wakeup is generated by a device connected to the CPU, e.g. USB (Universal Serial Bus) mouse click, or PCIe (Peripheral Component Interconnect Express) device requiring a service, the latency from the wake up event until the time this event is served is expected to meet OS and device latency requirements.

When a CPU is placed in a deep sleep state, only a minimal set of resource is available for each wake-capable controller, in order to save power. Such resources can be e.g., slow clock (which is often different than the functional clock) for periodic sampling of IO (input-output) and a low current power supply. In various embodiments, some or all wake-capable controllers are required to implement a mechanism to log wakeup times using an available clock. During the wakeup process, the CPU queries the controller that triggered the wake request for the time that has passed since the wake request. The controller replies back to the CPU with an answer based on common knowledge of both the CPU and the controller—e.g. how many cycles has passed when translated to a common clock. CPU then finishes the wakeup process, and reports the aggregated latency back to the OS, according to techniques described herein.

Figure 6:
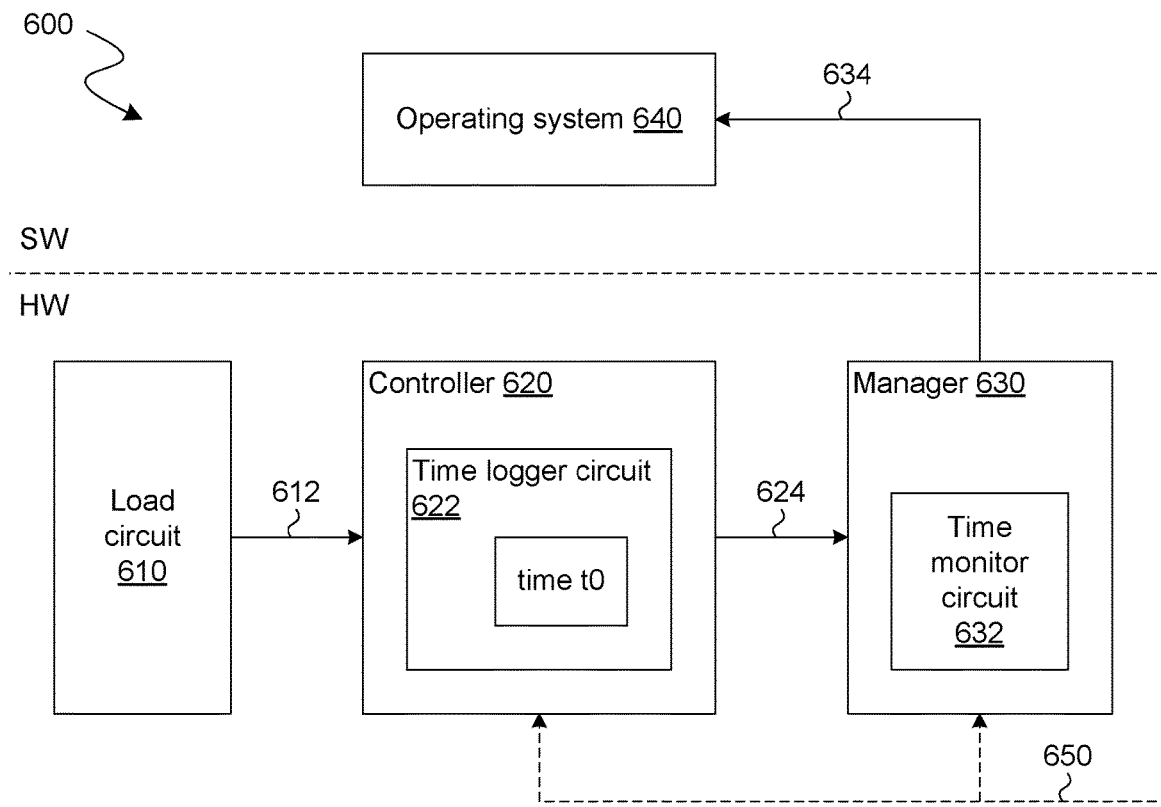
FIG. 6 illustrates a functional block diagram showing features of a system to determine a latency of a power state transition by a processor according to an embodiment.

FIG. 6 shows features of a processor 600 to determine a latency of a power state transition by a processor according to an embodiment. Processor 600 is one example of an embodiment wherein circuitry of a processor logs a time when an indication of a power state transition is detected, where the time is prior to an activation of other circuitry of the processor which is to determine a latency value. In various embodiments, processor 600 further includes other features of one or more of the devices 100, 150 or systems 400, 900, 1200, 1400, 1700 described herein—e.g., where processor 600 is further operable to participate in one or more of the methods 200, 500, 1000, 1300, 1500, 1800 described herein.

As shown in FIG. 6, a hardware (HW) domain of processor 600 comprises a load circuit 610, a controller 620, and a manager 630 which are variously coupled to one another to facilitate the identifying latency due to operations which facilitate a power state transition. The identified latency is subsequently communicated to one or more processes of a software (SW) domain which is executed with processor 600—e.g., the one or more processes including the illustrative operating system (OS) 640 shown.

In the example embodiment shown, load circuit 610 detects a need to perform a power state transition with processor 600. For example, load circuit 610 comprises any of variety of power sinks and/or circuitry to monitor an actual or expected future power demand of such a power sink. By way of illustration and not limitation, load circuit 610 comprises core circuit logic and/or uncore circuit logic—e.g., including some or all of an execution pipeline.

In various embodiments, load circuit 610 detects a need to perform a power state transition wherein some circuitry of processor 600 is transitioned from being disabled, to being enabled to receive timing information and determine a latency value based on that timing information. Alternatively or in addition, load circuit 610 detects a need to perform a transition of processor 600 from a first power state which disables an execution of software to a second power state which enables the execution of software.

Controller 620 coupled to receive from load circuit 610 a signal 612 which indicates the detected need, wherein based on signal 612, a time logger circuit 622 of controller 620 logs a time t0 of a communication of signal 612. Furthermore, controller 620 generates a control signal 624 to request the power state transition which is indicated by signal 612.

Manager 630 comprises circuitry to manage a power state transition by processor 600, and to communicate to one or more software processes a value representing the duration of at least some operations which are part of, and/or otherwise facilitate, the power state transition. In response to control signal 624, manager 630 initiates a wake-up operation to enable functionality of a time monitor circuit 632 that is included in (or alternatively, is coupled to) manager 630. Time monitor circuit 632 is operable to receive time information from one or more resources of processor 600 and, based on such timing information, to identify the duration of operations of a power state transition (and/or operations which otherwise facilitate the power state transition).

At some point after the wake-up operation has been initiated, manager 630 is prepared to retrieve timing information that is to be provided to time monitor circuit 632. Manager 630 then requests from controller 620 an indication of the time t0 that has been logged by time logger circuit 622. In one such embodiment, manager 630 sends a query to controller 620 to request the indication of the time t0, wherein controller 620, based on the query, calculates a total time between the time t0 and a time of a communication of the query. The total time is then communicated to manager 630 in a query response message. Alternatively, controller 620 responds to the query by sending an identifier of the time t0—e.g., wherein a common clock signal 650 is made available to both controller 620 and manager 630 as a shared time reference for determining the latency based on the identifier.

Time monitor circuit 632 computes a duration of the latency based on the indication of time t0 which is provided by time logger circuit 622—e.g., wherein the latency comprises a first period of time from the time t0 to a transmission of control signal 624 from controller 620. In various embodiments, manager 630 queries controller 620 for the indication of the time t0, wherein the latency further comprises a second period of time during the wake-up operation, and before a communication of the query. In some of these embodiments, the latency further comprises a third period of time from the communication of the query to a communication of a query response which includes the indication of the time t0. In one such embodiment, the latency further comprises a fourth period of time after the communication of the indication of the time t0 to manager 630—e.g., where manager 630 further performs or manages one or more other operations of the power state transition after a receipt of the indication of the time t0.

Based on the computation by time monitor circuit 632, manager 630 provides to operating system 640 (and/or to one or more other executing processes of the software domain) a message 634 comprising a value, based on the indication of the time t0, which identifies a latency of the power state transition. Message 634 thus facilitates (for example) improved diagnostics for evaluating power management performance.

Figure 7:
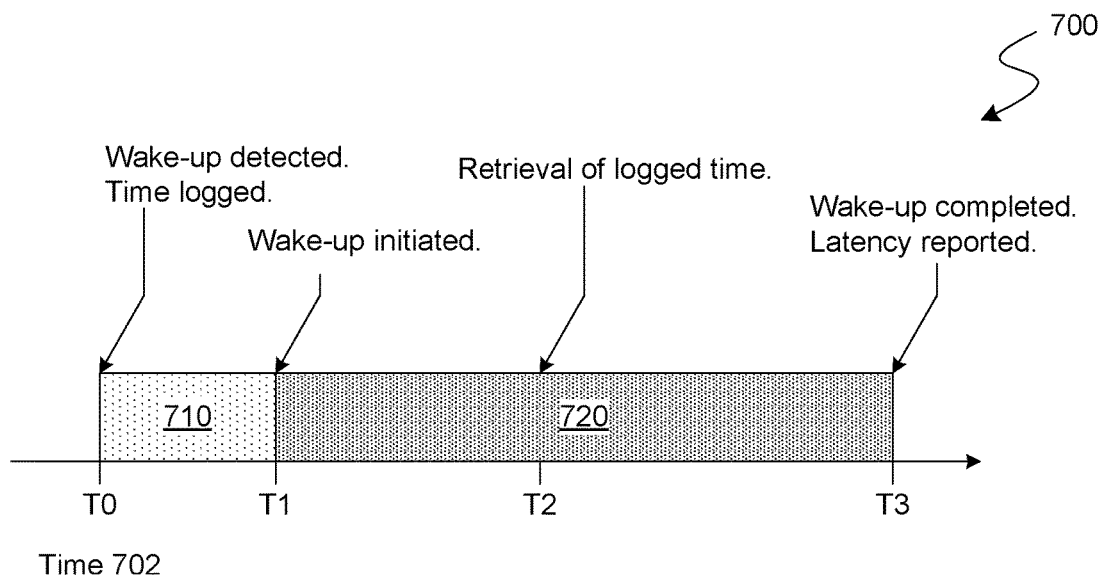
FIG. 7 illustrates a timing diagram showing a sequence of events to transition a processor between power states according to an embodiment.

FIG. 7 shows a timing diagram 700 which illustrates a timing of events at a processor which contribute to the determining, according to an embodiment, of a latency which is associated with a power state transition. Events such as those represented in timing diagram 700 are performed, for example, with processor 600.

In FIG. 7, events are shown in timing diagram 700 as variously occurring over a period of time 702. For example, a signal is received at a time T0, the signal indicating that a power state transition of the processor is to be performed. In the example scenario shown, the signal—such as the signal 612 which load circuit 610 communicates to controller 620—specifies or otherwise indicates that at least some circuit resource of the processor need to undergo a wake-up process to facilitate at least some of the power state transition. In response to the signal, controller 620 (or other suitable circuitry of the processor) logs the time T0 which is associated with the receiving of the signal.

Subsequently, at a time T1, the wake-up process of the circuit resource is initiated—e.g., wherein manager 630 (responsive to signal 624) begins to activate resources that are used to determine a latency value. At a later time T2, the now-active circuit resource is able to retrieve or otherwise determine a value which indicates the logged time T0. For example, between time T1 and time T2, manager 630 sends to controller 620 a query for the time t0 which was logged by time logger circuit 622.

After time T2, the wake-up (and, for example, any other operations of the power state transition) has completed, where—at a time T3—a latency value is identified and made available to be included in a report to an operating system (or other suitable software agent) which is executed at the processor. In an embodiment, the latency includes some or all of a period of time 720 after the initiation of the wake-up process at time T2. Moreover, latency further comprises some or all of a period of time 710 from the time T1 to the time T2.

Figure 8:
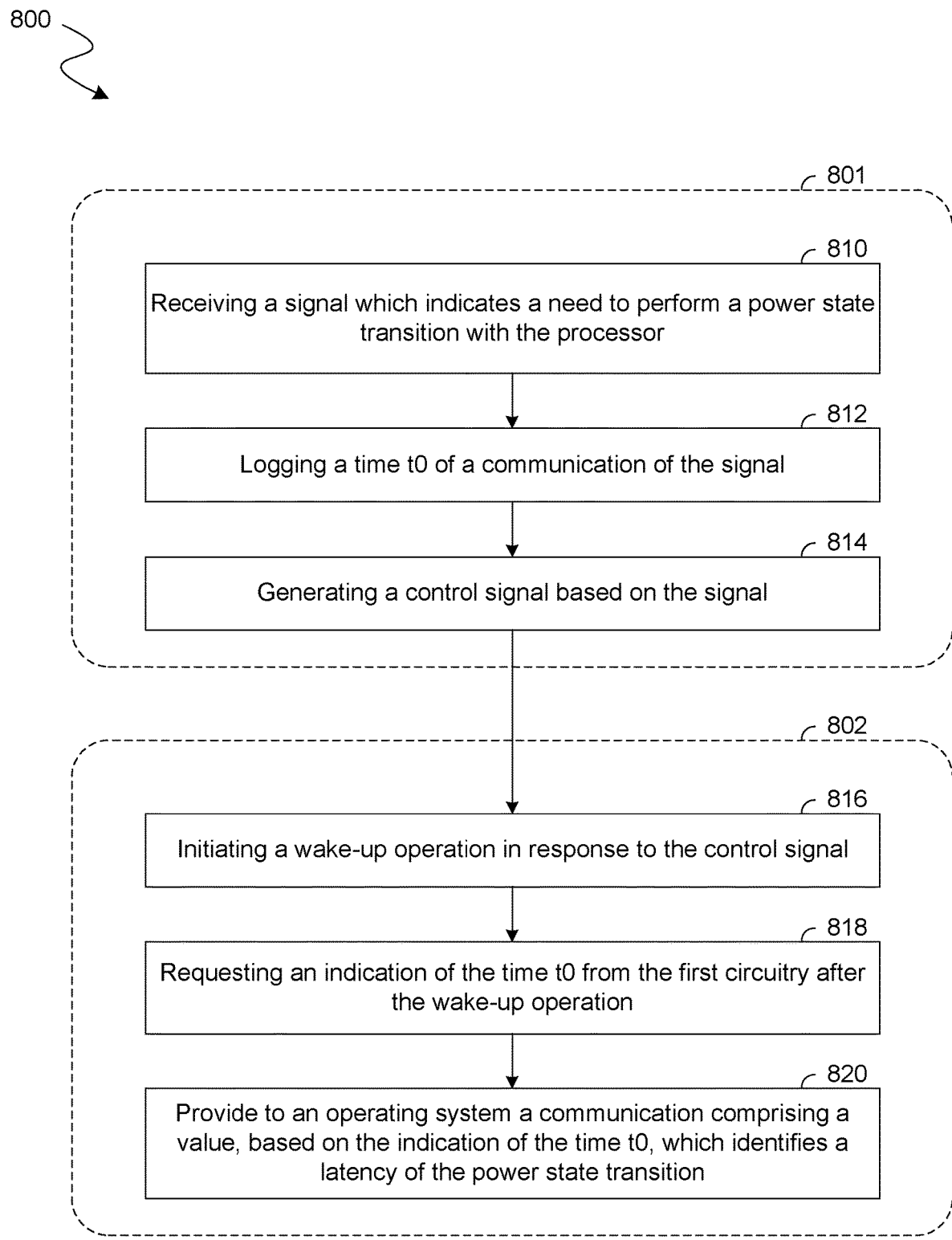
FIG. 8 illustrates a flow diagram showing features of a method to change a power state of a processor according to an embodiment.

FIG. 8 shows features of a method 800 to change a power state of a processor according to an embodiment. Method 800 is one example of an embodiment wherein a latency of a power state transition is determined and communicated to an operating system. The determining of the latency time takes into account a period of time prior to the initiating of a wakeup of one or more processor resources. Method 800 is performed, for example, with circuitry that provides functionality of processor 600—e.g., wherein the power state transition includes or is otherwise based on operations such as those shown in timing diagrams 700.

As shown in FIG. 8, method 800 includes operations 801 and other operations 802 which are performed (respectively) by a first circuit and by a second circuit of a processor. In one such embodiment, the first circuit and the second circuit correspond functionally two controllers 620 and managers 630, for example. Operations 801 comprise (at 810) receiving a signal—e.g., the signal 612 communicated from load circuit 610 to controller 620—which indicates a need to perform a power state transition with the processor. In one such embodiment, the power state transition includes a transition of the processor from a first power state which disables an execution of software to a second power state which enables the execution of software. Operations 801 further comprise (at 812) logging a time t0 of a communication of the signal—e.g., wherein time logger circuit 622 logs a value which specifies or otherwise indicates a time when controller 620 received signal 612. Based on the signal which is received at 810, operations 801 further generate a control signal (at 814) to begin one or more operations of the power state transition.

For example, operations 802 comprise (at 816) initiating a wake-up operation in response to the control signal which is generated at 814. Prior to wake-up being initiated at 816, one or more resources of the second circuit—e.g., resources of manager 630 which participate in the determining of a latency that is due to of some or all of the power state transition—are unable to access or otherwise determine at least some timing information which is needed for such determining. The initiating at 816 uses one or more techniques and/or mechanisms which, for example, are adapted from conventional power management technologies (which are not detailed herein and are not limiting on certain embodiments).

Operations 802 further comprise (at 818) requesting an indication of the time t0 from the first circuitry after the wake-up operation. For example, the second circuit sends a query to the first circuit to request the indication of the time t0, where (in some embodiments) the first circuit, based on the query, calculates a total time between the time t0 and a time of a communication of the query. Alternatively, the first circuit responds to such a query by identifying the time t0, wherein the second circuit subsequently calculates a duration of a period of time based on the time t0.

Operations 802 further comprise (at 820) providing an operating system—which is executed with the processor—a communication comprising a value, based on the indication of the time t0, which identifies a latency of at least some portion of the power state transition. For example, the second circuit computes a duration of the latency based on the indication of the time t0, wherein the latency comprises a first period of time from the time t0 to a transmission of the control signal which is generated at 814. In various embodiments, requesting the indication at 818 comprises the second circuit sending a query to the first circuit, wherein the latency further comprises a second period of time during the wake-up operation, and before the sending of the query. In one such embodiment, the latency further comprises a third period of time from the sending of the query (at 818) to a communication of the indication of the time t0 to the second circuit. Although some embodiments are not limited in this regard, the latency further comprises a fourth period of time after the communication of the indication of the time t0 to the second circuit. For example, the second circuit further performs one or more operations of the power state transition after a receipt of the indication of the time t0 from the first circuit—e.g., wherein such one or more operations are also taken into account in the determining of the value which identifies the latency.

Negotiating Power Delivery Between IC Chips

Some embodiments variously facilitate efficient operation of an architectural topology wherein respective loads of multiple IC chips are powered by a common voltage regulator—e.g., wherein one SoC hosts an integrated voltage regulator which is used by multiple SoCs. In some cases, the overall capability of such a system is lower than the sum of the maximal requirement of all the consumers. For example, Table xxx below illustrates various use scenarios wherein an overall system capability is 150 Watts (W)—for example—even though multiple consumers can each utilize up to 100 W:

TABLE 1

Example Scenarios of Power Consumption Capability

|  | Maximum capability | Scenario #1 | Scenario #2 | Scenario #3 | Scenario #4 (illegal) |
|---|---|---|---|---|---|
| Consumer 1 | 100 W | 100 W | 50 W | 75 W | 100 W |
| Consumer 2 | 100 W | 50 W | 100 W | 65 W | 75 W |
| Sum | 200 W | 150 W | 150 W | 140 W | 175 W |

To avoid operation such as that illustrated by scenario #4 in Table 2, some embodiments provide an interface which facilitates communications to negotiate power delivery between IC chips.

Figure 9:
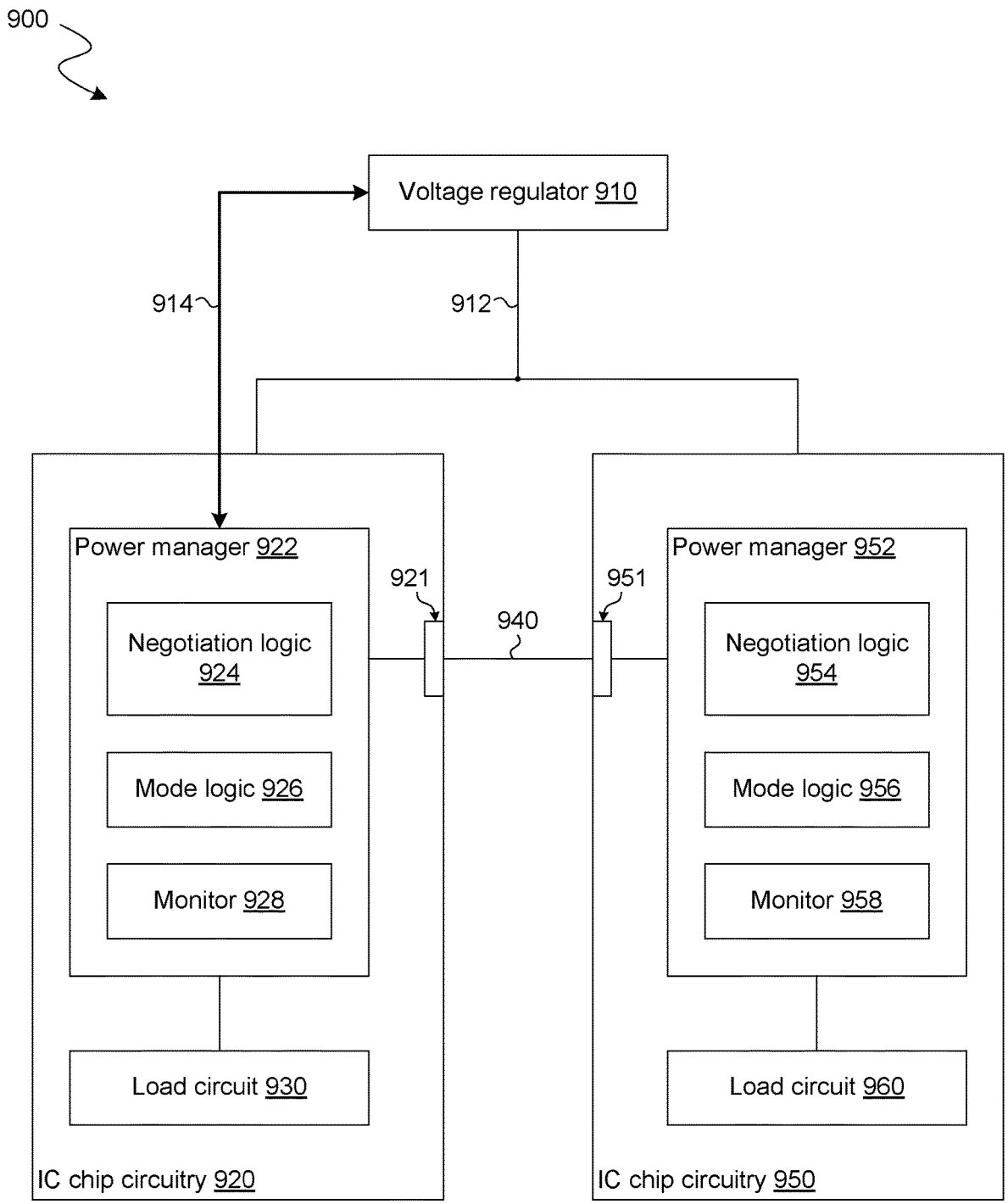
FIG. 9 illustrates a functional block diagram showing features of a system to negotiate power utilization by multiple integrated circuit chips according to an embodiment.

FIG. 9 shows features of a system 900 to negotiate power utilization by multiple integrated circuit chips according to an embodiment. System 900 is one example of an embodiment wherein a power management unit of a first IC chip supports communication with a power management unit of a second IC chip, the communication to negotiate a mode of power distribution among multiple IC chips including the first and second IC chips. In various embodiments, system 900 further includes other features of the processor 600, of one of devices 100, 150, and/or of one or more of the systems 400, 1200, 1400 or 1700 described herein—e.g., where system 900 is further operable to participate in one or more of the methods 200, 500, 800, 1300, 1500, 1800 described herein.

As shown in FIG. 9, system 900 comprises IC chip circuitry 920, IC chip circuitry 950, and voltage regulator 910 which are variously coupled to one another, wherein voltage regulator 910 is coupled to variously provide power to each of IC chip circuitry 920, IC chip circuitry 950 via a rail 912. Two IC chips each include a different respective one of IC chip circuitry 920 and IC chip circuitry 950—e.g., wherein one of the two IC chips further comprises voltage regulator 910. In another embodiment, voltage regulator 910 is distinct from, but coupled to, the two IC chips. A connection 940 is coupled between respective hardware interfaces 921, 951 of IC chip circuitry 920 and IC chip circuitry 950, the connection 940 to facilitate negotiation of power delivery between the two IC chips.

In the example embodiment shown, a first IC chip comprises IC chip circuitry 920, wherein a power manager 922 of IC chip circuitry 920 manages power distribution to, and/or power consumption by, a load circuit 930 of the first IC chip. Similarly, a second IC chip comprises IC chip circuitry 950, wherein a power manager 952 of IC chip circuitry 950 manages power distribution to, and/or power consumption by, a load circuit 960 of the first IC chip. In some embodiments, one of first IC chip or the second IC chip comprises voltage regulator 910.

Power manager 922 comprises a monitor 928, mode logic 926, and negotiation logic 924 to facilitate a negotiation of how power is to be distributed between multiple IC chips including the first IC chip and the second IC chip. Power manager 952 comprises a monitor 958, mode logic 956, and negotiation logic 954 to similarly facilitate such negotiation. For example, power manager 922 facilitates the identification of power requirements and/or available power budget of the first IC chip, where power manager 952 facilitates the identification of power requirements and/or available power budget of the second IC chip.

In some embodiments, monitor 928 comprises hardware and/or executing software to evaluate performance characteristics of load circuit 930—e.g., wherein monitor 928 identifies one or more metrics of (actual and/or expected) power usage by load circuit 930, and tracks one or more requirements for, or limits on, such power usage. Mode logic 926 comprises hardware and/or executing software to determine, based on the evaluating by monitor 928, whether a given power state (or other operational mode) of the first IC chip is required or, alternatively, is available to be selected based on a power demand of some external agent. Negotiation logic 924 provides functionality to communicate with such an external agent—e.g., where such communications facilitate the determining of a next power state (or other operational mode) of one of the first IC chip or the second IC chip.

By way of illustration and not limitation, power manager 952 similarly comprises a monitor 958 to evaluate performance characteristics of load circuit 960, and mode logic 956 to determine, based on the evaluating by monitor 958, whether a given operational mode of the second IC chip is required or, alternatively, available to be selected. Power manager 952 further comprises negotiation logic 954 to communicate with one or more external agents—wherein one of negotiation logic 924 and negotiation logic 954 communicates, via connection 940, a power requirement, an available power budget and/or the like.

In some embodiments, one of power managers 922, 952 (in the illustrative embodiment shown, power manager 922) is coupled to control a delivery of power by voltage regulator 910 to rail 912—e.g., wherein negotiation logic 924 communicates one or more control signals to voltage regulator 910 via the illustrative connection 914 shown. In one such embodiment, power manager 952 relies on power manager 922 to control voltage regulator 910 on behalf of the second IC chip—e.g., wherein system 900 omits any path by which power manager 952 is able to control voltage regulator 910 independent of power manager 922.

In the example embodiment shown, power managers 922, 952 are coupled to hardware interface 921 and hardware interface 951 (respectively) for communication via connection 940. Power manager 922 participates in communications with power manager 952 while voltage regulator 910 delivers power via rail 912 to each of the first IC chip and the second IC chip.

In an illustrative scenario according to embodiment, these communications comprise a first message, sent between power managers 922, 952, which indicates a first transition between modes of power consumption by one of the first IC chip or the second IC chip. The first message is, for example, a request for approval to perform the first transition, or (alternatively) an acknowledgement or other notification that the first transition has been performed, or will be performed.

In one such embodiment, the communications further comprise a second message, based on the first message, which is sent from the other of power managers 922, 952 (that is, from the receiver of the first message) to an agent which is one of voltage regulator 910 or a third power management circuit of a third IC chip (not shown). The second message requests a second transition of a mode of power consumption, or of power delivery, by that agent. As variously illustrated by examples herein, one of the first transition or the second transition is performed (for example) based on the other of the first transition or the second transition.

By way of illustration and not limitation, in various embodiments, the first message requests a confirmation that the one of power managers 922, 952 is approved to perform the first transition, wherein the agent is voltage regulator 910. In one such embodiment, the communications further comprise a third message from voltage regulator 910 to the other of power managers 922, 952, the third message to confirm a performance of the second transition. Based on the third message, the requested confirmation is sent, for example, in a fourth message from the other of power managers 922, 952 to the one of power managers 922, 952.

In some alternative embodiments, the agent is a third power management circuit of a third IC chip (not shown) of system 900, wherein the second message requests a performance of the second transition by the third power management circuit. In one such embodiment, the communications further comprise a third message from the third power management circuit to the other of power managers 922, 952 (that is, to the receiver of the first message). The third message confirms a performance of the second transition, wherein the other of power managers 922, 952 performs a third transition of a mode of power consumption based on the third message. Based on the third message, the requested confirmation is sent, for example, in a fourth message from the other of power managers 922, 952 to the one of power managers 922, 952.

FIG. 10 shows features of a method 1000 to provide power to multiple integrated circuit (IC) chips according to an embodiment. Method 1000 is one example of an embodiment wherein power management (PM) circuitry of one IC chip participates in communications with PM circuitry of another IC chip to determine a distribution of power among the multiple IC chips. In various embodiments, method 1000 is performed with circuitry which provides functionality such as that of system 900, for example.

As shown in FIG. 10, method 1000 comprises (at 1010) delivering power via a rail from a voltage regulator to respective circuits of a first IC chip and a second IC chip, wherein a first power management (PM) circuit of the first IC chip is communicatively coupled to a second PM circuit of the second IC chip. The voltage regulator, the first PM circuit, and the second PM circuit correspond functionally to voltage regulator 910, power manager 922, power manager 952 (respectively), for example. In some embodiments, one of the first IC chip or the second IC chip comprises the voltage regulator.

Method 1000 further comprises (at 1012) sending, from the first PM circuit to the second PM circuit, a first message which indicates a first transition between modes of power consumption by the first IC chip. In some embodiments, the first message indicates that the first IC chip has performed the first transition. Alternatively, the first message requests that the second PM circuit perform, or otherwise facilitate, one or more operations to enable or otherwise avail of the first transition. In one such embodiment, the first message requests that the second PM circuit provide a power state transition of the second IC chip and/or facilitate a change to some other resource (e.g., an "agent" which is one of a voltage regulator or a third PM circuit of a third IC chip).

For example, method 1000 further comprises (at 1014) sending a second message, based on the first message, from the second PM circuit to an agent which is one of the voltage regulator or a third PM circuit of a third IC chip, wherein the second message requests a second transition of a mode of power consumption or power delivery by the agent.

In various embodiments, one of the first transition or the second transition is based on the other of the first transition or the second transition. By way of illustration and not limitation, the first message—in some embodiments—requests a confirmation that the first PM circuit is approved to perform the first transition. In one such embodiment, the agent is a voltage regulator, wherein communications between the first PM circuit, the second PM circuit and the agent further comprise a third message—from the voltage regulator to the second PM circuit—which confirm a performance of the second transition. Such communications further comprise, for example, a fourth message—from the second PM circuit to the first PM circuit—which comprises the requested confirmation. In another example embodiment, the first message confirms a performance of the first transition by the first PM circuit—e.g., wherein the agent is the voltage regulator, and wherein the second transition is performed based on the first transition.

Alternatively, the agent is the third PM circuit, where (for example) the second message requests a performance of the second transition by the third PM circuit. In one such embodiment, communications between the first PM circuit, the second PM circuit and the agent further comprise a third message—from the third PM circuit to the second PM circuit—which confirms a performance of the second transition. Based on such a third message, the second PM circuit performs a third transition of a mode of power consumption by the second IC chip. The communications further comprise (for example) a fourth message from the second PM circuit to the first PM circuit, the fourth message comprising the confirmation.

FIG. 11A-11D shows swim lane diagrams 1100-1103 variously illustrating mechanisms to determine a distribution of power each according to a corresponding embodiment. Communications and operations such as those shown one or more of swim lane diagrams 1100-1103 are provided, for example, with circuitry such as that of system 900—e.g., wherein some or all such communications and operations are performed according to method 1000.

Figure 11A:
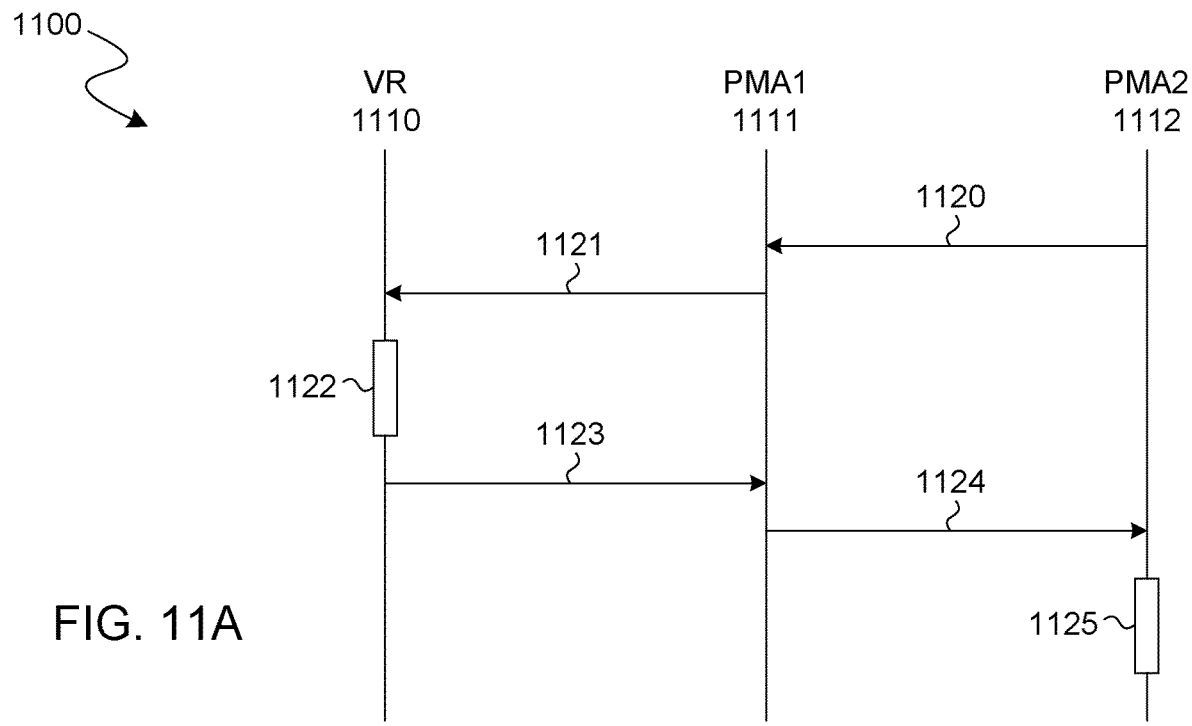
FIGS. 11A-11D illustrate swim lane diagrams each showing communications to manage power distribution to integrated circuit chips according to a corresponding embodiment.

Referring now to FIG. 11A, swim lane diagram 1100 shows one example of communications and operations which are variously performed with a voltage regulator VR 1110, and with power management circuits PMA1 1111, PMA2 1112 which each reside on a different respective IC chip. At a beginning of the time represented in swim lane diagram 1100, a first IC chip (which includes PMA1 1111) operates in a mode which is capable of drawing up to 2 Amps (A) of current. Concurrently, a second IC chip (which includes PMA2 1112) operates in a mode which is capable of drawing up to 6 A. Altogether, the first and second IC chips have a total current limit of 10 A.

In FIG. 11A, swim lane diagram 1100 shows a signal 1120, sent by PMA2 1112 to PMA1 1111, which requests that the second IC chip be allocated a current budget of 10 A. In response to signal 1120, PMA1 1111 sends to VR 1110 a signal 1121 which requests that the VR 1110 transition to a mode which supports a total draw of at least 12 A by the first IC chip and the second IC chip. Based on signal 1121, VR 1110 performs an operation 1122 to transition to the requested mode, and then sends to PMA1 1111 a signal 1123 which confirms that a total of 14 A (for example) is now supported by VR 1110. In response to signal 1123, PMA1 1111 sends to PMA2 1112 a signal 1124 which indicates that the second IC chip can draw up to 12 A (which is the difference between the available 14 A and the up to 2 A that the first IC chip might draw). Based on signal 1124, PMA2 1112 performs an operation 1125 to transition the second IC chip to a mode which is capable of drawing up to 10 A.

Figure 11B:
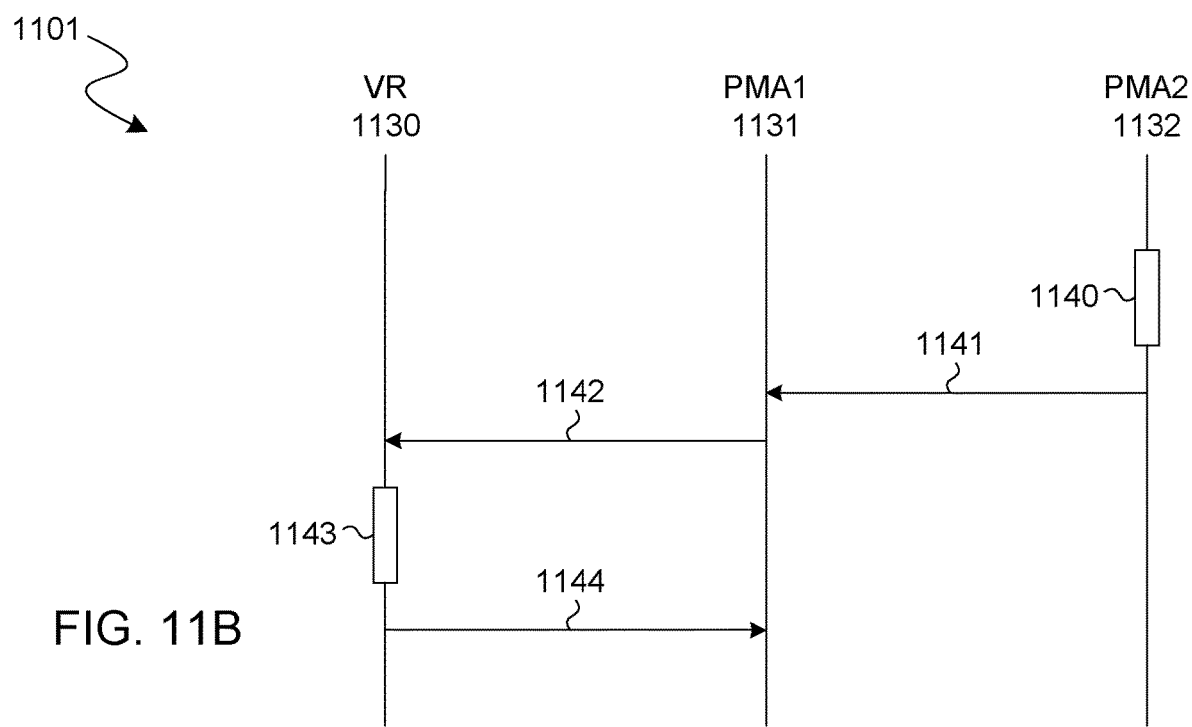

Referring now to FIG. 11B, swim lane diagram 1101 shows an example of additional or alternative communications and operations which are variously performed with a voltage regulator VR 1130, and with power management circuits PMA1 1131, PMA2 1132 which each reside on a different respective IC chip. At a beginning of the time represented in swim lane diagram 1101, a first IC chip (which includes PMA1 1131) operates in a mode which is capable of drawing up to 2 A of current. Concurrently, a second IC chip (which includes PMA2 1132) operates in a mode which is capable of drawing up to 6 A. Altogether, the first and second IC chips have a total current limit of 10 A.

In FIG. 11B, swim lane diagram 1101 shows an operation 1140 performed by PMA2 1132 to transition the second IC chip to a relatively low power mode which is capable of drawing only up to 1 Amp (rather up to 6 A under the preceding mode). Subsequently, PMA2 1132 sends a signal 1141 which informs PMA1 1131 of the decreased current utilization due to operation 1140. Based on signal 1141, PMA1 1131 sends a signal 1142 which requests that VR 1130 transition to a more power efficient mode with a lower current limit (in this example scenario, to request a total consumption of up to 4 A by the first IC chip and the second IC chip). Based on signal 1142, VR 1130 performs an operation 1143 to transition to the mode requested by signal 1142, after which a signal 1144 is sent to confirm to PMA1 1131 that a total current draw of 4 A is now supported by VR 1130.

Figure 11C:
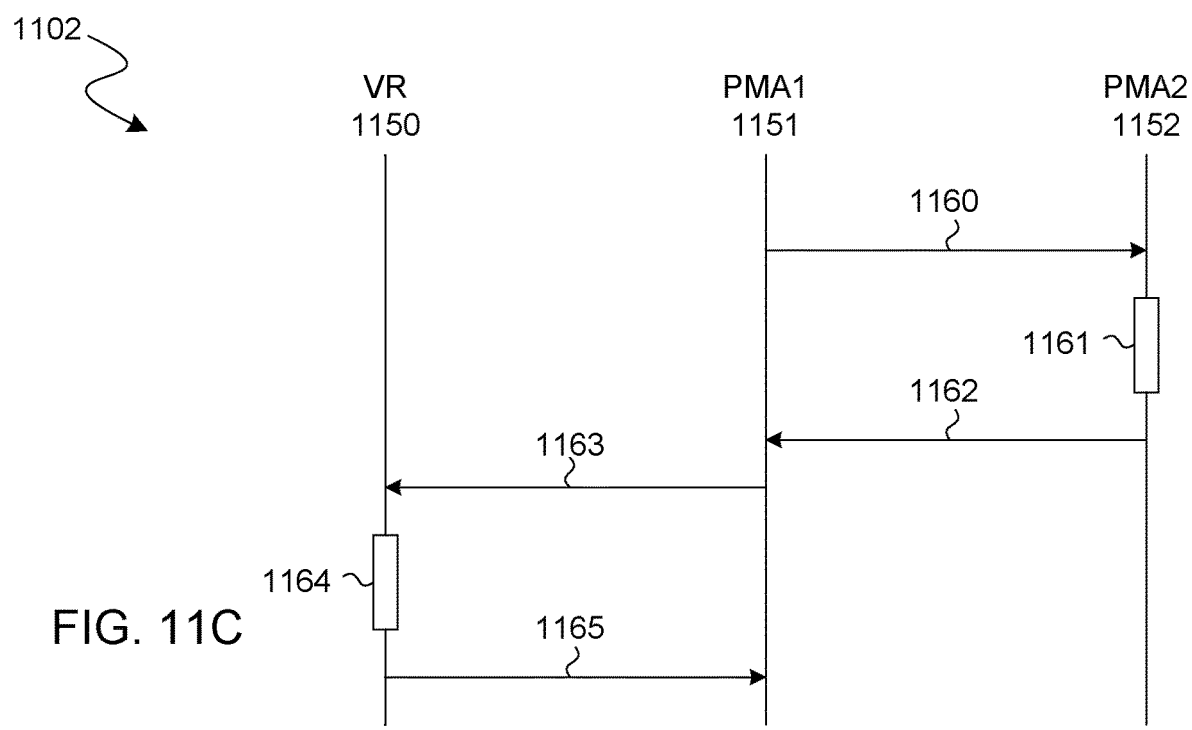

Referring now to FIG. 11C, swim lane diagram 1102 shows another example of additional or alternative communications and operations which are variously performed with a voltage regulator VR 1150, and with power management circuits PMA1 1151, PMA2 1152 which each reside on a different respective IC chip. At a beginning of the time represented in swim lane diagram 1102, a first IC chip (which includes PMA1 1151) operates in a mode which is capable of drawing up to 2 A of current. Concurrently, a second IC chip (which includes PMA2 1152) operates in a mode which is capable of drawing up to 6 A. Altogether, the first and second IC chips have a total current limit of 10 A.

In FIG. 11C, swim lane diagram 1102 shows a signal 1160 which PMA1 1151 sends to PMA2 1152 to indicate that the first IC chip is ready to transition to a relatively low power mode. Based on signal 1160, PMA2 1152 performs an evaluation, and determines that is able to perform an operation 1161 to transition the second IC chip to a more power efficient mode which is capable of drawing only up to 1 Amp (rather up to 6 A under the currently-implemented mode of the second IC chip). PMA2 1152 then sends to PMA1 1151 a signal 1162 which confirms that the second IC chip has transitioned to the more power efficient mode, and second IC chip will require only up to 1 A under said mode. Based on signal 1162, PMA1 1151 sends to VR 1150 a signal 1163 which requests that the VR 1150 transition to a relatively more efficient, low power mode which supports a total consumption of up to 4 A by the first IC chip and the second IC chip. In response to signal 1163, VR 1150 performs an operation 1164 to transition to the requested mode, and sends to PMA1 1151 a signal 1165 which confirms that lower power mode is now entered.

Figure 11D:
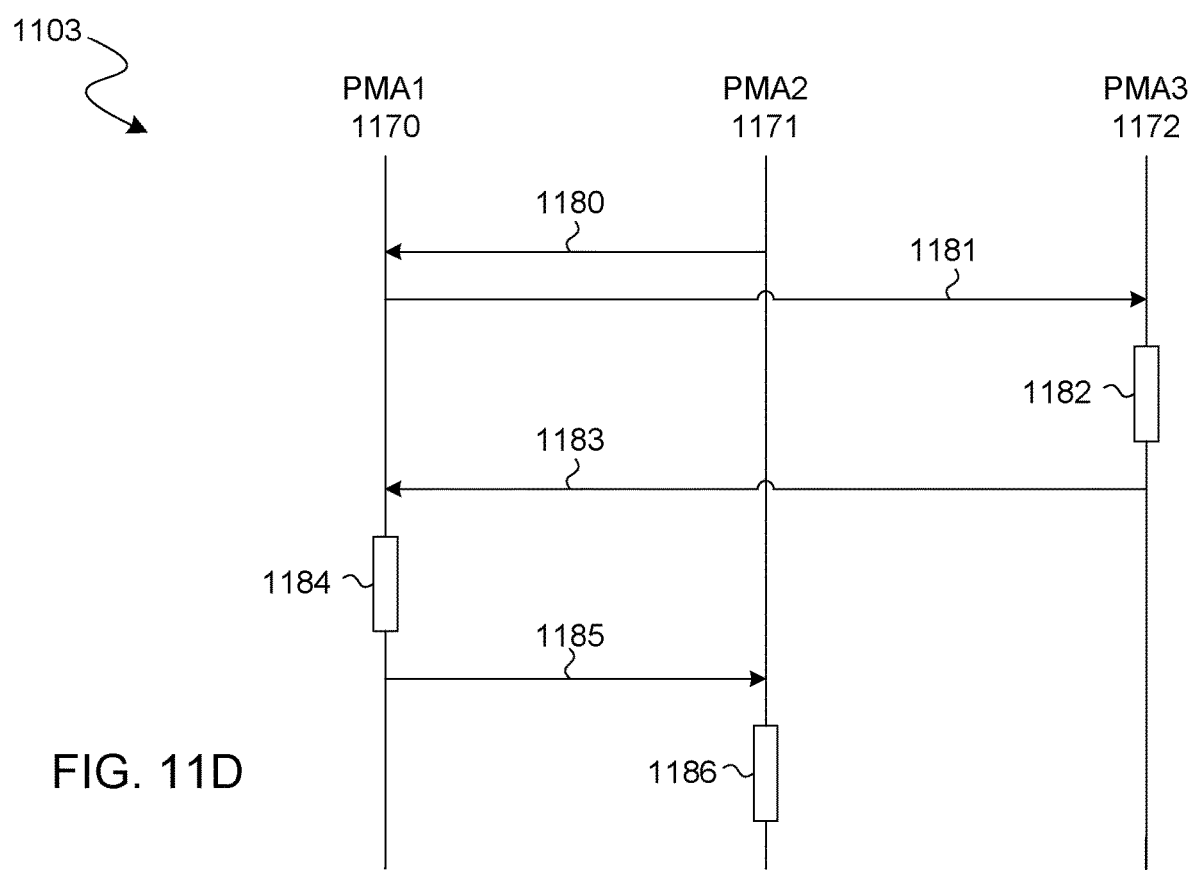

Referring now to FIG. 11D, swim lane diagram 1103 shows one example of communications and operations which are variously performed with power management circuits PMA1 1170, PMA2 1171, PMA3 1172 which each reside on a different respective IC chip. At a beginning of the time represented in swim lane diagram 1103, a first IC chip (which includes PMA1 1170) operates in a mode which is capable of consuming up to 10 Watts (WITH) of power. Concurrently, a second IC chip and a third IC chip (which include PMA2 1171 and PMA3 1172, respectively) each operate in a respective mode which is capable of consuming up to 20 WITH. The total amount of power that can be delivered to the first, second, and third IC chips at any given time is limited to 50 W.

In FIG. 11D, swim lane diagram 1103 shows a signal 1180 which PMA2 1171 sends to PMA1 1170, the signal 1180 to request that the second IC chip be given a 30 WITH upper limit of power consumption. Based on signal 1180, PMA1 1170 sends to PMA3 1172 a signal 1181 which requests that the third IC chip be transitioned to a mode which supports a power consumption of only up to 15 WITH. Based on signal 1181, PMA3 1172 performs an operation 1182 to transition the third IC chip to the requested mode. Subsequently, PMA3 1172 sends to PMA1 1170 a signal 1183 which confirms that the third IC chip is currently configured to consume only up to 15 WITH. Based on signal 1183, PMA1 1170 performs an operation 1184 to transition the first IC chip to a lower power mode (in this example, one which supports a power consumption of only up to 5 WITH). PMA1 1170 then sends to PMA2 1171 a signal 1185 which confirms that, due to the respective power mode transitions by the first IC chip and the third IC chip, the second IC chip can be allowed up to 30 WITH of power consumption. Based on signal 1185, PMA2 1171 performs an operation 1186 to transition the second IC chip to a relatively high power mode.

Temperature-Based Management of Power Delivery to a Processor

Some embodiments variously provided a system which controls a power delivery element (PD) to prevent a processor wakeup in a long sleep duration due to temperature changes. For example, such a system uses a CPU which at deep sleep loses almost all of its resources, but still has one rail to provide a minimal power delivery—e.g., to the CPU. The PD has several working points that are set according to the maximal current consumption for this rail. Selecting a work point that matches higher current consumption may result in a higher power consumption by the PD element. In some embodiments, the system uses a manager of the PDx element. The manager can communicate with both CPU and power delivery element. The management may use a minimal set of resources to function. In some embodiments, the system uses a programmable thermal sensor. The thermal sensor is capable of generating an interrupt when a sensed temperature goes up or below from a threshold in given interval. For example, when a sensed temperature is out of a normal range within a given internal, an interrupt may be generated.

By way of illustration and not limitation, the precise control of a power delivery element is provided, according to some embodiments, with the following:

(a) Just prior to entering sleep state, a CPU estimates current requirements for each of its rails—e.g., including estimated currents to be variously provided with a given rail x, each for a different respective temperature range of a set of temperature ranges for the processor. In one example, scenario, some rail x should provide some current level $I_0$ for a temperature range of 0° C. to 30° C., another current level $I_1$ for a temperature range of 30° C. to 60° C., yet another current level $I_2$ for a temperature range of 60° C. to 90° C., and still another current level $I_3$ for a temperature range of 90° C. and above.

(b) The CPU deliver such temperature-to-current mapping information to the PDx element manager.

(c) The PDx element manager determines a current temperature of the processor, and sets the PDx element working point according to the current-temperature map that was delivered to it by the CPU. It then programs a programmable thermal sensor to trigger an interrupt if the CPU temperature goes outside of the interval.

(d) The PDx element manager can remove all power delivery resources except for an interrupt detection mechanism coming from the programmable thermal sensor.

(e) If the temperature exceeds the programmed interval, the programmable thermal sensor will wake up the PDx element manager. The PDx element can now continue from stage (c) above.

Figure 12:
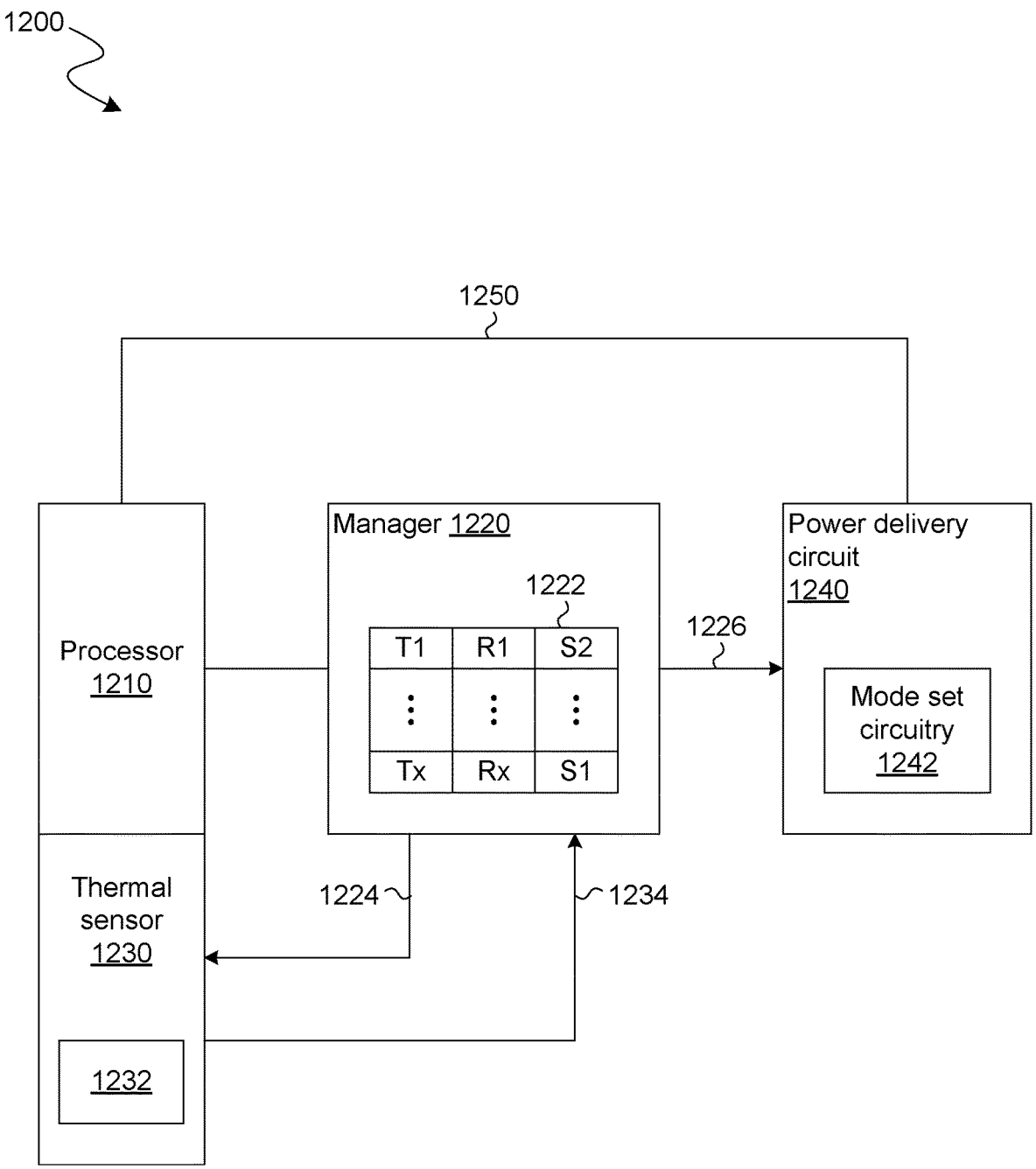
FIG. 12 illustrates a functional block diagram showing features of a system to manage a delivery of power to a processor according to an embodiment.

FIG. 12 shows features of a system 1200 to manage a delivery of power to a processor according to an embodiment. System 1200 is one example of an embodiment wherein circuitry, which is external to a processor, is operable to monitor a thermal condition of the processor and, based on such monitoring, to change a delivery of power to the processor while the processor remains in a sleep (or other low power) state. In various embodiments, system 1200 further includes other features of the processor 600, of one of devices 100, 150, and/or of one or more of the systems 400, 900, 1400 or 1700 described herein—e.g., where system 1200 is further operable to participate in one or more of the methods 200, 500, 800, 1000, 1500, 1800 described herein.

As shown in FIG. 12, system 1200 comprises a processor 1210, a manager 1220, a programmable thermal sensor 1230, and a power delivery circuit 1240 which are variously coupled to facilitate efficient power delivery from power delivery circuit 1240 to processor 1210. Power delivery circuit 1240 is coupled to provide power to processor 1210 via a rail 1250—e.g., wherein power delivery circuit 1240 comprises any of various buck (or other) converter circuits which support operation according to any of multiple modes for power delivery. By way of illustration and not limitation, power delivery circuit 1240 includes some or all features of VR 420, for example.

Processor 1210 is thermally coupled to thermal sensor 1230, which monitors a thermal condition of an environment which includes some or all of processor 1210. Thermal sensor 1230 is programmable—e.g., by manager 1220—to output a signal indicating the detection of given thermal condition which is predetermined to be of interest. In various embodiments, system 1200 omits (but facilitates coupling to, and operation with) one or both of processor 1210 and power delivery circuit 1240. Alternatively or in addition, system 1200 comprises an integrated circuit chip which includes two or more of processor 1210, manager 1220, power delivery circuit 1240 and thermal sensor 1230.

Manager 1220 includes, is coupled to access, or otherwise operates based on some predetermined configuration state (e.g., including the illustrative reference information 1222 shown) which specifies or otherwise indicates a correspondence of various thermal conditions each with a respective mode of power delivery by power delivery circuit 1240. For example, reference information 1222 comprises a table (or other suitable data structure), entries of which variously correspond thermal conditions T1, . . . , Tx with respective power delivery requirements R1, . . . , Rx of processor 1210, and further with respective operational modes of power delivery circuit 1240.

In the example embodiment show, reference information 1222 indicates that a thermal condition T1 (of an environment which includes some or all of processor 1210) corresponds to a power delivery requirement R1 of processor 1210, which in turn corresponds to an operational mode S2 of power delivery circuit 1240. For example, the power delivery requirement R1 includes a minimum required current to be drawn by processor 1210 via rail 1250. In one such embodiment, operational mode S2 is a lowest power mode of power delivery circuit 1240 which is sufficient to accommodate power delivery requirement R1. By contrast, as indicated by reference information 1222, another thermal condition Tx of the environment corresponds to a power delivery requirement Rx of processor 1210 (e.g., including a different minimum required current), which in turn corresponds to an operational mode S1 of power delivery circuit 1240.

Reference information 1222 is provided to manager 1220, for example, by a manufacturer of one or both of processor 1210 and power delivery circuit 1240, or by a distributor, retailer, engineer or other external agent—e.g., wherein the received reference information comprises updated power delivery and/or power requirement information. In an embodiment, receiving reference information 1222 comprises manager 1220 receiving a value indicating an updated performance characteristic of one of processor 1210 or power delivery circuit 1240. Some embodiments are not limited with respect to a particular source from which, and/or mechanism by which, reference information 1222 is provided to manager 1220.

In various embodiments, reference information 1222 indicates a correspondence of thermal conditions each with a different respective mode of a plurality of modes of power delivery circuit 1240, wherein the plurality of modes are each to deliver power to processor 1210 during a particular power state of processor 1210. In one such embodiment, the power state disables an ability of processor 1210 (if any) to detect or otherwise determine whether power delivery circuit 1240 is to be transitioned between modes for variously delivering power via rail 1250. Alternatively or in addition, the power state disables software execution with processor 1210, for example.

Based on reference information 1222, manager 1220 provides a signal 1224 which sets a trigger condition of thermal sensor 1230—e.g., wherein signal 1224 communicates trigger information 1232 indicating a thermal condition which is to cause thermal sensor 1230 to interrupt, wake up or otherwise notify manager 1220. Based on trigger information 1232, thermal sensor 1230 monitors a thermal state to detect whether or not the trigger condition indicated by trigger information 1232 has been satisfied.

At some point during operation of system 1200, thermal sensor 1230 sends a signal 1234 to manager 1220 in response to an indication that the trigger condition is satisfied. For example, signal 1234 specifies or otherwise indicates a thermal condition which has been detected, wherein, based on the indicated thermal condition, manager 1220 accesses reference information 1222 to identify a corresponding mode of power delivery circuit 1240.

In response to signal 1234 (and based on reference information 1222), manager 1220 generates a signal 1226 to control a transition of power delivery circuit 1240 between two of the plurality of modes. In various embodiments, signal 1226 operates one or more switch circuits and/or other suitable circuitry (represented as the illustrative mode set circuitry 1242 shown) to transition power delivery circuit 1240 to a relatively more power efficient mode. In one such embodiment, the same power state of processor 1210 is to be maintained after the transition—e.g., wherein software execution and/or some or all power management functionality at processor 1210 continues to be disabled after the mode transition by power delivery circuit 1240.

Figure 13:
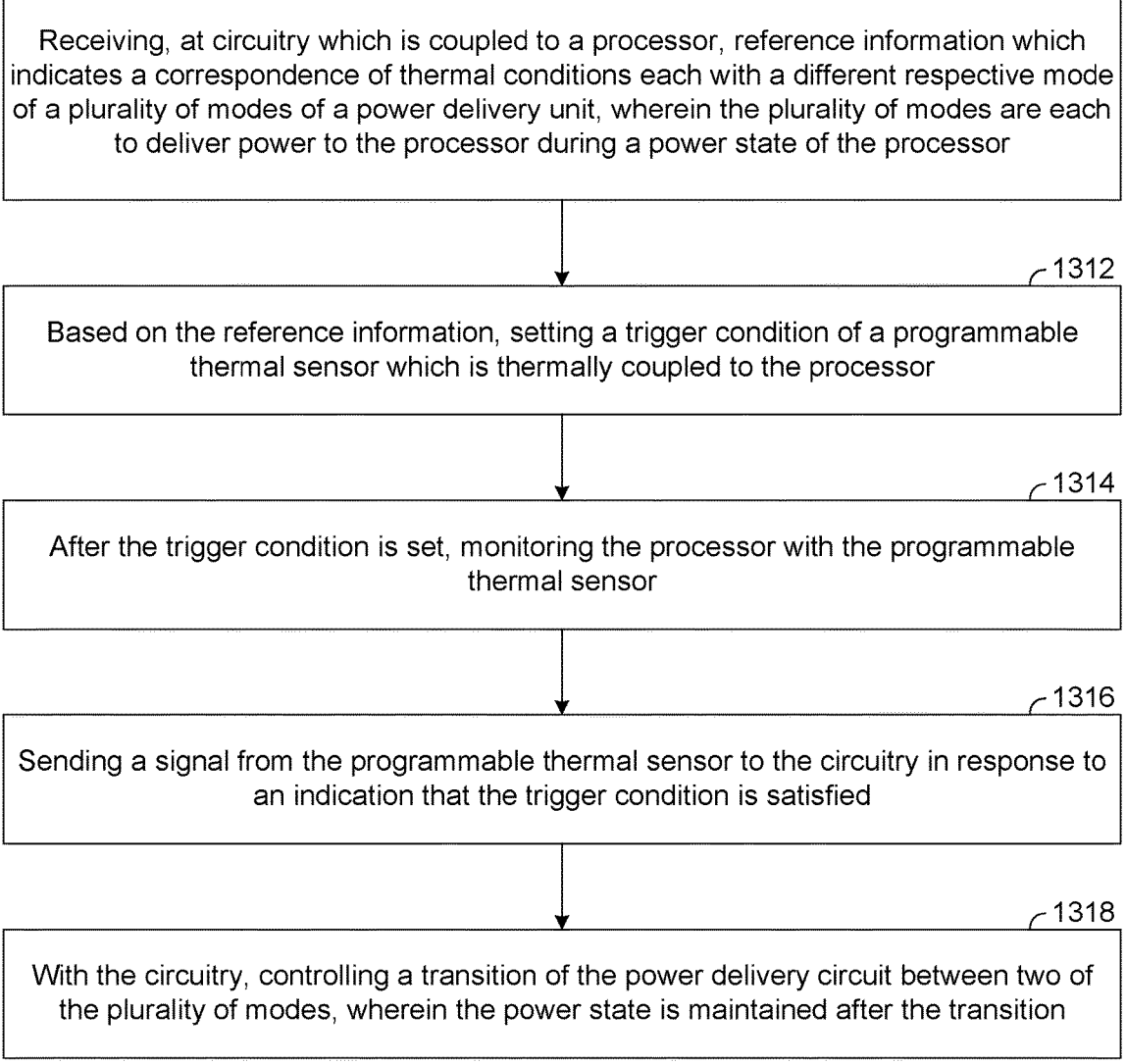
FIG. 13 illustrates a flow diagram showing features of a method to provide power to a processor based on a thermal condition according to an embodiment.

FIG. 13 shows features of a method 1300 to provide power to a processor based on a thermal condition according to an embodiment. Method 1300 is one example of an embodiment wherein a working point of circuitry is automatically updated, by power management logic which external to a processor, to improve an efficiency with which the circuitry delivers power to the processor while the processor remains in the low power state. In various embodiments, some or all of method 1300 is performed with circuitry which provides functionality of system 1200, for example.

As shown in FIG. 13, method 1300 comprises (at 1310) receiving reference information at circuitry which is coupled to a processor. The reference information indicates a correspondence of thermal conditions each with a different respective mode of a plurality of modes of a power delivery circuit (wherein the plurality of modes are each suitable to deliver power to the processor during the same power state of the processor). In various embodiments, receiving the reference information at 1312 comprises the circuitry receiving first information, from the processor, which indicates a correspondence of power delivery requirements of the processor each with a different respective one of the thermal conditions. The receiving at 1312 further comprises the circuitry receiving second information which indicates respective performance characteristics of each of the plurality of modes (where some or all such performance characteristics each satisfy a respective one of the power delivery requirement at least in part).

For example, the reference information identifies multiple electrical current requirements (and/or voltage requirements) of the processor as each corresponding to a different respective thermal condition. Although various embodiments are not limited in this regard, the receiving at 1310 comprises (for example) the circuitry receiving one or more values which each represent or otherwise indicate a respective updated performance characteristic of one of the processor or the power delivery circuit.

In an example embodiment, the processor, the circuitry, the reference information, and the power delivery circuit correspond functionally to processor 1210, manager 1220, reference information 1222, and power delivery circuit 1240 (respectively). Additionally or alternatively, an integrated circuit chip comprises both the processor and the circuitry, for example.

Based on the reference information received at 1310, method 1300 further sets a trigger condition (at 1312) of a programmable thermal sensor—e.g., sensor 1230—which is thermally coupled to the processor. The trigger condition includes or otherwise determines a thermal condition which, if detected, is to result in the generation of an output signal by the programmable thermal sensor. For example, based on multiple electrical current (and/or voltage) requirements indicated by the reference information, the programmable thermal sensor is set to generate an interrupt or other message in response to the detection of a thermal condition which has been identified as corresponding to a particular one of the multiple requirements. In one such embodiment, the setting at 1312 comprises manager 1220 communicating trigger information 1232 to thermal sensor 1230 via signal 1224.

After the trigger condition is set at 1312, method 1300 further monitors the processor (at 1314) with the programmable thermal sensor—e.g., including thermal sensor 1230 regularly sensing a thermal state of an environment which includes some or all of processor 1210. In one embodiment, the processor remains in one power state throughout the monitoring at 1314—e.g., wherein the power state is a sleep state (or other such low power state) during which the processor is unable to independently determine whether the power delivery circuit is to transition between modes.

Method 1300 further comprises (at 1316) sending a signal from the programmable thermal sensor to the circuitry in response to an indication—detected by the monitoring at 1314—that the trigger condition is satisfied. For example, the sending at 1316 comprises thermal sensor 1230 communicating signal 1234 to wake up manager 1220.

Method 1300 further comprises (at 1318) with the circuitry, controlling a transition of the power delivery circuit between two of the plurality of modes. For example, in response to the interrupt, the circuitry identifies a mode of the power delivery circuit which—by virtue of a corresponding power delivery requirement of the processor—corresponds to the detected thermal condition. The power state of the processor (which existed during the monitoring at 1314) is maintained after the transition—e.g., the power state disables software execution with the processor and/or disables any independent determination by the processor as to whether or when the power delivery circuit is to transition between modes. In an example embodiment, the controlling at 1318 comprises manager 1220 sending to mode set circuitry 1242 the signal 1226 which identifies a new operational point with which power delivery circuit 1240 is to deliver power to processor 1210 via rail 1250.

Selection of a Repository to Store Processor State

Figure 14:
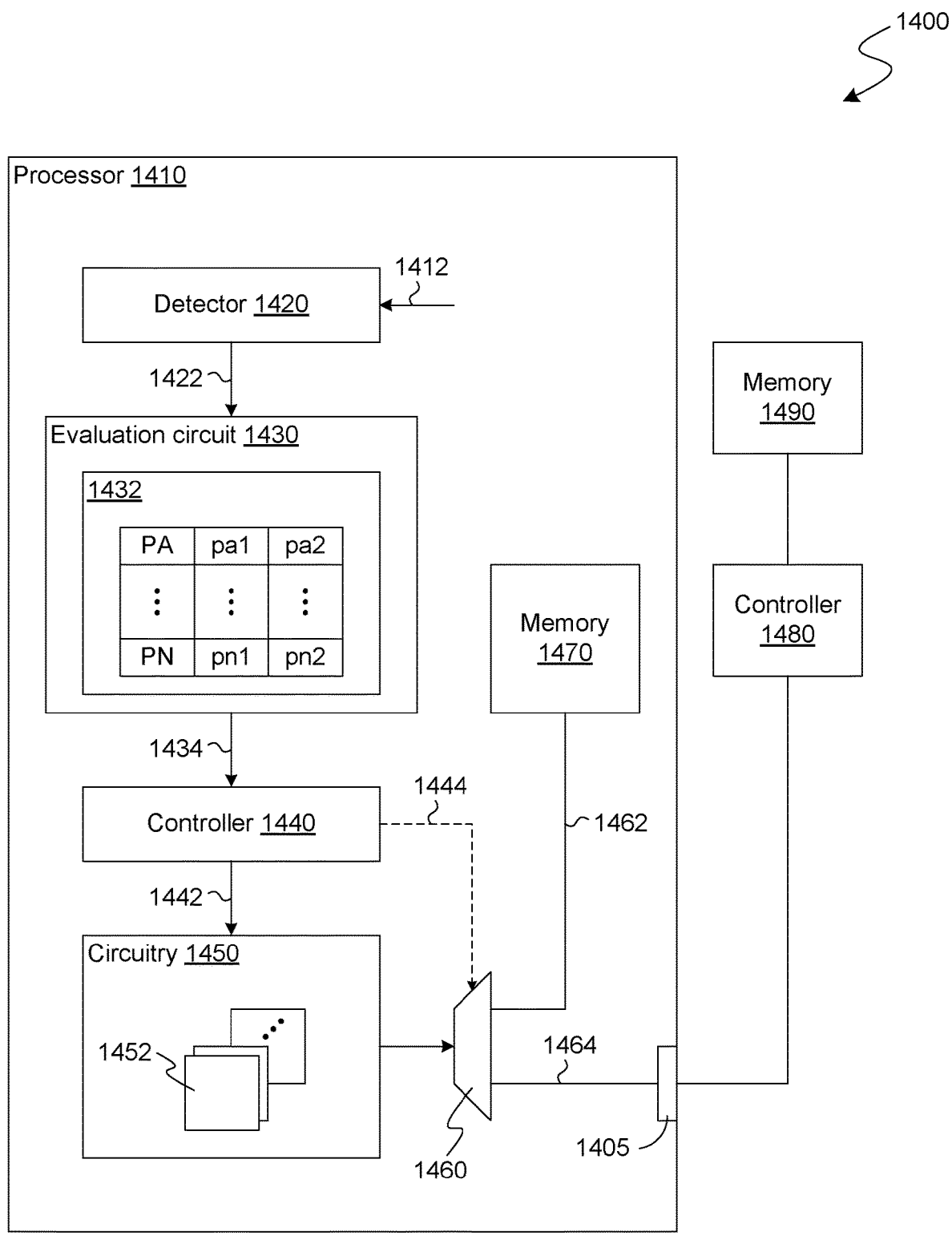
FIG. 14 illustrates a functional block diagram showing features of a system to selectively determine a repository which is to store state of a processor according to an embodiment.

FIG. 14 shows features of a system 1400 to selectively determine a repository which is to store state of a processor according to an embodiment. System 1400 is one example of an embodiment wherein a processor is operable to dynamically estimate whether an internal resource of the processor, or some external memory resource, is likely to be a more power efficient repository of processor state. In various embodiments, system 1400 further includes other features of the processor 600, of one of devices 100, 150, and/or of one or more of the systems 400, 900, 1200, or 1700 described herein—e.g., where system 1400 is further operable to participate in one or more of the methods 200, 500, 800, 1000, 1300, 1800 described herein.

As shown in FIG. 14, system 1400 comprises a processor 1410 and a memory 1490 which is coupled thereto—e.g., via hardware interface 1405 of processor 1410 and a controller 1480. Processor 1410 comprises circuitry 1450 (e.g., including one or more registers, some or all of an execution pipeline, and/or the like) and a memory 1470 which is available to store a state of circuitry 1450. In one example embodiment, memory 1470 comprises a static random-access memory (SRAM), wherein memory 1490 comprises a dynamic random-access memory (DRAM).

Processor 1410 further comprises a detector 1420, an evaluation circuit 1430, and a controller 1440 which are variously coupled to one another to facilitate the selective storage of processor state to a particular one of memories 1470, 1490. For example, processor 1410 further comprises multiplexer/demultiplexer (mux/demux) circuitry 1460 which is coupled between circuitry 1450 and each of memory 1470 and hardware interface 1405. Responsive to controller 1440, mux/demux circuitry 1460 is operable to communicate processor state, via a path 1462, for storage at memory 1470 or (alternatively) to communicate such processor state—via a path 1464, hardware interface 1405, and controller 1480—for storage at memory 1470. Mux/demux circuitry 1460 is further operable to selectively retrieve processor state to circuitry 1450 from a selected one of memories 1470, 1490.

In the example embodiment shown, detector 1420 is coupled to receive a signal 1412 which specifies or otherwise indicates that a power state transition of processor 1410 is to be performed. For example, signal 142 indicates that processor 1410 is to be transitioned to a power state which does not support the maintenance of at least some processor state (represented as state information 1452) at circuitry 1450. Signal 1412 is provided by any of a variety of sources which are internal (or alternatively, external) to processor 1410—e.g., wherein generation of signal 1412 includes one or more operations which, for example, are adapted from conventional power management techniques for initiating a power state transition. Some embodiments are not limited to a particular source from which signal 1412 is received, or a particular basis on which signal 1412 is generated.

Based on signal 1412, detector 1420 identifies a predicted length of time that processor 1410 is to be in the indicated power state. In an embodiment, determining the predicted length of time includes one or more operations which, for example, are adapted from conventional power management techniques for estimating future power demands of a processor. Such conventional techniques are not limiting on some embodiments, and are not detailed herein to avoid obscuring certain features of various embodiments.

Evaluation circuit 1430 is coupled to receive from detector 1420 a signal 1422 which specifies or otherwise indicates the predicted length of time that processor 1410 is to be in the power state indicated by signal 1412. Based on the predicted length of time, evaluation circuit 1430 performs a calculation to detect a relative benefit of storing state information 1452 to one of memories 1470, 1490 over storing state information 1452 to the other of memories 1470, 1490.

For example, evaluation circuit 1430 includes, is coupled to access, or otherwise operates based on configuration state (e.g., including the illustrative reference information 1432 shown) which indicates, for each of memories 1470, 1490, a respective one or more resource requirements to operate the memory. Reference information 1432 is provided, for example, by a manufacturer of one or both of processor 1410 and memory 1490, or by a distributor, retailer, engineer or other external agent—e.g., wherein the received reference information 1432 comprises updated performance characteristic information. Some embodiments are not limited with respect to a particular source from which, and/or mechanism by which, reference information 1432 is provided to processor 1410.

In the example embodiment shown, reference information 1432 includes a table (or other suitable data structure), entries of which identify—for one or more of the illustrative operational parameters PA, . . . , PN shown—respective values pa1, . . . , pn1 which variously describe operation of memory 1470. Alternatively or in addition, reference information 1432 identifies, for the same and/or others of parameters PA, . . . , PN—respective values pa2, . . . , pn2 which variously describe operation of memory 1490. Based on resource requirements indicated by reference information 1432, evaluation circuit 1430 performs a calculation to detect a relationship between first resource requirements to store processor state to memory 1470, and second resource requirements to store processor state to memory 1490.

In various embodiments, the calculation performed by evaluation circuit 1430 is based on one or more parameter values including, for example, a value T1 indicating a length of time required to write a reference amount of data to memory 1470, and/or a value P1 indicating an amount of power required to retain the reference amount of data in memory 1470. Additionally or alternatively, the one or more parameter values include a value T2 indicating a length of time required to write the reference amount of data to memory 1490, and/or a value E2 indicating an amount of energy required to write the reference amount of data to memory 1490 and to read the reference amount of data from memory 1490.

Additionally or alternatively, the one or more parameter values include a value Pi indicating an amount of power consumed by processor 1410 during a reference period of time. In one such embodiment, evaluation circuit 1430 performs the calculation based on a ratio of a first value to a second value, wherein the first value is based on the value Pi, and wherein the second value is based on the value P1. The first value, in some embodiments, is further based on a difference between the value T2 and the value T1. Particular examples of such calculations are detailed in the description of method 1500 herein.

Based on the calculation, evaluation circuit 1430 provides to controller 1440 a signal 1434 which identifies one of memories 1470, 1490 as a preferred repository for state information. Based on signal 1434, controller 1440 variously signals circuitry 1450 and mux/demux circuitry 1460 to store state information 1452 to the selected one of memories 1470, 1490. For example, controller 1440 sends a signal 1442 to indicate that circuitry 1450 is to output state information 1452 to mux/demux circuitry 1460. Furthermore, controller 1440 provides to mux/demux circuitry 1460 a control signal 1444 which selects one of paths 1462, 1464 to communicate state information 1452 to the corresponding one of memories 1470, 1490.

Figure 15:
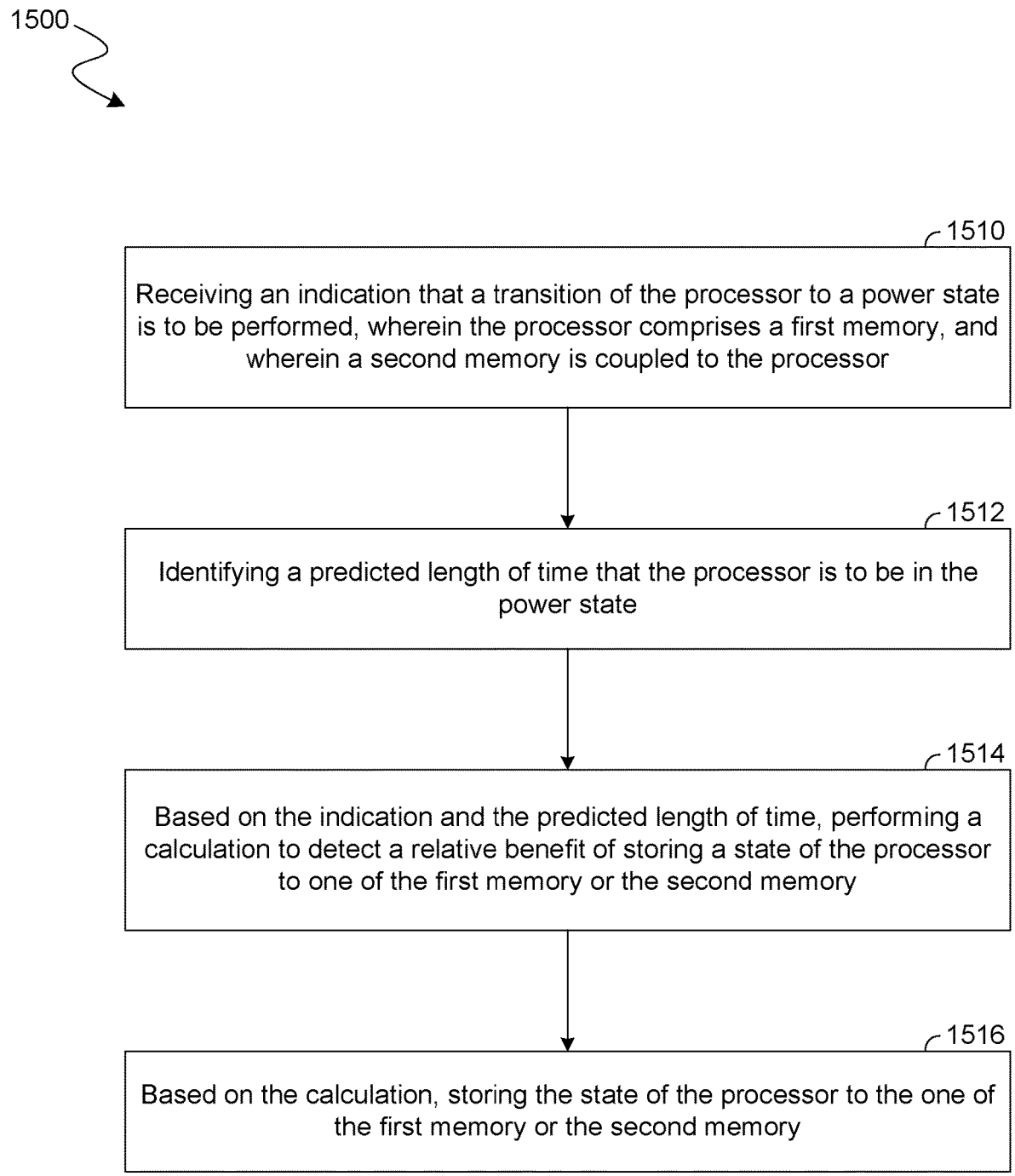
FIG. 15 illustrates a flow diagram showing features of a method to selectively store processor state to one of multiple available memory resources according to an embodiment.

FIG. 15 shows features of a method 1500, according to an embodiment, to selectively store processor state to one of multiple available memory resources. Method 1500 is one example of an embodiment wherein performance characteristics of a processor are evaluated to determine, based on a predicted period of time that the processor will be in a low power state, whether it is more power efficient to store processor state to local memory or to an external memory. In various embodiments, method 1500 is performed with circuitry which provides functionality such as that of system 1400.

As shown in FIG. 15, method 1500 comprises (at 1510) receiving an indication that a transition of the processor to a power state is to be performed, wherein the processor comprises a first memory, and wherein a second memory is coupled to the processor. For example, the receiving at 1510 comprises detector 1420 receiving the signal 1412, which specifies or otherwise indicates that processor 1410 is to be transitioned to a low power state which is unable to maintain state information 1452 at circuitry 1450. In one embodiment, the first memory comprises a static random-access memory (SRAM) of the processor, and the second memory comprises a dynamic random-access memory (DRAM).

Method 1500 further comprises (at 1512) identifying a predicted length of time that the processor is to be in the power state. For example, the identifying at 1512 is based on signal 1412 and/or other available information which is available to detector 1420, where the information specifies or otherwise indicates an estimated duration of the power state. The identifying at 1512 includes one or more operations which (for example) are adapted from conventional power management techniques for estimating future processor use. Such conventional techniques are not detailed herein, and are not limiting on certain embodiments.

Method 1500 further comprises (at 1514) performing a calculation, based on the indication and the predicted length of time, to detect a relative benefit of storing a state of the processor to one of the first memory or the second memory over storing the state of the processor to the other of the first memory or the second memory. For example, the calculating at 1514 comprises evaluation circuit 1430 identifying, based on reference information 1432, one or more values which each describe a performance characteristic associated with a respective one of the first memory or the second memory.

By way of illustration and not limitation, performing the calculation at 1514 is based on one or more parameters including (for example) a length of time required to write a reference amount of data to the first memory, an amount of power required to retain the reference amount of data in the first memory, and a length of time required to write the reference amount of data to the second memory. Alternatively or in addition, the one or more parameters include (for example) an amount of energy required to both write the reference amount of data to the second memory and read the reference amount of data from the second memory, and an amount of power consumed by the processor during a reference period of time.

For example, in an illustrative scenario according to one embodiment, an energy amount Esram needed to use the first memory (e.g., a SRAM) as a repository for processor state is represented by the following equation:

$$\text{Esram} = [(T1)(Pi) + (P1)(Tx)], \quad (1)$$

where:
T1 represents a length of time required to write some reference amount of data to the first memory;
P1 represents an amount of power required to retain the reference amount of data in the first memory; and
Tx represents the predicted length of time that the processor will be in the power state.

By contrast, an energy amount Edram needed to use the second memory (e.g., a DRAM) as a repository for processor state is represented by the following equation:

$$\text{Edram} = [E2 + (T2)(Pi)], \quad (2)$$

where:
E2 represents an amount of energy required by the memory subsystem (external to the processor) to write the reference amount of data to the second memory and to read the reference amount of data from the second memory;
T2 represents a length of time required to write the reference amount of data to the second memory; and
Pi represents an amount of power consumed by the processor during some reference period of time.

In view of equations (1) and (2) above, it is preferable—in this example scenario—to save processor state to the first memory (as opposed to the second memory) where the performing at 1514 calculates or otherwise detects the following inequality:

$$[(T1)(Pi) + (P1)(Tx) < E2 + (T2)(Pi)], \quad (3)$$

which, in turn, corresponds to the inequality below:

$$Tx < E2 + (T2 - T1)(Pi)/(P1). \quad (4)$$

Therefore, in some embodiments, the performing at 1514 includes one or more calculations to detect whether a predicted length of time that the processor will be in the low power state is less than the ratio shown on the right hand side of inequality (4) shown above. Accordingly, in some embodiments, the calculating at 1514 is based on a ratio of a first value to a second value, wherein the first value is based on the value Pi, and wherein the second value is based on the value P1. The first value is further based (for example) on a difference between the value T2 and the value T1.

Based on the calculation performed at 1514, method 1500 (at 1516) stores the state of the processor to the one of the first memory or the second memory which has been identified as a relatively more power efficient repository of said state. In various embodiments, the calculation is performed at 1514 identifies the inequality (4) above, wherein the storing at 1516 comprises storing the state to the first memory. In some embodiments, method 1300 further comprises the processor receiving reference information—prior to the indication being received at 1510—which indicates, for each of the first memory and the second memory, respective resource requirements to operate the memory, wherein the calculation performed at 1514 is further based on the information. In one such embodiment, the reference information (e.g., including one or more values of reference information 1432) updates the description of one or more resource requirements to access a given one of the first memory of the second memory.

Figure 16:
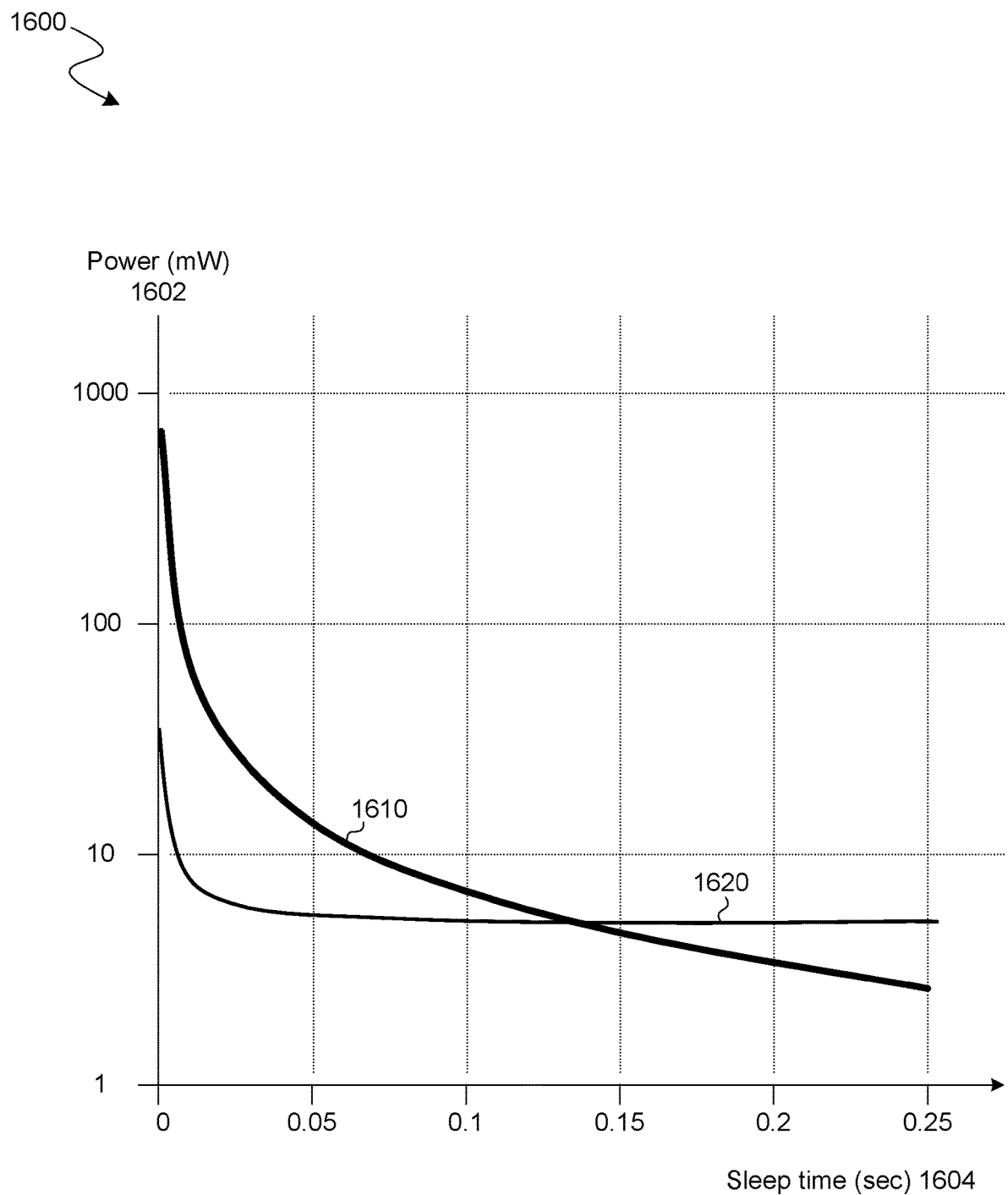
FIG. 16 illustrates a graph diagram showing features of power consumption information which is used to determine a storing of processor state according to an embodiment.

FIG. 16 shows a graph 1600 illustrating an amount of power 1602 which is expected to be needed to use a given memory for storing state of a processor. For the given memory, the amount of power 1602 depends at least in part on an expected amount of time 1604 that the processor will be in a power state (a sleep state, for example) during which some circuit resource of the processor—e.g., a resource other than an internal memory of the processor—is unable maintain said processor state.

Graph 1600 represents one example of information used in some embodiments—for example, used by evaluation circuit 1430 and/or according to method 1500—to determine whether processor state is to be stored to a local memory of the processor or (alternatively) to an external memory which is coupled to the processor.

As shown in graph 1600, plot 1610 represents, as a function of the expected time 1604, an expected amount of power required for processor state to be written to, maintained at, and read from a DRAM (at memory 1490, for example) that is coupled to a processor. By contrast, plot 1620 represents an expected amount of power required for processor state to be written to, maintained at, and read from a SRAM (at memory 1470, for example) of said processor.

In the example scenario shown, graph 1600 includes a breakeven point—at an expected time duration of approximately 0.14 seconds—where no particular power efficiency can be expected from saving processor state to a given one of the SRAM or the DRAM. Where the expected time duration is less than the breakeven point, it is expected to be relatively more power efficient to save processor state to the SRAM (as compared to saving such state to the DRAM). By contrast, it is expected to be relatively more power efficient to save the processor state to the DRAM if the expected time duration is greater than the breakeven point.

Timing Operations of a Power State Transition Based on Power Gate Latencies

When a processor goes into deep sleep state (e.g., package state C10), few of its rails are being power gated by a platform power gate that is implemented by an OEM. Not all power gates have the same latency specification. Some rails are required for the CPU to starts its wakeup process—since they provide the infrastructure voltage for the wakeup process itself (referred to herein as belonging to a rail type of Type 1), some are required for later, during the wakeup process (referred to herein as belonging to a rail type of Type 2).

Some embodiments variously facilitate a communication of a maximum latency (Tinit) of multiple power gates that each couple to a respective Type 1 rail, and/or communication of the respective latencies of power gates that each couple to a respective Type 2 rail. In one such embodiment, a CPU waits for Tinit to expire before it starts an actual waking up, and internally, during the wakeup process, it will wait for a Type 2 latency to expire before using a corresponding Type 2 rails. Certain features of various embodiments are described herein with respect to the timing of operations, by load circuits of a processor, based on different latencies of power gates that are to variously deliver power each to a respective one of said load circuits. However, such features can be extended to apply to embodiments which additionally or alternatively time operations of a processor's load circuits based on different latencies of voltage regulators that are to deliver power each to a respective one of said load circuits.

Figure 17:
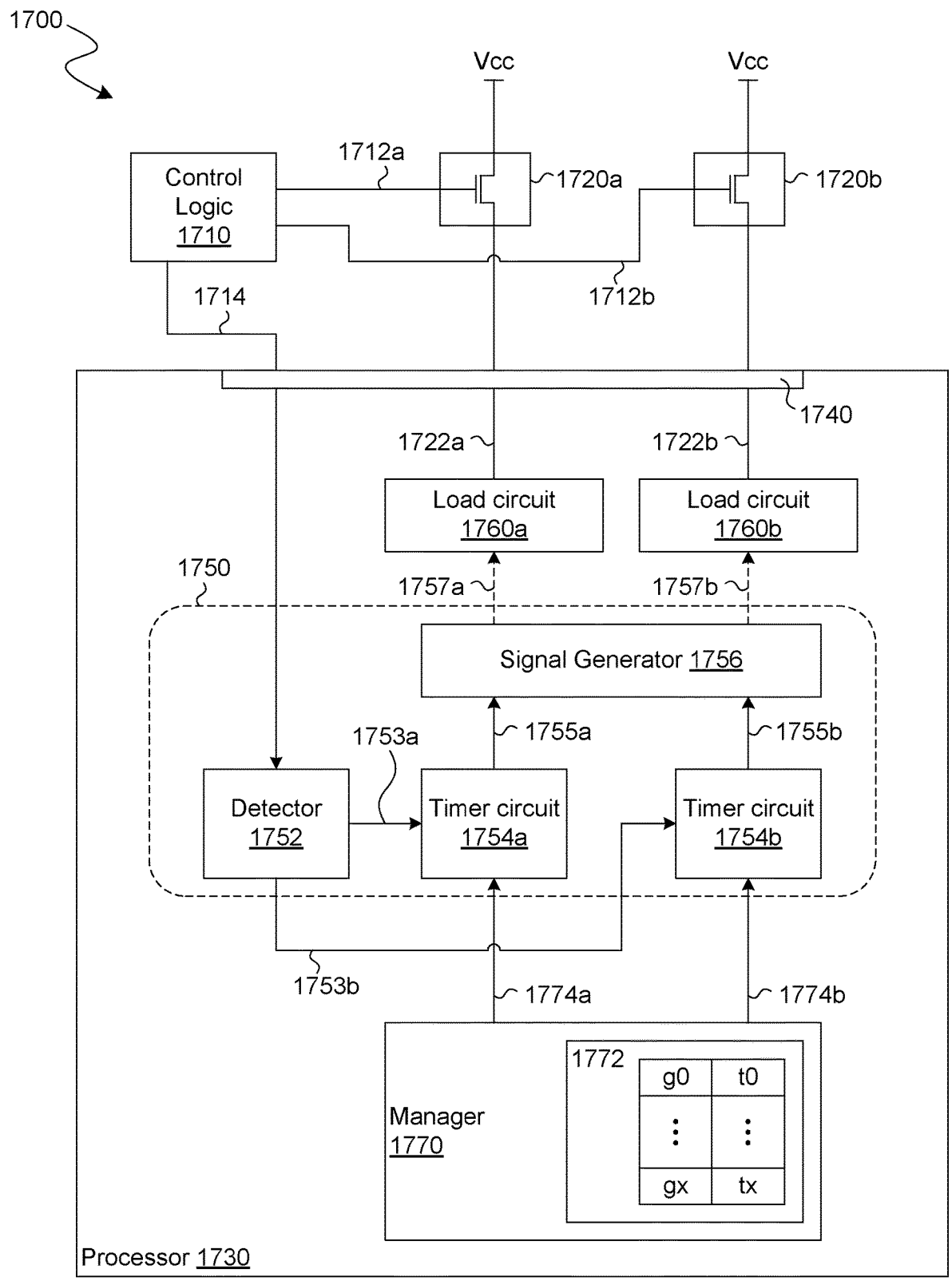
FIG. 17 illustrates a functional block diagram showing features of a system to regulate a power state transition of a processor according to an embodiment.

FIG. 17 shows features of a system 1700 to regulate a power state transition of a processor according to an embodiment. System 1700 is one example of an embodiment wherein a processor is operable to generate control signals based on values which each indicate a different respective latency of a corresponding power gate (or, in some embodiments, a corresponding voltage regulator) that is coupled to the processor. The control signals are communicated each to a different respective load circuit of the processor, wherein the load circuits initiate respective operations of a power state transition at different times based on the control signals. In an embodiment, the operations are timed to accommodate the various latencies of one or more power gates. In various embodiments, system 1700 further includes other features of the processor 600, of one of devices 100, 150, and/or of one or more of the systems 400, 900, 1200, or 1400 described herein—e.g., where system 1700 is further operable to participate in one or more of the methods 200, 500, 800, 1000, 1300, 1500 described herein.

As shown in FIG. 17, system 1700 comprises a processor 1730 and power gates 1720a, 1720b which are variously coupled thereto via a hardware interface 1740 of processor 1730. Processor 1730 further comprises rails 1722a, 1722b, and load circuits 1760a, 1760b, wherein power gate 1720a is operable to selectively deliver power to load circuit 1760a via rail 1722a, and wherein power gate 1720b is operable to selectively deliver power to load circuit 1760b via rail 1722b. To facilitate such power delivery, control logic 1710 of system 1700 comprises hardware and/or executing software to generate control signals 1712a, 1712b which variously operate power gates 1720a, 1720b (respectively). In various embodiments, system 1700 omits (but facilitates coupling to, and operation with) some or all of control logic 1710 and power gates 1720a, 1720b. Alternatively or in addition, system 1200 comprises an integrated circuit chip which includes two or more of processor 1730, control logic 1710 and power gates 1720a, 1720b.

To efficiently time multiple operations of a power state transition, circuitry 1750 of processor 1730 comprises a detector 1752, timer circuitry (in this example, comprising the illustrative timer circuits 1754a, 1754b shown), and a signal generator 1756. The timer circuitry is operable to detect, based on the signal, a first expiration of the first period of time, and a second expiration of the second period of time, wherein respective portions of the first period of time and the second period of time are concurrent with each other. A first period of time and the second period of time are determined, for example, based on reference information which is used to configure timer circuits 1754*a*, 1754*b* (respectively).

By way of illustration and not limitation, circuitry 1750 couples to (or alternatively, includes) a manager 1770 which provides functionality to configure timer circuit 1754*a* and/or timer circuit 1754*b*. For example, manager 1770 includes, is coupled to access, or otherwise operates based on configuration state (e.g., including the illustrative reference information 1772 shown) which specifies or otherwise indicates, for each of multiple power gates including power gates 1720*a*, 1720*b*, a respective time required to open the power gate. Reference information 1772 is provided, for example, by a manufacturer of one or both of power gates 1720*a*, 1720*b*, or by a distributor, retailer, engineer or other external agent—e.g., wherein the received reference information comprises updated performance characteristic information. Some embodiments are not limited with respect to a particular source from which, and/or mechanism by which, reference information 1772 is provided to manager 1770.

In the example embodiment shown, reference information 1772 comprises a table (or other suitable data structure), entries of which identify a time t0 needed to open a power gate g0, a time tx needed to open a power gate gx, and/or the like. Manager 1770 determines a first duration of a first period of time based on a first reference value which indicates a first latency of power gate 1720*a*. Manager 1770 further determines a second duration of a second period of time based on a second reference value which indicates a second latency of power gate 1720*b*. Based on the determined first duration and second duration, manager 1770 communicates control signals 1774*a*, 1774*b* which (respectively) configure timer circuit 1754*a* for detection of the first period of time, and configure timer circuit 1754*b* for detection of the second period of time.

At some point during operation of system 1700, control logic 1710 generates a signal 1714 which indicates that processor 1730 is to undergo a transition to a power state in which load circuits 1760*a*, 1760*b* receive power via power gates power gate 1720*a*, 1720*b* (respectively). Based on signal 1714, detector 1752 sends a signal 1753*a* for timer circuit 1754*a* to begin detecting for a first expiration of the first period of time. Furthermore, detector 1752 sends another signal 1753*b* for timer circuit 1754*b* to begin detecting for a second expiration of the second period of time.

At different times, signal generator 1756 receives from timer circuits 1754*a*, 1754*b* respective signals 1755*a*, 1755*b* to variously indicate the first expiration and second expiration. In response to signal 1755*a*, signal generator 1756 sends a signal 1757*a* to initiate a first operation of the power state transition at circuit 1760*a*. Similarly, signal generator 1756 sends another signal 1757*b*, in response to signal 1755*b*, to initiate a second operation of the power state transition at circuit 1760*b*. In an embodiment, the first operation is performed with power provided via power gate 1720*a*, and the second operation is performed with power provided via power gate 1720*b*.

Figure 18:
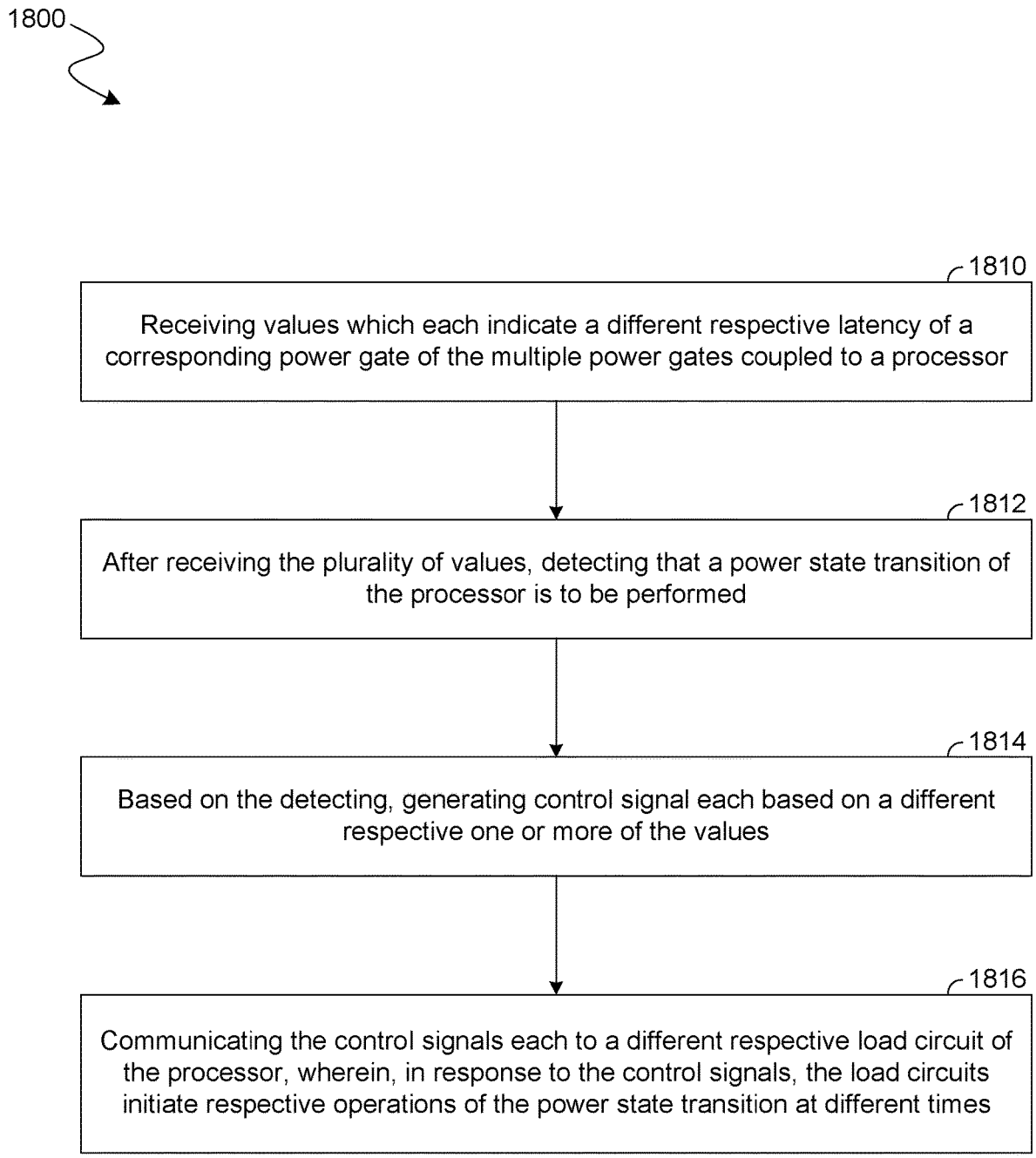
FIG. 18 illustrates a flow diagram showing features of a method to transition a processor between power states according to an embodiment.

FIG. 18 shows features of a method 1800 to transition a processor between power states according to an embodiment. Method 1800 is one example of an embodiment wherein operations of a power state transition, the operations by various circuits of a processor, are initiated at different times to accommodate the respective latencies of multiple power gates that are to deliver power to the processor. In various embodiments, method 1800 is performed with circuitry which provides functionality such as that of system 1700.

As shown in FIG. 18, method 1800 comprises (at 1810) receiving values which each indicate a different respective latency of a corresponding power gate of multiple power gates which are coupled to the processor. The receiving at 1810 comprises (for example) manager 1770 receiving and storing some or all data of reference information 1772. In some embodiments, the receiving at 1810 comprises storing data—communicated to the processor by an external agent—which comprises a first value and a second value indicating (respectively) a first latency of a first power gate and a second latency of a second power gate. In one such embodiment, one of the first value or the second value is to replace another value indicating a previous latency of one of the first power gate or the second power gate.

After receiving the plurality of values at 1810, method 1800 further detects (at 1812) that a power state transition of the processor is to be performed. Based on the detecting at 1812, method 1800 further generates control signals (at 1814) which are each based on a different respective one or more of the values.

By way of illustration and not limitation, the multiple power gates comprise first power gates, wherein generating the control signals at 1812 comprises determining a first duration of a first period of time based on each of first values which indicate respective first latencies of the first power gates. In one such embodiment, the multiple power gates further comprise a second one or more power gates, wherein generating the control signals further comprises determining a second duration of a second period of time based on a second one or more values which indicate a second one or more latencies of the second one or more power gates. For example, the second duration is determined based a latency of only one power gate.

In one example embodiment, determining the first duration based on the first values includes performing a calculation with each of the first values based on a determination that the first plurality of power gates each belong to a first power gate type (e.g., a type of power gates that are required to deliver power concurrently for at least some one or more operations of the power state transition). The first duration is determined, for example, as being equal to (or otherwise based on) a maximum of the respective first latencies of the first power gates. By contrast, the second one or more power gates each belong to a respective power gate type other than the first power gate type.

In an illustrative scenario according to one embodiment, the generating at 1814 comprises operating timer circuitry of the processor to detect a first expiration of a first period of time, and a second expiration of a second period of time, wherein respective portions of the first period of time and the second period of time are concurrent with each other. For example, the generating at 1814 includes or is otherwise based on manager 1770 setting, for each of timer circuits 1754*a*, 1754*b*, a respective count limit or other suitable trigger condition. Subsequently, detector 1752 communicates signals 1753*a*, 1753*b* to initiate respective counts by timer circuits 1754*a*, 1754*b*, which variously generating respective signals 1755*a*, 1755*b* each to indicate an expiration of a corresponding period of time.

Method 1800 further comprises (at 1816) communicating the control signals each to a different respective load circuit of the processor, wherein, in response to the control signals, the load circuits initiate respective operations of the power state transition at different times. For example, the communicating at 1816 comprises signal generator 1756 sending signal 1757a, signal 1757b to load circuit 1760a, load circuit 1760b, respectively.

In an illustrative embodiment, the communicating at 1816 comprises signaling a first load circuit of the processor, based on a first expiration of a first period of time, to perform a first operation of the power state transition with power provided via a first power gate. Furthermore, the communicating at 1816 comprises signaling a second circuit of the processor, based on a second expiration of a second period of time, to perform a second operation of the power state transition with power provided via a second power gate. In one such embodiment, the second period of time expires after the first period of time—e.g., wherein the second operation of the power state transition is based at least in part on a completion of at least some of the first operation.

Figure 19:
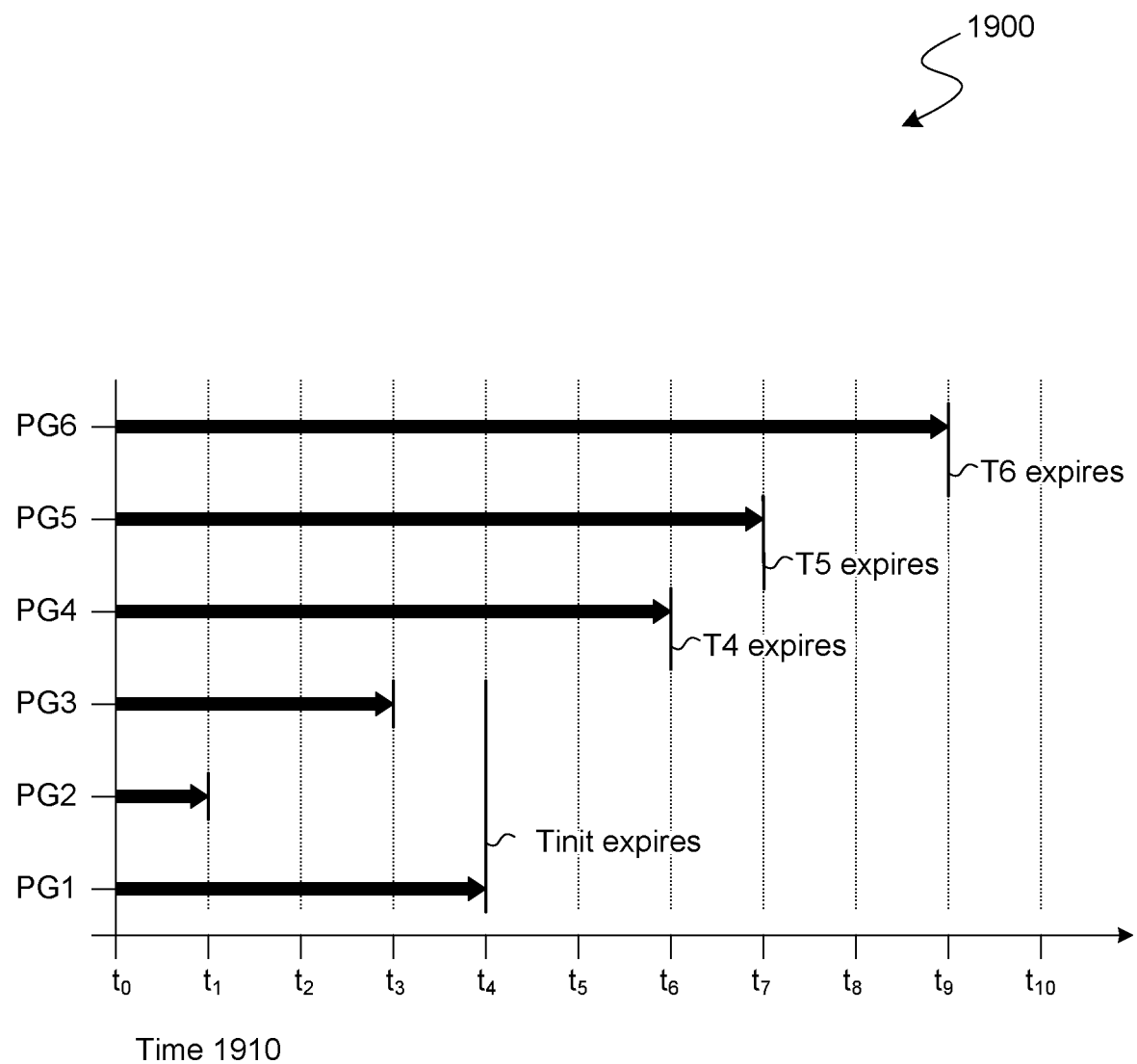
FIG. 19 illustrates a timing diagram showing a sequence of operations to perform a power state transition of a processor according to an embodiment.

FIG. 19 shows a timing diagram 1900 which illustrates respective latencies of power gates that deliver power to a processor according to an embodiment. In FIG. 19, timing diagram 1900 shows how, over time 1910, the power gates variously open to deliver power to the processor. Load circuits of the processor variously initiate power transition operations based on latencies of the power gates—e.g., wherein the initiating is timed with circuitry of system 1700 and/or according to method 1800.

In the example scenario illustrated by timing diagram 1900, a processor comprises first load circuits that initiate respective power transition operations once power is being variously delivered to each of said first load circuits. The processor further comprises a second one or more load circuits that are each to initiate a respective power transition operation independent of whether power is being delivered to any other load circuit. Table 2 below lists one example of latencies, and power gate types, for power gates which are to deliver power to such load circuits.

TABLE 2

Example of Power Gate Types and Latencies

| Power Gate | Gate Type | Latency (μsec) |
| --- | --- | --- |
| PG1 | Type 1 | 120 |
| PG2 | Type 1 | 30 |
| PG3 | Type 1 | 90 |
| PG4 | Type 2 | 180 |
| PG5 | Type 3 | 210 |
| PG6 | Type 4 | 270 |

To facilitate a power state transition by such a processor, first power gates of a gate type 1—in this example, power gates PG1, PG2, PG3—each correspond to a respective one the first load circuits, and respective power transition operations of the first load circuits are initiated based on respective latencies of the first power gates. For example, the power transition operations of the first load circuits are each initiated after expiration of a time Tinit which is equal to a maximum of the respective latencies of power gates PG1, PG2, PG3. By contrast, the respective expirations of times T4, T5, and T6 (which correspond to the respective openings of power gates PG4, PG5, and PG6) each independently trigger the initiation of a power transition operation by a different respective load circuit.

Figure 20:
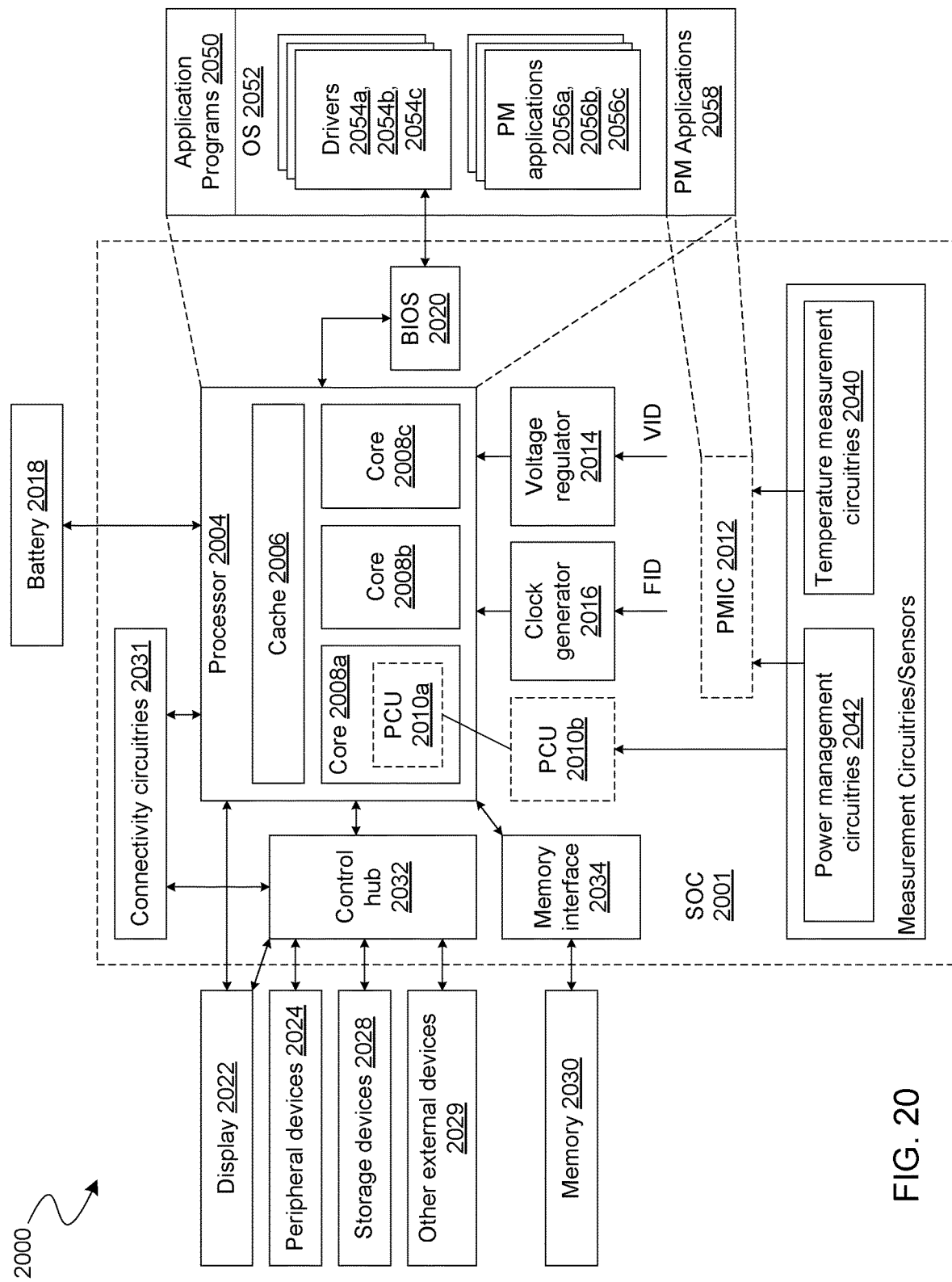
FIG. 20 illustrates a functional block diagram showing features of a computer system to manage power consumption by a processor according to an embodiment.

FIG. 20 illustrates a computer system or computing device 2000 (also referred to as device 2000), where power distribution and/or power consumption is managed in accordance with some embodiments. It is pointed out that those elements of FIG. 20 having the same reference numbers (or names) as the elements of any other figure can operate or function in any manner similar to that described, but are not limited to such.

In some embodiments, device 2000 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2000.

In an example, the device 2000 comprises a SoC (System-on-Chip) 2001. An example boundary of the SOC 2001 is illustrated using dotted lines in FIG. 20, with some example components being illustrated to be included within SOC 2001—however, SOC 2001 may include any appropriate components of device 2000.

In some embodiments, device 2000 includes processor 2004. Processor 2110 can include one or more physical devices, such as microprocessors, application processors, microcontrollers, programmable logic devices, processing cores, or other processing means. The processing operations performed by processor 2004 include the execution of an operating platform or operating system on which applications and/or device functions are executed. The processing operations include operations related to I/O (input/output) with a human user or with other devices, operations related to power management, operations related to connecting computing device 2000 to another device, and/or the like. The processing operations may also include operations related to audio I/O and/or display I/O.

In some embodiments, processor 2004 includes multiple processing cores (also referred to as cores) 2008a, 2008b, 2008c. Although merely three cores 2008a, 2008b, 2008c are illustrated in FIG. 20, the processor 2004 may include any other appropriate number of processing cores, e.g., tens, or even hundreds of processing cores. Processor cores 2008a, 2008b, 2008c may be implemented on a single integrated circuit (IC) chip. Moreover, the chip may include one or more shared and/or private caches, buses or interconnections, graphics and/or memory controllers, or other components.

In some embodiments, processor 2004 includes cache 2006. In an example, sections of cache 2006 may be dedicated to individual cores 2008 (e.g., a first section of cache 2006 dedicated to core 2008a, a second section of cache 2006 dedicated to core 2008b, and so on). In an example, one or more sections of cache 2006 may be shared among two or more of cores 2008. Cache 2006 may be split in different levels, e.g., level 1 (L1) cache, level 2 (L2) cache, level 3 (L3) cache, etc.

In some embodiments, processor core 2004 may include a fetch unit to fetch instructions (including instructions with conditional branches) for execution by the core 2004. The instructions may be fetched from any storage devices such as the memory 2030. Processor core 2004 may also include a decode unit to decode the fetched instruction. For example, the decode unit may decode the fetched instruction into a plurality of micro-operations. Processor core 2004 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 2004 may be an out-of-order processor core in one embodiment. Processor core 2004 may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 2004 may also include a bus unit to enable communication between components of the processor core 2004 and other components via one or more buses. Processor core 2004 may also include one or more registers to store data accessed by various components of the core 2004 (such as values related to assigned app priorities and/or sub-system states (modes) association.

In some embodiments, device 2000 comprises connectivity circuitries 2031. For example, connectivity circuitries 2031 includes hardware devices (e.g., wireless and/or wired connectors and communication hardware) and/or software components (e.g., drivers, protocol stacks), e.g., to enable device 2000 to communicate with external devices. Device 2000 may be separate from the external devices, such as other computing devices, wireless access points or base stations, etc.

In an example, connectivity circuitries 2031 may include multiple different types of connectivity. To generalize, the connectivity circuitries 2031 may include cellular connectivity circuitries, wireless connectivity circuitries, etc. Cellular connectivity circuitries of connectivity circuitries 2031 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2031 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2031 may include a network interface, such as a wired or wireless interface, e.g., so that a system embodiment may be incorporated into a wireless device, for example, cell phone or personal digital assistant.

In some embodiments, device 2000 comprises control hub 2032, which represents hardware devices and/or software components related to interaction with one or more I/O devices. For example, processor 2004 may communicate with one or more of display 2022, one or more peripheral devices 2024, storage devices 2028, one or more other external devices 2029, etc., via control hub 2032. Control hub 2032 may be a chipset, a Platform Control Hub (PCH), and/or the like.

For example, control hub 2032 illustrates one or more connection points for additional devices that connect to device 2000, e.g., through which a user might interact with the system. For example, devices (e.g., devices 2029) that can be attached to device 2000 include microphone devices, speaker or stereo systems, audio devices, video systems or other display devices, keyboard or keypad devices, or other I/O devices for use with specific applications such as card readers or other devices.

As mentioned above, control hub 2032 can interact with audio devices, display 2022, etc. For example, input through a microphone or other audio device can provide input or commands for one or more applications or functions of device 2000. Additionally, audio output can be provided instead of, or in addition to display output. In another example, if display 2022 includes a touch screen, display 2022 also acts as an input device, which can be at least partially managed by control hub 2032. There can also be additional buttons or switches on computing device 2000 to provide I/O functions managed by control hub 2032. In one embodiment, control hub 2032 manages devices such as accelerometers, cameras, light sensors or other environmental sensors, or other hardware that can be included in device 2000. The input can be part of direct user interaction, as well as providing environmental input to the system to influence its operations (such as filtering for noise, adjusting displays for brightness detection, applying a flash for a camera, or other features).

In some embodiments, control hub 2032 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2022 represents hardware (e.g., display devices) and software (e.g., drivers) components that provide a visual and/or tactile display for a user to interact with device 2000. Display 2022 may include a display interface, a display screen, and/or hardware device used to provide a display to a user. In some embodiments, display 2022 includes a touch screen (or touch pad) device that provides both output and input to a user. In an example, display 2022 may communicate directly with the processor 2004. Display 2022 can be one or more of an internal display device, as in a mobile electronic device or a laptop device or an external display device attached via a display interface (e.g., DisplayPort, etc.). In one embodiment display 2022 can be a head mounted display (HMD) such as a stereoscopic display device for use in virtual reality (VR) applications or augmented reality (AR) applications.

In some embodiments and although not illustrated in the figure, in addition to (or instead of) processor 2004, device 2000 may include Graphics Processing Unit (GPU) comprising one or more graphics processing cores, which may control one or more aspects of displaying contents on display 2022.

Control hub 2032 (or platform controller hub) may include hardware interfaces and connectors, as well as software components (e.g., drivers, protocol stacks) to make peripheral connections, e.g., to peripheral devices 2024.

It will be understood that device 2000 could both be a peripheral device to other computing devices, as well as have peripheral devices connected to it. Device 2000 may have a "docking" connector to connect to other computing devices for purposes such as managing (e.g., downloading and/or uploading, changing, synchronizing) content on device 2000. Additionally, a docking connector can allow device 2000 to connect to certain peripherals that allow computing device 2000 to control content output, for example, to audiovisual or other systems.

In addition to a proprietary docking connector or other proprietary connection hardware, device 2000 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2031 may be coupled to control hub 2032, e.g., in addition to, or instead of, being coupled directly to the processor 2004. In some embodiments, display 2022 may be coupled to control hub 2032, e.g., in addition to, or instead of, being coupled directly to processor 2004.

In some embodiments, device 2000 comprises memory 2030 coupled to processor 2004 via memory interface 2034. Memory 2030 includes memory devices for storing information in device 2000. Memory can include nonvolatile (state does not change if power to the memory device is interrupted) and/or volatile (state is indeterminate if power to the memory device is interrupted) memory devices. Memory device 2030 can be a dynamic random access memory (DRAM) device, a static random access memory (SRAM) device, flash memory device, phase-change memory device, or some other memory device having suitable performance to serve as process memory. In one embodiment, memory 2030 can operate as system memory for device 2000, to store data and instructions for use when the one or more processors 2004 executes an application or process. Memory 2030 can store application data, user data, music, photos, documents, or other data, as well as system data (whether long-term or temporary) related to the execution of the applications and functions of device 2000.

Elements of various embodiments and examples are also provided as a machine-readable medium (e.g., memory 2030) for storing the computer-executable instructions (e.g., instructions to implement any other processes discussed herein). The machine-readable medium (e.g., memory 2030) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2000 comprises temperature measurement circuitries 2040, e.g., for measuring temperature of various components of device 2000. In an example, temperature measurement circuitries 2040 may be embedded, or coupled or attached to various components, whose temperature are to be measured and monitored. For example, temperature measurement circuitries 2040 may measure temperature of (or within) one or more of cores 2008*a*, 2008*b*, 2008*c*, voltage regulator 2014, memory 2030, a mother-board of SOC 2001, and/or any appropriate component of device 2000.

In some embodiments, device 2000 comprises power measurement circuitries 2042, e.g., for measuring power consumed by one or more components of the device 2000. In an example, in addition to, or instead of, measuring power, the power measurement circuitries 2042 may measure voltage and/or current. In an example, the power measurement circuitries 2042 may be embedded, or coupled or attached to various components, whose power, voltage, and/or current consumption are to be measured and monitored. For example, power measurement circuitries 2042 may measure power, current and/or voltage supplied by one or more voltage regulators 2014, power supplied to SOC 2001, power supplied to device 2000, power consumed by processor 2004 (or any other component) of device 2000, etc.

In some embodiments, device 2000 comprises one or more voltage regulator circuitries, generally referred to as voltage regulator (VR) 2014. VR 2014 generates signals at appropriate voltage levels, which may be supplied to operate any appropriate components of the device 2000. Merely as an example, VR 2014 is illustrated to be supplying signals to processor 2004 of device 2000. In some embodiments, VR 2014 receives one or more Voltage Identification (VID) signals, and generates the voltage signal at an appropriate level, based on the VID signals. Various type of VRs may be utilized for the VR 2014. For example, VR 2014 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 2010*a/b* and/or PMIC 2012. In some embodiments, each core has a network of distributed LDOs to provide efficient control for power management. The LDOs can be digital, analog, or a combination of digital or analog LDOs.

In some embodiments, device 2000 comprises one or more clock generator circuitries, generally referred to as clock generator 2016. Clock generator 2016 generates clock signals at appropriate frequency levels, which may be supplied to any appropriate components of device 2000. Merely as an example, clock generator 2016 is illustrated to be supplying clock signals to processor 2004 of device 2000. In some embodiments, clock generator 2016 receives one or more Frequency Identification (FID) signals, and generates the clock signals at an appropriate frequency, based on the FID signals.

In some embodiments, device 2000 comprises battery 2018 supplying power to various components of device 2000. Merely as an example, battery 2018 is illustrated to be supplying power to processor 2004. Although not illustrated in the figures, device 2000 may comprise a charging circuitry, e.g., to recharge the battery, based on Alternating Current (AC) power supply received from an AC adapter.

In some embodiments, device 2000 comprises Power Control Unit (PCU) 2010 (also referred to as Power Management Unit (PMU), Power Controller, etc.). In an example, some sections of PCU 2010 may be implemented by one or more processing cores 2008, and these sections of PCU 2010 are symbolically illustrated using a dotted box and labelled PCU 2010a. In an example, some other sections of PCU 2010 may be implemented outside the processing cores 2008, and these sections of PCU 2010 are symbolically illustrated using a dotted box and labelled as PCU 2010b. PCU 2010 may implement various power management operations for device 2000. PCU 2010 may include hardware interfaces, hardware circuitries, connectors, registers, etc., as well as software components (e.g., drivers, protocol stacks), to implement various power management operations for device 2000.

In some embodiments, device 2000 comprises Power Management Integrated Circuit (PMIC) 2012, e.g., to implement various power management operations for device 2000. In some embodiments, PMIC 2012 is a Reconfigurable Power Management ICs (RPMICs) and/or an IMVP (Intel® Mobile Voltage Positioning). In an example, the PMIC is within an IC chip separate from processor 2004. The may implement various power management operations for device 2000. PMIC 2012 may include hardware interfaces, hardware circuitries, connectors, registers, etc., as well as software components (e.g., drivers, protocol stacks), to implement various power management operations for device 2000.

In an example, device 2000 comprises one or both PCU 2010 or PMIC 2012. In an example, any one of PCU 2010 or PMIC 2012 may be absent in device 2000, and hence, these components are illustrated using dotted lines.

Various power management operations of device 2000 may be performed by PCU 2010, by PMIC 2012, or by a combination of PCU 2010 and PMIC 2012. For example, PCU 2010 and/or PMIC 2012 may select a power state (e.g., P-state) for various components of device 2000. For example, PCU 2010 and/or PMIC 2012 may select a power state (e.g., in accordance with the ACPI (Advanced Configuration and Power Interface) specification) for various components of device 2000. Merely as an example, PCU 2010 and/or PMIC 2012 may cause various components of the device 2000 to transition to a sleep state, to an active state, to an appropriate C state (e.g., C0 state, or another appropriate C state, in accordance with the ACPI specification), etc. In an example, PCU 2010 and/or PMIC 2012 may control a voltage output by VR 2014 and/or a frequency of a clock signal output by the clock generator, e.g., by outputting the VID signal and/or the FID signal, respectively. In an example, PCU 2010 and/or PMIC 2012 may control battery power usage, charging of battery 2018, and features related to power saving operation.

The clock generator 2016 can comprise a phase locked loop (PLL), frequency locked loop (FLL), or any suitable clock source. In some embodiments, each core of processor 2004 has its own clock source. As such, each core can operate at a frequency independent of the frequency of operation of the other core. In some embodiments, PCU 2010 and/or PMIC 2012 performs adaptive or dynamic frequency scaling or adjustment. For example, clock frequency of a processor core can be increased if the core is not operating at its maximum power consumption threshold or limit. In some embodiments, PCU 2010 and/or PMIC 2012 determines the operating condition of each core of a processor, and opportunistically adjusts frequency and/or power supply voltage of that core without the core clocking source (e.g., PLL of that core) losing lock when the PCU 2010 and/or PMIC 2012 determines that the core is operating below a target performance level. For example, if a core is drawing current from a power supply rail less than a total current allocated for that core or processor 2004, then PCU 2010 and/or PMIC 2012 can temporarily increase the power draw for that core or processor 2004 (e.g., by increasing clock frequency and/or power supply voltage level) so that the core or processor 2004 can perform at a higher performance level. As such, voltage and/or frequency can be increased temporality for processor 2004 without violating product reliability.

In an example, PCU 2010 and/or PMIC 2012 may perform power management operations, e.g., based at least in part on receiving measurements from power measurement circuitries 2042, temperature measurement circuitries 2040, charge level of battery 2018, and/or any other appropriate information that may be used for power management. To that end, PMIC 2012 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2010 and/or PMIC 2012 in at least one embodiment to allow PCU 2010 and/or PMIC 2012 to manage processor core energy at least in part based on value(s) detected by one or more of the sensors.

Also illustrated is an example software stack of device 2000 (although not all elements of the software stack are illustrated). Merely as an example, processors 2004 may execute application programs 2050, Operating System 2052, one or more Power Management (PM) specific application programs (e.g., generically referred to as PM applications 2058), and/or the like. PM applications 2058 may also be executed by the PCU 2010 and/or PMIC 2012. OS 2052 may also include one or more PM applications 2056a, 2056b, 2056c. The OS 2052 may also include various drivers 2054a, 2054b, 2054c, etc., some of which may be specific for power management purposes. In some embodiments, device 2000 may further comprise a Basic Input/Output System (BIOS) 2020. BIOS 2020 may communicate with OS 2052 (e.g., via one or more drivers 2054), communicate with processors 2004, etc.

For example, one or more of PM applications 2058, 2056, drivers 2054, BIOS 2020, etc. may be used to implement power management specific tasks, e.g., to control voltage and/or frequency of various components of device 2000, to control wake-up state, sleep state, and/or any other appropriate power state of various components of device 2000, control battery power usage, charging of the battery 2018, features related to power saving operation, etc.

Some embodiments variously facilitate a change to a frequency of a connectivity fabric (e.g., the fabric comprising connectivity circuitries 2031 and/or other interconnect circuitry of computing device 2000), where the change is transparent to processor 2004 and one or more other devices that are coupled thereto. Additionally or alternatively, some embodiments variously enable processor 2004 operable to configure a mode of an external voltage regulator (not shown) which delivers power to processor 2004—e.g., wherein the mode is to mitigate a draw of current from the voltage regulator. Additionally or alternatively, some embodiments variously enable processor 2004 to log a time (prior to an activation of some processor circuitry) when an indication of a power state transition is detected, where a latency of a power state transition is subsequently determined and reported to a software process based on the logged time.

Additionally or alternatively, some embodiments variously provide power management circuits (of the power management circuitries 2042, for example) at different respective IC chips, where the provide power management circuits are coupled to negotiate a distribution of power between the IC chips. Additionally or alternatively, some embodiments variously provide circuitry (of the power management circuitries 2042, for example), which is external to processor 2004, is operable to detect a thermal condition of processor 2004 and, based on such monitoring, to change a delivery of power to processor 2004 while it remains in a sleep (or other low power) state.

Additionally or alternatively, some embodiments variously enable state of processor 2004 to be stored based on a prediction as to whether a SRAM (or other memory) internal to processor 2004, or some external resource such as memory 2030, is likely to be a more power efficient repository of such state. Additionally or alternatively, some embodiments variously enable processor 2004 to generate control signals based on values which each indicate a different respective latency of a corresponding power gate (not shown) that is coupled to processor 2004. The control signals are communicated each to a different respective load circuit of processor 2004, wherein the load circuits initiate respective operations of a power state transition at different times based on the control signals.

In the description herein, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Techniques and architectures for managing power delivery and/or consumption by a processor are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

In one or more first embodiments, a device comprises an interconnect fabric comprising one or more nodes, an end point device coupled to the interconnect fabric via an asynchronous device, a clock controller coupled to provide a clock signal to the one or more nodes, wherein, based on the clock signal, the one or more nodes are to communicate with the end point device via the asynchronous device while a first clock domain comprises the one or more nodes, and while a second clock domain comprises the end point device. The device further comprises a power management (PM) controller to communicate a control signal to the clock controller while the clock signal is cycled at a first frequency, wherein the control signal indicates that the first clock domain is to be transitioned from the first frequency to a second frequency, wherein, in response to the control signal, the clock controller is to stall the clock signal throughout a period of time which is equal to or greater than a duration of three cycles of a lower one of the first frequency or the second frequency, and after the period of time, to cycle the clock signal at the second frequency.

In one or more second embodiments, further to the first embodiment, the end point device is to be able to communicate with the asynchronous device throughout the period of time.

In one or more third embodiments, further to the first embodiment or the second embodiment, the period of time is equal to or less than a duration of five cycles of the lower one of the first frequency or the second frequency.

In one or more fourth embodiments, further to any of the first through third embodiments, the asynchronous device comprises an asynchronous buffered port.

In one or more fifth embodiments, further to any of the first through fourth embodiments, the clock controller further comprises a register to store a value representing the period of time, wherein the clock signal is to stall the clock signal based on the value.

In one or more sixth embodiments, further to any of the first through fifth embodiments, the control signal is a first control signal to trigger a frequency of the first clock domain, and wherein the PM controller is further to communicate a second control signal to the clock controller prior to the first control signal, wherein the second control signal comprises an identifier of the second frequency.

In one or more seventh embodiments, further to any of the first through sixth embodiments, the interconnect fabric, the one or more nodes, the clock signal, and the control signal are, respectively, a first interconnect fabric, a first one or more nodes, a first clock signal, and a first control signal, wherein the device further comprises a second interconnect fabric comprising a second one or more nodes coupled to the first interconnect fabric, wherein the end point device is coupled to the first interconnect fabric via the second interconnect fabric. The clock controller is further coupled to provide a second clock signal to the second one or more nodes, wherein, based on the second clock signal, the second one or more nodes are to communicate with the first one or more nodes while a third clock domain comprises the second one or more nodes, wherein the PM controller is further to communicate a second control signal to the clock controller while the second clock signal is cycled at a third frequency, wherein the second control signal indicates that the third clock domain is to be transitioned from the third frequency to a fourth frequency. In response to the second control signal, the clock controller is to stall the second clock signal throughout a second period of time while the first clock signal is to continue to cycle at one of the first frequency or the second frequency, wherein the second period of time is equal to or greater than a duration of three cycles of a lower one of the third frequency or the fourth frequency, and after the second period of time, to cycle the second clock signal at the fourth frequency.

In one or more eighth embodiments, further to any of the first through seventh embodiments, the end point device comprises a processor.

In one or more ninth embodiments, a device comprises a processor, a fabric comprising an asynchronous port and nodes coupled to provide switched communication, based on a clock signal, with the processor via the asynchronous port, and a clock controller coupled the fabric, the clock controller to provide the clock signal to the nodes, receive a control signal while a first clock domain comprises the nodes, and while a second clock domain comprises the processor, and transition the first clock domain from a first frequency to a second frequency based on the control signal, wherein the clock controller is to stall the clock signal throughout a period of time which is equal to or greater than a duration of three cycles of a lower one of the first frequency or the second frequency, and cycle the clock signal at the second frequency after the period of time.

In one or more tenth embodiments, further to the ninth embodiment, the period of time is equal to or less than a duration of five cycles of the lower one of the first frequency or the second frequency.

In one or more eleventh embodiments, further to the ninth embodiment or the tenth embodiment, the clock controller further comprises a register to store a value representing the period of time, wherein the clock signal is to stall the clock signal based on the value.

In one or more twelfth embodiments, further to any of the ninth through eleventh embodiments, the control signal is a first control signal to trigger a frequency of the first clock domain, and wherein the clock controller is further to receive a second control signal prior to the first control signal, wherein the second control signal comprises an identifier of the second frequency.

In one or more thirteenth embodiments, further to any of the ninth through twelfth embodiments, the fabric, the nodes, the clock signal, and the control signal are, respectively, a first fabric, first nodes, a first clock signal, and a first control signal, wherein the device further comprises a second fabric comprising second nodes coupled to the first fabric, wherein the processor is coupled to the first fabric via the second fabric, wherein the clock controller is further coupled to provide a second clock signal to the second nodes, wherein, based on the second clock signal, the second nodes are to communicate with the first nodes while a third clock domain comprises the second nodes, wherein the clock controller is further to receive a second control signal while the second clock signal is cycled at a third frequency. In response to the second control signal, the clock controller is to stall the second clock signal throughout a second period of time while the first clock signal is to continue to cycle at one of the first frequency or the second frequency, wherein the second period of time is equal to or greater than a duration of three cycles of a lower one of the third frequency or the fourth frequency, and after the second period of time, to cycle the second clock signal at the fourth frequency.

In one or more fourteenth embodiments, a system comprises one or more integrated circuit (IC) chips comprising an interconnect fabric comprising one or more nodes, an end point device coupled to the interconnect fabric via an asynchronous device, a clock controller coupled to provide a clock signal to the one or more nodes, wherein, based on the clock signal, the one or more nodes are to communicate with the end point device via the asynchronous device while a first clock domain comprises the one or more nodes, and while a second clock domain comprises the end point device, and a power management (PM) controller to communicate a control signal to the clock controller while the clock signal is cycled at a first frequency, wherein the control signal indicates that the first clock domain is to be transitioned from the first frequency to a second frequency. In response to the control signal, the clock controller is to stall the clock signal throughout a period of time which is equal to or greater than a duration of three cycles of a lower one of the first frequency or the second frequency, and after the period of time, to cycle the clock signal at the second frequency. The system further comprises a display device coupled to the one or more IC chips, the display device to display an image based on a signal communicated with the one or more IC chips.

In one or more fifteenth embodiments, further to the fourteenth embodiment, the end point device is to be able to communicate with the asynchronous device throughout the period of time.

In one or more sixteenth embodiments, further to the fourteenth embodiment or the fifteenth embodiment, the period of time is equal to or less than a duration of five cycles of the lower one of the first frequency or the second frequency.

In one or more seventeenth embodiments, further to any of the fourteenth through sixteenth embodiments, the asynchronous device comprises an asynchronous buffered port.

In one or more eighteenth embodiments, further to any of the fourteenth through seventeenth embodiments, the clock controller further comprises a register to store a value representing the period of time, wherein the clock signal is to stall the clock signal based on the value.

In one or more nineteenth embodiments, further to any of the fourteenth through eighteenth embodiments, the control signal is a first control signal to trigger a frequency of the first clock domain, and wherein the PM controller is further to communicate a second control signal to the clock controller prior to the first control signal, wherein the second control signal comprises an identifier of the second frequency.

In one or more twentieth embodiments, further to any of the fourteenth through nineteenth embodiments, wherein the interconnect fabric, the one or more nodes, the clock signal, and the control signal are, respectively, a first interconnect fabric, a first one or more nodes, a first clock signal, and a first control signal, wherein the one or more IC chips further comprises a second interconnect fabric comprising a second one or more nodes coupled to the first interconnect fabric, wherein the end point device is coupled to the first interconnect fabric via the second interconnect fabric, wherein the clock controller is further coupled to provide a second clock signal to the second one or more nodes, wherein, based on the second clock signal, the second one or more nodes are to communicate with the first one or more nodes while a third clock domain comprises the second one or more nodes, wherein the PM controller is further to communicate a second control signal to the clock controller while the second clock signal is cycled at a third frequency, wherein the second control signal indicates that the third clock domain is to be transitioned from the third frequency to a fourth frequency. In response to the second control signal, the clock controller is to stall the second clock signal throughout a second period of time while the first clock signal is to continue to cycle at one of the first frequency or the second frequency, wherein the second period of time is equal to or greater than a duration of three cycles of a lower one of the third frequency or the fourth frequency, and after the second period of time, cycle the second clock signal at the fourth frequency.

In one or more twenty-first embodiments, further to any of the fourteenth through twentieth embodiments, the end point device comprises a processor.

In one or more twenty-second embodiments, a method comprises, with a controller circuit, providing a clock signal to one or more nodes of an interconnect fabric, with the one or more nodes, communicating with an end point device based on the clock signal, wherein the end point device is coupled to the interconnect fabric via an asynchronous device, the communicating while a first clock domain comprises the one or more nodes, and while a second clock domain comprises the end point device, while the clock signal is cycling at a first frequency, detecting at the controller circuit that the first clock domain is to be transitioned from the first frequency to a second frequency. The method further comprises, based on the detecting, stalling the clock signal throughout a period of time which is equal to or greater than a duration of three cycles of a lower one of the first frequency or the second frequency, and after the period of time, cycling the clock signal at the second frequency.

In one or more twenty-third embodiments, further to the twenty-second embodiment, the method further comprises with the end point device, communicating with the asynchronous device during the period of time.

In one or more twenty-fourth embodiments, further to the twenty-second embodiment or the twenty-third embodiment, the period of time is equal to or less than a duration of five cycles of the lower one of the first frequency or the second frequency.

In one or more twenty-fifth embodiments, further to any of the twenty-second through twenty-fourth embodiments, the asynchronous device comprises an asynchronous buffered port.

In one or more twenty-sixth embodiments, further to any of the twenty-second through twenty-fifth embodiments, the method further comprises storing, at a register of the the clock controller, a value representing the period of time, wherein the clock signal stalls the clock signal based on the value.

In one or more twenty-seventh embodiments, further to any of the twenty-second through twenty-sixth embodiments, the method further comprises communicating a first signal, from a power manager circuit to the controller circuit, the first signal comprising an identifier of the second frequency, and after communicating the first signal, communicating a second signal, from a power manager circuit to the controller circuit, to trigger the stalling.

In one or more twenty-eighth embodiments, further to any of the twenty-second through twenty-seventh embodiments, the interconnect fabric, the one or more nodes, the clock signal, and the control signal are, respectively, a first interconnect fabric, a first one or more nodes, a first clock signal, and a first control signal, the method further comprises with the controller circuit, providing a second clock signal to a second one or more nodes of a second interconnect fabric coupled to the first interconnect fabric, wherein the end point device is coupled to the first interconnect fabric via the second interconnect fabric, while the second clock signal is cycling at a third frequency, performing a second detecting at the controller circuit that the second clock domain is to be transitioned from the third frequency to a fourth frequency. The method further comprises, based on the second detecting, stalling the second clock signal throughout a second period of time which is equal to or greater than a duration of three cycles of a lower one of the third frequency or the fourth frequency, and after the second period of time, cycling the second clock signal at the fourth frequency.

In one or more twenty-ninth embodiments, a processor comprises a first voltage regulator (VR), interface circuitry to couple the processor to a second VR, wherein the first VR is to receive a second voltage from the second VR via the interface circuitry, and to generate a first voltage based on the second voltage, and power management circuitry, coupled to the interface circuitry, to receive an indication of a power delivery condition of the processor, and based on the indication, access reference information which indicates performance characteristics of the first VR and the second VR. The power management circuitry is further to perform an evaluation, based on the reference information, which determines that a first mode of the first VR is compatible with a threshold maximum current of the second VR, wherein the first mode is selected over a second mode of the first VR based on the evaluation, and based on the evaluation, signal the second VR to operate according to a third mode to deliver power to the first VR.

In one or more thirtieth embodiments, further to the twenty-ninth embodiment, power management circuitry is further to receive the reference information via the interface circuitry.

In one or more thirty-first embodiments, further to the thirtieth embodiment, the power management circuitry to receive the reference information comprises the power management circuitry to receive updated performance characteristic information.

In one or more thirty-second embodiments, further to any of the twenty-ninth through thirty-first embodiments, the power management circuitry to perform the evaluation comprises the power management circuitry to identify modes of the second VR which satisfy a threshold minimum voltage requirement of the first VR, and perform a selection of the first mode from among the identified modes.

In one or more thirty-third embodiments, further to the thirty-second embodiment, the identified modes each correspond to a different respective current level of a plurality of current levels, wherein the selection is based on a determination that a first current level corresponding to the first mode is a lowest one of the plurality of current levels.

In one or more thirty-fourth embodiments, further to any of the twenty-ninth through thirty-third embodiments, the power management circuitry to receive the indication of the power delivery condition comprises the power management circuitry to identify a power state to which the processor is to be transitioned.

In one or more thirty-fifth embodiments, further to any of the twenty-ninth through thirty-fourth embodiments, the power management circuitry is to receive the indication during a power state of the processor, and wherein the processor is to maintain the power state after a transition of the second VR to the third mode.

In one or more thirty-sixth embodiments, one or more non-transitory computer-readable storage media having stored thereon instructions which, when executed by one or more processing units, cause the one or more processing units to perform a method at a processor, wherein the method comprises with a first voltage regulator (VR) of the processor, generating a first voltage based on a second voltage from a second VR which is coupled to the processor, receiving an indication of a power delivery condition of the processor, and based on the indication, accessing reference information which indicates performance characteristics of the first VR and the second VR. The method further comprises performing an evaluation, based on the reference information, which determines that a first mode of the first VR is compatible with a threshold maximum current of the second VR, wherein the first mode is selected over a second mode of the first VR based on the evaluation, and based on the evaluation, signaling the second VR to operate according to a third mode to deliver power to the first VR.

In one or more thirty-seventh embodiments, further to the thirty-sixth embodiment, the method further comprises receiving the reference information from an agent external to the processor.

In one or more thirty-eighth embodiments, further to the thirty-seventh embodiment, receiving the reference information comprises receiving updated performance characteristic information.

In one or more thirty-ninth embodiments, further to any of the thirty-sixth through thirty-eighth embodiments, performing the evaluation comprises identifying modes of the second VR which satisfy a threshold minimum voltage requirement of the first VR, and performing a selection of the first mode from among the identified modes.

In one or more fortieth embodiments, further to the thirty-ninth embodiment, the identified modes each correspond to a different respective current level of a plurality of current levels, wherein the selection is based on a determination that a first current level corresponding to the first mode is a lowest one of the plurality of current levels.

In one or more forty-first embodiments, further to any of the thirty-sixth through fortieth embodiments, receiving the indication of the power delivery condition comprises identifying a power state to which the processor is to be transitioned.

In one or more forty-second embodiments, further to any of the thirty-sixth through forty-first embodiments, the indication is received during a power state of the processor, and wherein the processor maintains the power state after a transition of the second VR to the third mode.

In one or more forty-third embodiments, a system comprises a first voltage regulator (VR), a processor coupled to receive a first voltage from the first VR, the processor comprising a second voltage regulator (VR) to generate a second voltage based on the first voltage, and power management circuitry to receive an indication of a power delivery condition of the processor, and based on the indication, access reference information which indicates performance characteristics of the first VR and the second VR. The power management circuitry is further to perform an evaluation, based on the reference information, which determines that a first mode of the second VR is compatible with a threshold maximum current of the first VR, wherein the first mode is selected over a second mode of the second VR based on the evaluation, and based on the evaluation, signal the first VR to operate according to a third mode to deliver power to the second VR. The system further comprises a display device coupled to the processor, the display device to display an image based on a signal communicated with the processor.

In one or more forty-fourth embodiments, further to the forty-third embodiment, the power management circuitry is further to receive the reference information via the interface circuitry.

In one or more forty-fifth embodiments, further to the forty-fourth embodiment, the power management circuitry to receive the reference information comprises the power management circuitry to receive updated performance characteristic information.

In one or more forty-sixth embodiments, further to any of the forty-third through forty-fifth embodiments, the power management circuitry to perform the evaluation comprises the power management circuitry to identify modes of the first VR which satisfy a threshold minimum voltage requirement of the first VR, and perform a selection of the first mode from among the identified modes.

In one or more forty-seventh embodiments, further to the forty-sixth embodiment, the identified modes each correspond to a different respective current level of a plurality of current levels, wherein the selection is based on a determination that a first current level corresponding to the first mode is a lowest one of the plurality of current levels.

In one or more forty-eighth embodiments, further to any of the forty-third through forty-seventh embodiments, the power management circuitry to receive the indication of the power delivery condition comprises the power management circuitry to identify a power state to which the processor is to be transitioned.

In one or more forty-ninth embodiments, further to any of the forty-third through forty-eighth embodiments, the power management circuitry is to receive the indication during a power state of the processor, and wherein the processor is to maintain the power state after a transition of the first VR to the third mode.

In one or more fiftieth embodiments, a method at a processor comprises with a first voltage regulator (VR) of the processor, generating a first voltage based on a second voltage from a second VR which is coupled to the processor, receiving an indication of a power delivery condition of the processor, and based on the indication, accessing reference information which indicates performance characteristics of the first VR and the second VR. The method further comprises performing an evaluation, based on the reference information, which determines that a first mode of the first VR is compatible with a threshold maximum current of the second VR, wherein the first mode is selected over a second mode of the first VR based on the evaluation, and based on the evaluation, signaling the second VR to operate according to a third mode to deliver power to the first VR.

In one or more fifty-first embodiments, further to the fiftieth embodiment, the method further comprises receiving the reference information from an agent external to the processor.

In one or more fifty-second embodiments, further to the fifty-first embodiment, receiving the reference information comprises receiving updated performance characteristic information.

In one or more fifty-third embodiments, further to any of the fiftieth through fifty-second embodiments, performing the evaluation comprises identifying modes of the second VR which satisfy a threshold minimum voltage requirement of the first VR, and performing a selection of the first mode from among the identified modes.

In one or more fifty-fourth embodiments, further to the fifty-third embodiment, the identified modes each correspond to a different respective current level of a plurality of current levels, wherein the selection is based on a determination that a first current level corresponding to the first mode is a lowest one of the plurality of current levels.

In one or more fifty-fifth embodiments, further to any of the fiftieth through fifty-fourth embodiments, receiving the indication of the power delivery condition comprises identifying a power state to which the processor is to be transitioned.

In one or more fifty-sixth embodiments, further to any of the fiftieth through fifty-fifth embodiments, the indication is received during a power state of the processor, and wherein the processor maintains the power state after a transition of the second VR to the third mode.

In one or more fifty-seventh embodiments, a processor comprises first circuitry to detect a need to perform a power state transition with the processor, second circuitry coupled to receive from the first circuitry a signal which indicates the need, wherein based on the signal, the second circuitry is to log a time t0 of a communication of the signal, and to generate a control signal, and third circuitry, coupled to the second circuitry, to initiate a wake-up operation in response to the control signal, request an indication of the time t0 from the second circuitry after the wake-up operation, and provide to an operating system a communication comprising a value, based on the indication of the time t0, which identifies a latency of the power state transition.

In one or more fifty-eighth embodiments, further to the fifty-seventh embodiment, the third circuitry is further to perform one or more operations of the power state transition after a receipt of the indication of the time t0 from the second circuitry.

In one or more fifty-ninth embodiments, further to the fifty-seventh embodiment or the fifty-eighth embodiment, the third circuitry is to compute a duration of the latency based on the indication of the time t0, wherein the latency comprises a first period of time from the time t0 to a transmission of the control signal from the second circuitry.

In one or more sixtieth embodiments, further to the fifty-ninth embodiment, the third circuitry to request the indication of the time t0 comprises the third circuitry to send a query to the second circuitry, and wherein the latency further comprises a second period of time during the wake-up operation, and before a communication of the query.

In one or more sixty-first embodiments, further to the sixtieth embodiment, the latency further comprises a third period of time from the communication of the query to a communication of the indication of the time t0 to the third circuitry.

In one or more sixty-second embodiments, further to the sixty-first embodiment, the latency further comprises a fourth period of time after the communication of the indication of the time t0 to the third circuitry.

In one or more sixty-third embodiments, further to any of the fifty-seventh through sixty-second embodiments, the third circuitry is to send a query to the second circuitry to request the indication of the time t0, and wherein the second circuitry, based on the query, is to calculate a total time between the time t0 and a time of a communication of the query.

In one or more sixty-fourth embodiments, further to any of the fifty-seventh through sixty-third embodiments, the power state transition includes a transition of the processor from a first power state which disables an execution of software to a second power state which enables the execution of software.

In one or more sixty-fifth embodiments, a device comprises a processor comprising a controller unit to receive a first signal comprising an indication of a need to perform a power state transition with the processor, and log a time t0 of a communication of the first signal. The processor further comprises a power management unit coupled to receive from the controller unit a second signal based on the indication. The power management unit is further to perform a wake-up operation in response to the second signal, determine the time t0 from the controller unit after the wake-up operation, and based on the time t0, to generate an output comprising an identifier of a latency of the power state transition.

In one or more sixty-sixth embodiments, further to the sixty-fifth embodiment, the power management unit is further to perform one or more operations of the power state transition after a receipt of the indication of the time t0 from the controller unit.

In one or more sixty-seventh embodiments, further to the sixty-fifth embodiment or the sixty-sixth embodiment, the power management unit is to compute a duration of the latency based on the indication of the time t0, wherein the latency comprises a first period of time from the time t0 to a transmission of the second signal from the controller unit.

In one or more sixty-eighth embodiments, further to the sixty-seventh embodiment, the power management unit to request the indication of the time t0 comprises the power management unit to send a query to the controller unit, and wherein the latency further comprises a second period of time during the wake-up operation, and before a communication of the query.

In one or more sixty-ninth embodiments, further to the sixty-eighth embodiment, the latency further comprises a third period of time from the communication of the query to a communication of the indication of the time t0 to the power management unit.

In one or more seventieth embodiments, further to the sixty-ninth embodiment, the latency further comprises a fourth period of time after the communication of the indication of the time t0 to the power management unit.

In one or more seventy-first embodiments, further to any of the sixty-fifth through seventieth embodiments, the power management unit is to send a query to the controller unit to request the indication of the time to, and wherein the controller unit, based on the query, is to calculate a total time between the time t0 and a time of a communication of the query.

In one or more seventy-second embodiments, further to any of the sixty-fifth through seventy-first embodiments, the power state transition includes a transition of the processor from a first power state which disables an execution of software to a second power state which enables the execution of software.

In one or more seventy-third embodiments, a system comprises a processor comprising first circuitry to detect a need to perform a power state transition with the processor, second circuitry coupled to receive from the first circuitry a signal which indicates the need, wherein based on the signal, the second circuitry is to log a time t0 of a communication of the signal, and to generate a control signal. The processor further comprises third circuitry, coupled to the second circuitry, to initiate a wake-up operation in response to the control signal, request an indication of the time t0 from the second circuitry after the wake-up operation, and provide to an operating system a communication comprising a value, based on the indication of the time t0, which identifies a latency of the power state transition. The system further comprises a display device coupled to the processor, the display device to display an image based on a signal communicated with the processor.

In one or more seventy-fourth embodiments, further to the seventy-third embodiment, the third circuitry is further to perform one or more operations of the power state transition after a receipt of the indication of the time t0 from the second circuitry.

In one or more seventy-fifth embodiments, further to the seventy-third embodiment or the seventy-fourth embodiment, the third circuitry is to compute a duration of the latency based on the indication of the time t0, wherein the latency comprises a first period of time from the time t0 to a transmission of the control signal from the second circuitry.

In one or more seventy-sixth embodiments, further to the seventy-fifth embodiment, the third circuitry to request the indication of the time t0 comprises the third circuitry to send a query to the second circuitry, and wherein the latency further comprises a second period of time during the wake-up operation, and before a communication of the query.

In one or more seventy-seventh embodiments, further to the seventy-sixth embodiment, the latency further comprises a third period of time from the communication of the query to a communication of the indication of the time t0 to the third circuitry.

In one or more seventy-eighth embodiments, further to the seventy-seventh embodiment, the latency further comprises a fourth period of time after the communication of the indication of the time t0 to the third circuitry.

In one or more seventy-ninth embodiments, further to any of the seventy-third through seventy-eighth embodiments, the third circuitry is to send a query to the second circuitry to request the indication of the time t0, and wherein the second circuitry, based on the query, is to calculate a total time between the time t0 and a time of a communication of the query.

In one or more eightieth embodiments, further to any of the seventy-third through seventy-ninth embodiments, the power state transition includes a transition of the processor from a first power state which disables an execution of software to a second power state which enables the execution of software.

In one or more eighty-first embodiments, a method at the processor comprises at a first circuit of the processor receiving a signal which indicates a need to perform a power state transition with the processor, logging a time t0 of a communication of the signal, and generating a control signal based on the signal. The method further comprises, at a second circuit of the processor, initiating a wake-up operation in response to the control signal, requesting an indication of the time t0 from the first circuitry after the wake-up operation, and provide to an operating system a communication comprising a value, based on the indication of the time t0, which identifies a latency of the power state transition.

In one or more eighty-second embodiments, further to the eighty-first embodiment, the second circuit is further to perform one or more operations of the power state transition after a receipt of the indication of the time t0 from the first circuit.

In one or more eighty-third embodiments, further to the eighty-first embodiment or the eighty-second embodiment, the second circuit is to compute a duration of the latency based on the indication of the time t0, wherein the latency comprises a first period of time from the time t0 to a transmission of the control signal from the first circuit.

In one or more eighty-fourth embodiments, further to the eighty-third embodiment, requesting the indication of the time t0 comprises the second circuit sending a query to the first circuit, and wherein the latency further comprises a second period of time during the wake-up operation, and before the sending of the query.

In one or more eighty-fifth embodiments, further to the eighty-fourth embodiment, the latency further comprises a third period of time from the communication of the query to a communication of the indication of the time t0 to the second circuit.

In one or more eighty-sixth embodiments, further to the eighty-fifth embodiment, the latency further comprises a fourth period of time after the communication of the indication of the time t0 to the second circuit.

In one or more eighty-seventh embodiments, further to any of the eighty-first through eighty-sixth embodiments, the second circuit sends a query to the first circuit to request the indication of the time t0, and wherein the first circuit, based on the query, calculates a total time between the time t0 and a time of a communication of the query.

In one or more eighty-eighth embodiments, further to any of the eighty-first through eighty-seventh embodiments, the power state transition includes a transition of the processor from a first power state which disables an execution of software to a second power state which enables the execution of software.

In one or more eighty-ninth embodiments, an integrated circuit (IC) chip comprises an interface circuit to couple the IC chip to another IC chip, a first power management (PM) circuit coupled to the interface circuit, the first PM circuit to participate in communications with a second PM circuit of the other IC chip while a voltage regulator is to deliver power via a rail to each of the IC chip and the other IC chip. The communications comprise a first message sent between the first PM circuit or the second PM circuit, wherein the first message indicates a first transition between modes of power consumption by one of the IC chip or the other IC chip, and a second message, based on the first message, sent from the other of the first PM circuit or the second PM circuit to an agent which is one of the voltage regulator or a third PM circuit of a third IC chip, wherein the second message requests a second transition of a mode of power consumption or power delivery by the agent, wherein one of the first transition or the second transition is based on the other of the first transition or the second transition.

In one or more ninetieth embodiments, further to the eighty-ninth embodiment, the first message requests a confirmation that the one of the first PM circuit or the second PM circuit is approved to perform the first transition.

In one or more ninety-first embodiments, further to the ninetieth embodiment, the agent is the voltage regulator, and wherein the communications further comprise a third message from the voltage regulator to the other of the first PM circuit or the second PM circuit, the third message to confirm a performance of the second transition, and a fourth message from the other of the first PM circuit or the second PM circuit to the one of the first PM circuit or the second PM circuit, the fourth message comprising the confirmation.

In one or more ninety-second embodiments, further to the ninety-first embodiment, the agent is the third PM circuit, wherein the second message requests a performance of the second transition by the third PM circuit, and wherein the communications further comprise a third message from the third PM circuit to the other of the first PM circuit or the second PM circuit, the third message to confirm a performance of the second transition, wherein the other of the first PM circuit or the second PM circuit performs a third transition of a mode of power consumption based on the third message, and a fourth message from the other of the first PM circuit or the second PM circuit to the one of the first PM circuit or the second PM circuit, the fourth message comprising the confirmation.

In one or more ninety-third embodiments, further to any of the eighty-ninth through ninety-second embodiments, the first message confirms a performance of the first transition by the one of the first PM circuit or the second PM circuit.

In one or more ninety-fourth embodiments, further to the ninety-third embodiment, the agent is the voltage regulator, and wherein the second transition is based on the first transition.

In one or more ninety-fifth embodiments, further to any of the eighty-ninth through ninety-fourth embodiments, one of the IC chip or the other IC chip comprises the voltage regulator.

In one or more ninety-sixth embodiments, a packaged device comprises a first integrated circuit (IC) chip comprising a first power management (PM) circuit, and a second IC chip coupled to the first IC chip, the second IC chip comprising a second PM circuit to participate in communications with the first PM circuit while a voltage regulator is to deliver power via a rail to each of the first IC chip and the second IC chip. The communications comprise a first message sent between the first PM circuit or the second PM circuit, wherein the first message indicates a first transition between modes of power consumption by one of the first IC chip or the second IC chip, and a second message, based on the first message, sent from the other of the first PM circuit or the second PM circuit to an agent which is one of the voltage regulator or a third PM circuit of a third IC chip, wherein the second message requests a second transition of a mode of power consumption or power delivery by the agent, wherein one of the first transition or the second transition is based on the other of the first transition or the second transition.

In one or more ninety-seventh embodiments, further to the ninety-sixth embodiment, the first message requests a confirmation that the one of the first PM circuit or the second PM circuit is approved to perform the first transition.

In one or more ninety-eighth embodiments, further to the ninety-seventh embodiment, the agent is the voltage regulator, and wherein the communications further comprise a third message from the voltage regulator to the other of the first PM circuit or the second PM circuit, the third message to confirm a performance of the second transition, and a fourth message from the other of the first PM circuit or the second PM circuit to the one of the first PM circuit or the second PM circuit, the fourth message comprising the confirmation.

In one or more ninety-ninth embodiments, further to the ninety-eighth embodiment, the agent is the third PM circuit, wherein the second message requests a performance of the second transition by the third PM circuit, and wherein the communications further comprise a third message from the third PM circuit to the other of the first PM circuit or the second PM circuit, the third message to confirm a performance of the second transition, wherein the other of the first PM circuit or the second PM circuit performs a third transition of a mode of power consumption based on the third message, and a fourth message from the other of the first PM circuit or the second PM circuit to the one of the first PM circuit or the second PM circuit, the fourth message comprising the confirmation.

In one or more one hundredth embodiments, further to any of the ninety-sixth through ninety-ninth embodiments, the first message confirms a performance of the first transition by the one of the first PM circuit or the second PM circuit.

In one or more one hundred and first embodiments, further to the one hundredth embodiment, the agent is the voltage regulator, and wherein the second transition is based on the first transition.

In one or more one hundred and second embodiments, further to any of the ninety-sixth through one hundred and first embodiments, one of the first IC chip or the second IC chip comprises the voltage regulator.

In one or more one hundred and third embodiments, a system comprises a first integrated circuit (IC) chip comprising a first power management (PM) circuit, a second IC chip coupled to the first IC chip, the second IC chip comprising a second PM circuit to participate in communications with the first PM circuit while a voltage regulator is to deliver power via a rail to each of the first IC chip and the second IC chip. The communications comprise a first message sent between the first PM circuit or the second PM circuit, wherein the first message indicates a first transition between modes of power consumption by one of the first IC chip or the second IC chip, and a second message, based on the first message, sent from the other of the first PM circuit or the second PM circuit to an agent which is one of the voltage regulator or a third PM circuit of a third IC chip, wherein the second message requests a second transition of a mode of power consumption or power delivery by the agent, wherein one of the first transition or the second transition is based on the other of the first transition or the second transition. The system further comprises a display device coupled to the first IC chip, the display device to display an image based on a signal communicated with the first IC chip.

In one or more one hundred and fourth embodiments, further to the one hundred and third embodiment, the first message requests a confirmation that the one of the first PM circuit or the second PM circuit is approved to perform the first transition.

In one or more one hundred and fifth embodiments, further to the one hundred and fourth embodiment, the agent is the voltage regulator, and wherein the communications further comprise a third message from the voltage regulator to the other of the first PM circuit or the second PM circuit, the third message to confirm a performance of the second transition, and a fourth message from the other of the first PM circuit or the second PM circuit to the one of the first PM circuit or the second PM circuit, the fourth message comprising the confirmation.

In one or more one hundred and sixth embodiments, further to the one hundred and fifth embodiment, the agent is the third PM circuit, wherein the second message requests a performance of the second transition by the third PM circuit, and wherein the communications further comprise a third message from the third PM circuit to the other of the first PM circuit or the second PM circuit, the third message to confirm a performance of the second transition, wherein the other of the first PM circuit or the second PM circuit performs a third transition of a mode of power consumption based on the third message, and a fourth message from the other of the first PM circuit or the second PM circuit to the one of the first PM circuit or the second PM circuit, the fourth message comprising the confirmation.

In one or more one hundred and seventh embodiments, further to any of the one hundred and third through one hundred and sixth embodiments, the first message confirms a performance of the first transition by the one of the first PM circuit or the second PM circuit.

In one or more one hundred and eighth embodiments, further to the one hundred and seventh embodiment, the agent is the voltage regulator, and wherein the second transition is based on the first transition.

In one or more one hundred and ninth embodiments, further to any of the one hundred and third through one hundred and eighth embodiments, one of the first IC chip or the second IC chip comprises the voltage regulator.

In one or more one hundred and tenth embodiments, a method comprises delivering power via a rail from a voltage regulator to respective circuits of a first IC chip and a second IC chip, wherein a first power management (PM) circuit of the first IC chip is communicatively coupled to a second PM circuit of the second IC chip, sending, from the first PM circuit to the second PM circuit, a first message indicating a first transition between modes of power consumption by the first IC chip, and sending a second message, based on the first message, from the second PM circuit to an agent which is one of the voltage regulator or a third PM circuit of a third IC chip, wherein the second message requests a second transition of a mode of power consumption or power delivery by the agent, wherein one of the first transition or the second transition is based on the other of the first transition or the second transition.

In one or more one hundred and eleventh embodiments, further to the one hundred and tenth embodiment, the first message requests a confirmation that the first PM circuit is approved to perform the first transition.

In one or more one hundred and twelfth embodiments, further to the one hundred and eleventh embodiment, the agent is the voltage regulator, and wherein the communications further comprise a third message from the voltage regulator to the second PM circuit, the third message to confirm a performance of the second transition, and a fourth message from the second PM circuit to the first PM circuit, the fourth message comprising the confirmation.

In one or more one hundred and thirteenth embodiments, further to the one hundred and twelfth embodiment, the agent is the third PM circuit, wherein the second message requests a performance of the second transition by the third PM circuit, and wherein the communications further comprise a third message from the third PM circuit to the second PM circuit, the third message to confirm a performance of the second transition, and wherein, based on the third message, the second PM circuit performs a third transition of a mode of power consumption by the second IC chip, and a fourth message from the second PM circuit to the first PM circuit, the fourth message comprising the confirmation.

In one or more one hundred and fourteenth embodiments, further to any of the one hundred and tenth through one hundred and thirteenth embodiments, the first message confirms a performance of the first transition by the first PM circuit.

In one or more one hundred and fifteenth embodiments, further to the one hundred and fourteenth embodiment, the agent is the voltage regulator, and wherein the second transition is based on the first transition.

In one or more one hundred and sixteenth embodiments, further to any of the one hundred and tenth through one hundred and fifteenth embodiments, one of the first IC chip or the second IC chip comprises the voltage regulator.

In one or more one hundred and seventeenth embodiments, a device comprises a programmable thermal sensor to be thermally coupled to a processor, and circuitry coupled to the programmable thermal sensor, the circuitry comprising a first circuit to receive reference information which indicates a correspondence of thermal conditions each with a different respective mode of a plurality of modes of a power delivery circuit, wherein the plurality of modes are each to deliver power to the processor during a power state of the processor, a second circuit coupled to set a trigger condition of the programmable thermal sensor based on the reference information. While the processor is in the power state, the programmable thermal sensor is to send a signal to the circuitry in response to an indication that the trigger condition is satisfied, and wherein, in response to the signal and based on the reference information, the circuitry is further to control a transition of the power delivery circuit between two of the plurality of modes, and wherein the power state is to be maintained after the transition.

In one or more one hundred and eighteenth embodiments, further to the one hundred and seventeenth embodiment, the device further comprises the processor.

In one or more one hundred and nineteenth embodiments, further to the one hundred and eighteenth embodiment, the device comprises an integrated circuit chip which comprises the processor and the circuitry.

In one or more one hundred and twentieth embodiments, further to any of the one hundred and seventeenth through one hundred and nineteenth embodiments, the first circuit to receive the reference information comprises the first circuit to receive first information, from the processor, which indicates a correspondence of power delivery requirements each with a different respective one of the thermal conditions, and second information which indicates respective performance characteristics of each of the plurality of modes.

In one or more one hundred and twenty-first embodiments, further to any of the one hundred and seventeenth through one hundred and twentieth embodiments, the first circuit to receive the reference information comprises the first circuit to receive a value indicating an updated performance characteristic of one of the processor or the power delivery circuit.

In one or more one hundred and twenty-second embodiments, further to any of the one hundred and seventeenth through one hundred and twenty-first embodiments, the device further comprises the power delivery circuit.

In one or more one hundred and twenty-third embodiments, further to any of the one hundred and seventeenth through one hundred and twenty-second embodiments, wherein the power state disables software execution with the processor.

In one or more one hundred and twenty-fourth embodiments, a device comprises a thermal sensor to be thermally coupled to a processor, a manager circuit coupled to the thermal sensor, the manager circuit to be coupled to the processor and to a power delivery circuit, the manager circuit further to set a trigger condition of the thermal sensor based on reference information which identifies multiple electrical current requirements of the processor as corresponding each to a different respective thermal condition, receive a signal from the thermal sensor during a power state of the processor, wherein the signal indicates that a thermal condition of the processor satisfies the trigger condition, and transition the power delivery circuit, in response to the signal, to a mode of power delivery to the processor, wherein the power state is to be maintained after the transition.

In one or more one hundred and twenty-fifth embodiments, further to the one hundred and twenty-fourth embodiment, the device further comprises the processor.

In one or more one hundred and twenty-sixth embodiments, further to the one hundred and twenty-fifth embodiment, the device comprises an integrated circuit chip which comprises the processor and the manager circuit.

In one or more one hundred and twenty-seventh embodiments, further to any of the one hundred and twenty-fourth through one hundred and twenty-sixth embodiments, the manager circuit is to receive the reference information, and wherein the reference information comprises first information, from the processor, which indicates a correspondence of power delivery requirements each with a different respective one of the thermal conditions, and second information which indicates respective performance characteristics of each of a plurality of modes of the power delivery circuit.

In one or more one hundred and twenty-eighth embodiments, further to the one hundred and twenty-seventh embodiment, the manager circuit to receive the reference information comprises the manager circuit to receive a value indicating an updated performance characteristic of one of the processor or the power delivery circuit.

In one or more one hundred and twenty-ninth embodiments, further to any of the one hundred and twenty-fourth through one hundred and twenty-eighth embodiments, the device further comprises the power delivery circuit.

In one or more one hundred and thirtieth embodiments, further to any of the one hundred and twenty-fourth through one hundred and twenty-ninth embodiments, the power state disables software execution with the processor.

In one or more one hundred and thirty-first embodiments, a system comprises a processor, a power delivery circuit to deliver power to the processor, a thermal sensor thermally coupled to a processor, a manager circuit coupled to the thermal sensor and to the power delivery circuit, the manager circuit to set a trigger condition of the thermal sensor based on reference information which identifies multiple electrical current requirements of the processor as corresponding each to a different respective thermal condition, receive a signal from the thermal sensor during a power state of the processor, wherein the signal indicates that a thermal condition of the processor satisfies the trigger condition, and transition the power delivery circuit, in response to the signal, to a mode of power delivery to the processor, wherein the power state is to be maintained after the transition. The system further comprises a display device coupled to the processor, the display device to display an image based on a signal communicated with the processor.

In one or more one hundred and thirty-second embodiments, further to the one hundred and thirty-first embodiment, an integrated circuit chip comprises the processor and the manager circuit.

In one or more one hundred and thirty-third embodiments, further to the one hundred and thirty-first embodiment or the one hundred and thirty-second embodiment, the manager circuit is to receive the reference information, and wherein the reference information comprises first information, from the processor, which indicates a correspondence of power delivery requirements each with a different respective one of the thermal conditions, and second information which indicates respective performance characteristics of each of a plurality of modes of the power delivery circuit.

In one or more one hundred and thirty-fourth embodiments, further to the one hundred and thirty-third embodiment, the manager circuit to receive the reference information comprises the manager circuit to receive a value indicating an updated performance characteristic of one of the processor or the power delivery circuit.

In one or more one hundred and thirty-fifth embodiments, further to any of the one hundred and thirty-first through one hundred and thirty-fourth embodiments, system further comprises the power delivery circuit.

In one or more one hundred and thirty-sixth embodiments, further to any of the one hundred and thirty-first through one hundred and thirty-fifth embodiments, the power state disables software execution with the processor.

In one or more one hundred and thirty-seventh embodiments, a method comprises receiving, at circuitry which is coupled to a processor, reference information which indicates a correspondence of thermal conditions each with a different respective mode of a plurality of modes of a power delivery circuit, wherein the plurality of modes are each to deliver power to the processor during a power state of the processor, based on the reference information, setting a trigger condition of a programmable thermal sensor which is thermally coupled to the processor, after the trigger condition is set, monitoring the processor with the programmable thermal sensor, sending a signal from the programmable thermal sensor to the circuitry in response to an indication that the trigger condition is satisfied, and with the circuitry, controlling a transition of the power delivery circuit between two of the plurality of modes, wherein the power state is maintained after the transition.

In one or more one hundred and thirty-eighth embodiments, further to the one hundred and thirty-seventh embodiment, an integrated circuit chip comprises the processor and the circuitry.

In one or more one hundred and thirty-ninth embodiments, further to the one hundred and thirty-seventh embodiment or the one hundred and thirty-eighth embodiment, receiving the reference information comprises the circuitry receiving first information, from the processor, which indicates a correspondence of power delivery requirements each with a different respective one of the thermal conditions, and second information which indicates respective performance characteristics of each of the plurality of modes.

In one or more one hundred and fortieth embodiments, further to any of the one hundred and thirty-seventh through one hundred and thirty-ninth embodiments, receiving the reference information comprises the circuitry receiving a value indicating an updated performance characteristic of one of the processor or the power delivery circuit.

In one or more one hundred and forty-first embodiments, further to any of the one hundred and thirty-seventh through one hundred and fortieth embodiments, the power state disables software execution with the processor.

In one or more one hundred and forty-second embodiments, a processor comprises a first memory, a hardware interface to couple the processor to a second memory, first circuitry to receive an indication, while the processor is coupled to the second memory, that a transition of the processor to a power state is to be performed, and identify, based on the indication, a predicted length of time that the processor is to be in the power state. The processor further comprises second circuitry coupled to the first circuitry, the second circuitry to perform a calculation, based on the predicted length of time, to detect a relative benefit of a storage of a state of the processor to one of the first memory or the second memory over a storage of the state of the processor to the other of the first memory or the second memory. The processor further comprises third circuitry, coupled to the second circuitry and the hardware interface, which is to store the state of the processor, based on the calculation, to the one of the first memory or the second memory.

In one or more one hundred and forty-third embodiments, further to the one hundred and forty-second embodiment, the second circuitry is to perform the calculation further based on one or more of a value T1 which is to indicate a length of time required to write a reference amount of data to the first memory, a value P1 which is to indicate an amount of power required to retain the reference amount of data in the first memory, a value T2 which is to indicate a length of time required to write the reference amount of data to the second memory, a value E2 which is to indicate an amount of energy required to write the reference amount of data to the second memory and to read the reference amount of data from the second memory, and a value Pi which is to indicate an amount of power consumed by the processor during a reference period of time.

In one or more one hundred and forty-fourth embodiments, further to the one hundred and forty-third embodiment, the second circuitry is to perform the calculation based on a ratio of a first value to a second value, wherein the first value is based on the value Pi, and wherein the second value is based on the value P1.

In one or more one hundred and forty-fifth embodiments, further to the one hundred and forty-third embodiment, the first value is further based on a difference between the value T2 and the value T1.

In one or more one hundred and forty-sixth embodiments, further to the one hundred and forty-third embodiment, the second circuitry is to perform the calculation to detect whether the predicted length of time is less than a length of time indicated by a ratio of a first value to the value P1, wherein the first value is based on a sum of the value E2 and a second value, wherein the second value is based on a product of the value Pi and a difference between the values T2 and T1.

In one or more one hundred and forty-seventh embodiments, further to the one hundred and forty-sixth embodiment, the third circuitry to store the state of the processor comprises the third circuitry to store the state to the first memory based on an indication by the calculation that the predicted length of time is less than the length of time indicated by a ratio.

In one or more one hundred and forty-eighth embodiments, further to any of the one hundred and forty-second through one hundred and forty-seventh embodiments, the processor further comprises fourth circuitry to receive information communicated to the processor prior to indication, the information to indicate, for each of the first memory and the second memory, respective resource requirements to operate the memory, wherein the second circuitry is to perform the calculation further based on the information.

In one or more one hundred and forty-ninth embodiments, further to the one hundred and forty-eighth embodiment, the information comprises one or more resource requirement updates.

In one or more one hundred and fiftieth embodiments, further to any of the one hundred and forty-second through one hundred and forty-ninth embodiments, the first memory comprises a static random-access memory, and wherein the second memory is to comprise a dynamic random-access memory.

In one or more one hundred and fifty-first embodiments, one or more non-transitory computer-readable storage media having stored thereon instructions which, when executed by one or more processing units, cause the one or more processing units to perform a method comprising receiving an indication that a transition of the processor to a power state is to be performed, wherein the processor comprises a first memory, and wherein a second memory is coupled to the processor, identifying a predicted length of time that the processor is to be in the power state, based on the indication and the predicted length of time, performing a calculation to detect a relative benefit of storing a state of the processor to one of the first memory or the second memory over storing the state of the processor to the other of the first memory or the second memory, and based on the calculation, storing the state of the processor to the one of the first memory or the second memory.

In one or more one hundred and fifty-second embodiments, further to the one hundred and fifty-first embodiment, performing the calculation is further based on one or more of a value T1 indicating a length of time required to write a reference amount of data to the first memory, a value P1 indicating an amount of power required to retain the reference amount of data in the first memory, a value T2 indicating a length of time required to write the reference amount of data to the second memory, a value E2 indicating an amount of energy required to write the reference amount of data to the second memory and to read the reference amount of data from the second memory, and a value Pi indicating an amount of power consumed by the processor during a reference period of time.

In one or more one hundred and fifty-third embodiments, further to the one hundred and fifty-second embodiment, the calculation is performed based on a ratio of a first value to a second value, wherein the first value is based on the value Pi, and wherein the second value is based on the value P1.

In one or more one hundred and fifty-fourth embodiments, further to the one hundred and fifty-second embodiment, the first value is further based on a difference between the value T2 and the value T1.

In one or more one hundred and fifty-fifth embodiments, further to the one hundred and fifty-second embodiment, the calculation is performed to detect whether the predicted length of time is less than a length of time indicated by a ratio of a first value to the value P1, wherein the first value is based on a sum of the value E2 and a second value, wherein the second value is based on a product of the value Pi and a difference between the values T2 and T1.

In one or more one hundred and fifty-sixth embodiments, further to the one hundred and fifty-fifth embodiment, storing the state of the processor comprises storing the state to the first memory based on an indication by the calculation that the predicted length of time is less than the length of time indicated by a ratio.

In one or more one hundred and fifty-seventh embodiments, further to any of the one hundred and fifty-first through one hundred and fifty-sixth embodiments, the method further comprises receiving information communicated to the processor prior to indication, the information indicating, for each of the first memory and the second memory, respective resource requirements to operate the memory, wherein the calculation is performed further based on the information.

In one or more one hundred and fifty-eighth embodiments, further to the one hundred and fifty-seventh embodiment, the information comprises one or more resource requirement updates.

In one or more one hundred and fifty-ninth embodiments, further to any of the one hundred and fifty-first through one hundred and fifty-eighth embodiments, the first memory comprises a static random-access memory, and wherein the second memory comprises a dynamic random-access memory.

In one or more one hundred and sixtieth embodiments, a system comprises a processor comprising a first memory, a hardware interface to couple the processor to a second memory, and first circuitry to receive an indication, while the processor is coupled to the second memory, that a transition of the processor to a power state is to be performed, and identify, based on the indication, a predicted length of time that the processor is to be in the power state. The processor further comprises second circuitry coupled to the first circuitry, the second circuitry to perform a calculation, based on the predicted length of time, to detect a relative benefit of a storage of a state of the processor to one of the first memory or the second memory over a storage of the state of the processor to the other of the first memory or the second memory. The processor further comprises third circuitry, coupled to the second circuitry and the hardware interface, which is to store the state of the processor, based on the calculation, to the one of the first memory or the second memory. The system further comprises a display device coupled to the processor, the display device to display an image based on a signal communicated with the processor.

In one or more one hundred and sixty-first embodiments, further to the one hundred and sixtieth embodiment, the second circuitry is to perform the calculation further based on one or more of a value T1 which is to indicate a length of time required to write a reference amount of data to the first memory, a value P1 which is to indicate an amount of power required to retain the reference amount of data in the first memory, a value T2 which is to indicate a length of time required to write the reference amount of data to the second memory, a value E2 which is to indicate an amount of energy required to write the reference amount of data to the second memory and to read the reference amount of data from the second memory, and a value Pi which is to indicate an amount of power consumed by the processor during a reference period of time.

In one or more one hundred and sixty-second embodiments, further to the one hundred and sixty-first embodiment, the second circuitry is to perform the calculation based on a ratio of a first value to a second value, wherein the first value is based on the value Pi, and wherein the second value is based on the value P1.

In one or more one hundred and sixty-third embodiments, further to the one hundred and sixty-first embodiment, the first value is further based on a difference between the value T2 and the value T1.

In one or more one hundred and sixty-fourth embodiments, further to the one hundred and sixty-first embodiment, the second circuitry is to perform the calculation to detect whether the predicted length of time is less than a length of time indicated by a ratio of a first value to the value P1, wherein the first value is based on a sum of the value E2 and a second value, wherein the second value is based on a product of the value Pi and a difference between the values T2 and T1.

In one or more one hundred and sixty-fifth embodiments, further to the one hundred and sixty-fourth embodiment, the third circuitry to store the state of the processor comprises the third circuitry to store the state to the first memory based on an indication by the calculation that the predicted length of time is less than the length of time indicated by a ratio.

In one or more one hundred and sixty-sixth embodiments, further to any of the one hundred and sixtieth through one hundred and sixty-fifth embodiments, the processor further comprises fourth circuitry to receive information communicated to the processor prior to indication, the information to indicate, for each of the first memory and the second memory, respective resource requirements to operate the memory, wherein the second circuitry is to perform the calculation further based on the information.

In one or more one hundred and sixty-seventh embodiments, further to the one hundred and sixty-sixth embodiment, the information comprises one or more resource requirement updates.

In one or more one hundred and sixty-eighth embodiments, further to any of the one hundred and sixtieth through one hundred and sixty-seventh embodiments, the first memory comprises a static random-access memory, and wherein the second memory is to comprise a dynamic random-access memory.

In one or more one hundred and sixty-ninth embodiments, a method at a processor comprises receiving an indication that a transition of the processor to a power state is to be performed, wherein the processor comprises a first memory, and wherein a second memory is coupled to the processor, identifying a predicted length of time that the processor is to be in the power state, based on the indication and the predicted length of time, performing a calculation to detect a relative benefit of storing a state of the processor to one of the first memory or the second memory over storing the state of the processor to the other of the first memory or the second memory, and based on the calculation, storing the state of the processor to the one of the first memory or the second memory.

In one or more one hundred and seventieth embodiments, further to the one hundred and sixty-ninth embodiment, performing the calculation is further based on one or more of a value T1 indicating a length of time required to write a reference amount of data to the first memory, a value P1 indicating an amount of power required to retain the reference amount of data in the first memory, a value T2 indicating a length of time required to write the reference amount of data to the second memory, a value E2 indicating an amount of energy required to write the reference amount of data to the second memory and to read the reference amount of data from the second memory, and a value Pi indicating an amount of power consumed by the processor during a reference period of time.

In one or more one hundred and seventy-first embodiments, further to the one hundred and seventieth embodiment, the calculation is performed based on a ratio of a first value to a second value, wherein the first value is based on the value Pi, and wherein the second value is based on the value P1.

In one or more one hundred and seventy-second embodiments, further to the one hundred and seventieth embodiment, the first value is further based on a difference between the value T2 and the value T1.

In one or more one hundred and seventy-third embodiments, further to the one hundred and seventieth embodiment, the calculation is performed to detect whether the predicted length of time is less than a length of time indicated by a ratio of a first value to the value P1, wherein the first value is based on a sum of the value E2 and a second value, wherein the second value is based on a product of the value Pi and a difference between the values T2 and T1.

In one or more one hundred and seventy-fourth embodiments, further to the one hundred and seventy-third embodiment, storing the state of the processor comprises storing the state to the first memory based on an indication by the calculation that the predicted length of time is less than the length of time indicated by a ratio.

In one or more one hundred and seventy-fifth embodiments, further to any of the one hundred and sixty-ninth through one hundred and seventy-fourth embodiments, the method further comprises receiving information communicated to the processor prior to indication, the information indicating, for each of the first memory and the second memory, respective resource requirements to operate the memory, wherein the calculation is performed further based on the information.

In one or more one hundred and seventy-sixth embodiments, further to the one hundred and seventy-fifth embodiment, the information comprises one or more resource requirement updates.

In one or more one hundred and seventy-seventh embodiments, further to any of the one hundred and sixty-ninth through one hundred and seventy-sixth embodiments, the first memory comprises a static random-access memory, and wherein the second memory comprises a dynamic random-access memory.

In one or more one hundred and seventy-eighth embodiments, a processor comprises first circuitry to couple the processor to multiple power gates, second circuitry to receive values which each indicate a different respective latency of a corresponding power gate of the multiple power gates, third circuitry to detect, after the plurality of values are received, that a power state transition of the processor is to be performed, and fourth circuitry, responsive to the third circuitry, to generate control signals each based on a different respective one or more of the values, the fourth circuitry to communicate the control signals each to a different respective load circuit of the processor, wherein, in response to the control signals, the load circuits initiate respective operations of the power state transition at different times.

In one or more one hundred and seventy-ninth embodiments, further to the one hundred and seventy-eighth embodiment, one of the values is to replace another value which indicates a previous latency of one of the multiple power gates.

In one or more one hundred and eightieth embodiments, further to the one hundred and seventy-eighth embodiment or the one hundred and seventy-ninth embodiment, the multiple power gates comprise first power gates and a second one or more power gates, wherein the fourth circuitry to generate the control signals comprises the fourth circuitry to determine a first duration of a first period of time based on each of first values which indicate respective first latencies of the first power gates.

In one or more one hundred and eighty-first embodiments, further to the one hundred and eightieth embodiment, the fourth circuitry to generate the control signals further comprises the fourth circuitry to determine a second duration of a second period of time based on a second one or more values which indicate a second one or more latencies of the second one or more power gates.

In one or more one hundred and eighty-second embodiments, further to the one hundred and eighty-first embodiment, of the multiple power gates, the second duration is determined based a latency of only one power gate.

In one or more one hundred and eighty-third embodiments, further to the one hundred and eightieth embodiment, the fourth circuitry to determine the first duration based on the first values comprises the fourth circuitry to perform a calculation with the first values based on a determination that the first plurality of power gates each belong to a first power gate type, wherein the second one or more power gates each belong to a respective power gate type other than the first power gate type.

In one or more one hundred and eighty-fourth embodiments, further to the one hundred and eightieth embodiment, the first duration is determined based on a maximum of the respective first latencies of the first power gates.

In one or more one hundred and eighty-fifth embodiments, further to the one hundred and eightieth embodiment, the second period of time expires after the first period of time, and wherein the second operation of the power state transition is based at least in part on the first operation.

In one or more one hundred and eighty-sixth embodiments, a processor comprises first circuitry to receive a signal while the processor is coupled to a first power gate and to a second power gate, wherein the signal indicates that the processor is to undergo a power state transition, and second circuitry to determine a first duration of a first period of time based on a first value which indicates a first latency of the first power gate, the second circuitry further to determine a second duration of a second period of time based on a second value which indicates a second latency of the second power gate. The processor further comprises third circuitry to detect, based on the signal, a first expiration of the first period of time, and a second expiration of the second period of time, wherein respective portions of the first period of time and the second period of time are concurrent with each other, and fourth circuitry to signal a first circuit of the processor, based on the first expiration, to perform a first operation of the power state transition with power provided via the first power gate, the fourth circuitry further to signal a second circuit of the processor, based on the second expiration, to perform a second operation of the power state transition with power provided via the second power gate.

In one or more one hundred and eighty-seventh embodiments, further to the one hundred and eighty-sixth embodiment, the second circuitry is to store data communicated to the processor by an external agent prior to the signal, wherein the data comprises the first value and the second value.

In one or more one hundred and eighty-eighth embodiments, further to the one hundred and eighty-seventh embodiment, one of the first value or the second value are to replace another value which indicates a previous latency of one of the first power gate or the second power gate.

In one or more one hundred and eighty-ninth embodiments, further to any of the one hundred and eighty-sixth through one hundred and eighty-eighth embodiments, the signal is to be received while the processor is coupled to a first plurality of power gates comprising the first power gate, wherein the second circuitry is to determine the first duration based on a first plurality of values which indicate first latencies each of a different respective one of the first plurality of power gates.

In one or more one hundred and ninetieth embodiments, further to the one hundred and eighty-ninth embodiment, the second circuitry to determine the first duration based on the first value includes the second circuitry to perform a calculation with the first plurality of values based on a determination that the first plurality of power gates each belong to a first power gate type, wherein the second power gate belongs to a second power gate type other than the first power gate type.

In one or more one hundred and ninety-first embodiments, further to the one hundred and eighty-ninth embodiment, the first duration is determined based on a maximum of the first latencies.

In one or more one hundred and ninety-second embodiments, further to the one hundred and ninety-first embodiment, the second duration is determined independent of any value which indicates a latency of a power gate other than the second power gate.

In one or more one hundred and ninety-third embodiments, further to the one hundred and eighty-ninth embodiment, the second period of time expires after the first period of time, and wherein the second operation of the power state transition is based at least in part on the first operation.

In one or more one hundred and ninety-fourth embodiments, a system comprises multiple power gates, and a processor coupled to the multiple power gates, the processor comprising first circuitry to receive values which each indicate a different respective latency of a corresponding power gate of the multiple power gates, second circuitry to detect, after the plurality of values are received, that a power state transition of the processor is to be performed, and third circuitry, responsive to the second circuitry, to generate control signals each based on a different respective one or more of the values, the third circuitry to communicate the control signals each to a different respective load circuit of the processor, wherein, in response to the control signals, the load circuits initiate respective operations of the power state transition at different times. The system further comprises a display device coupled to the processor, the display device to display an image based on a signal communicated with the processor.

In one or more one hundred and ninety-fifth embodiments, further to the one hundred and ninety-fourth embodiment, one of the values is to replace another value which indicates a previous latency of one of the multiple power gates.

In one or more one hundred and ninety-sixth embodiments, further to the one hundred and ninety-fourth embodiment or the one hundred and ninety-fifth embodiment, the multiple power gates comprise first power gates and a second one or more power gates, wherein the third circuitry to generate the control signals comprises the third circuitry to determine a first duration of a first period of time based on each of first values which indicate respective first latencies of the first power gates.

In one or more one hundred and ninety-seventh embodiments, further to the one hundred and ninety-sixth embodiment, the third circuitry to generate the control signals further comprises the third circuitry to determine a second duration of a second period of time based on a second one or more values which indicate a second one or more latencies of the second one or more power gates.

In one or more one hundred and ninety-eighth embodiments, further to the one hundred and ninety-seventh embodiment, of the multiple power gates, the second duration is determined based a latency of only one power gate.

In one or more one hundred and ninety-ninth embodiments, further to the one hundred and ninety-sixth embodiment, the third circuitry to determine the first duration based on the first values comprises the third circuitry to perform a calculation with the first values based on a determination that the first plurality of power gates each belong to a first power gate type, wherein the second one or more power gates each belong to a respective power gate type other than the first power gate type.

In one or more two hundredth embodiments, further to the one hundred and ninety-sixth embodiment, the first duration is determined based on a maximum of the respective first latencies of the first power gates.

In one or more two hundred and first embodiments, further to the one hundred and ninety-sixth embodiment, the second period of time expires after the first period of time, and wherein the second operation of the power state transition is based at least in part on the first operation.

In one or more two hundred and second embodiments, a method at a processor comprises receiving values which each indicate a different respective latency of a corresponding power gate of the multiple power gates which are coupled to the processor, after receiving the plurality of values, detecting that a power state transition of the processor is to be performed, based on the detecting, generating control signal each based on a different respective one or more of the values, and communicating the control signals each to a different respective load circuit of the processor, wherein, in response to the control signals, the load circuits initiate respective operations of the power state transition at different times.

In one or more two hundred and third embodiments, further to the two hundred and second embodiment, one of the values is to replace another value indicating a previous latency of one of the multiple power gates.

In one or more two hundred and fourth embodiments, further to the two hundred and second embodiment or the two hundred and third embodiment, the multiple power gates comprises first power gates and a second one or more power gates, wherein generating the control signals comprises determining a first duration of a first period of time based on each of first values which indicate respective first latencies of the first power gates.

In one or more two hundred and fifth embodiments, further to the two hundred and fourth embodiment, generating the control signals further comprises determining a second duration of a second period of time based on a second one or more values which indicate a second one or more latencies of the second one or more power gates.

In one or more two hundred and sixth embodiments, further to the two hundred and fifth embodiment, of the multiple power gates, the second duration is determined based a latency of only one power gate.

In one or more two hundred and seventh embodiments, further to the two hundred and fourth embodiment, determining the first duration based on the first values includes performing a calculation with the first values based on a determination that the first plurality of power gates each belong to a first power gate type, wherein the second one or more power gates each belong to a respective power gate type other than the first power gate type.

In one or more two hundred and eighth embodiments, further to the two hundred and fourth embodiment, the first duration is determined based on a maximum of the respective first latencies of the first power gates.

In one or more two hundred and ninth embodiments, further to the two hundred and fourth embodiment, the second period of time expires after the first period of time, and wherein the second operation of the power state transition is based at least in part on the first operation.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
   an interconnect fabric comprising one or more nodes;
   an end point device coupled to the interconnect fabric via an asynchronous device;
   a clock controller coupled to provide a clock signal to the one or more nodes, wherein, based on the clock signal, the one or more nodes are to communicate with the end point device via the asynchronous device while a first clock domain comprises the one or more nodes, and while a second clock domain comprises the end point device; and
   a power management (PM) controller to communicate a control signal to the clock controller while the clock signal is cycled at a first frequency, wherein the control signal indicates that the first clock domain is to be transitioned from the first frequency to a second frequency;
   wherein, in response to the control signal, the clock controller is to stall the clock signal throughout a period of time which is equal to or greater than a duration of three cycles of a lower one of the first frequency or the second frequency, and after the period of time, to cycle the clock signal at the second frequency.

2. The device of claim 1, wherein the end point device is to be able to communicate with the asynchronous device throughout the period of time.

3. The device of claim 1, wherein the period of time is equal to or less than a duration of five cycles of the lower one of the first frequency or the second frequency.

4. The device of claim 1, wherein the asynchronous device comprises an asynchronous buffered port.

5. The device of claim 1, the clock controller further comprising a register to store a value representing the period of time, wherein the clock signal is to stall the clock signal based on the value.

6. The device of claim 1, wherein the control signal is a first control signal to trigger a frequency of the first clock domain, and wherein the PM controller is further to communicate a second control signal to the clock controller prior to the first control signal, wherein the second control signal comprises an identifier of the second frequency.

7. The device of claim 1, wherein the interconnect fabric, the one or more nodes, the clock signal, and the control signal are, respectively, a first interconnect fabric, a first one or more nodes, a first clock signal, and a first control signal, the device further comprising:
   a second interconnect fabric comprising a second one or more nodes coupled to the first interconnect fabric, wherein the end point device is coupled to the first interconnect fabric via the second interconnect fabric;
   wherein the clock controller is further coupled to provide a second clock signal to the second one or more nodes, wherein, based on the second clock signal, the second one or more nodes are to communicate with the first one or more nodes while a third clock domain comprises the second one or more nodes;
   wherein the PM controller is further to communicate a second control signal to the clock controller while the second clock signal is cycled at a third frequency, wherein the second control signal indicates that the third clock domain is to be transitioned from the third frequency to a fourth frequency; and
   wherein, in response to the second control signal, the clock controller is to:
   stall the second clock signal throughout a second period of time while the first clock signal is to continue to cycle at one of the first frequency or the second frequency, wherein the second period of time is equal to or greater than a duration of three cycles of a lower one of the third frequency or the fourth frequency; and
   after the second period of time, cycle the second clock signal at the fourth frequency.

8. The device of claim 1, wherein the end point device comprises a processor.

9. A device comprising:
   a processor;
   a fabric comprising an asynchronous port and nodes coupled to provide switched communication, based on a clock signal, with the processor via the asynchronous port;
   a clock controller coupled the fabric, the clock controller to:
   provide the clock signal to the nodes;
   receive a control signal while a first clock domain comprises the nodes, and while a second clock domain comprises the processor; and
   transition the first clock domain from a first frequency to a second frequency based on the control signal, wherein the clock controller is to:
   stall the clock signal throughout a period of time which is equal to or greater than a duration of three cycles of a lower one of the first frequency or the second frequency, and
   cycle the clock signal at the second frequency after the period of time.

10. The device of claim 9, wherein the period of time is equal to or less than a duration of five cycles of the lower one of the first frequency or the second frequency.

11. The device of claim 9, the clock controller further comprising a register to store a value representing the period of time, wherein the clock signal is to stall the clock signal based on the value.

12. The device of claim 9, wherein the control signal is a first control signal to trigger a frequency of the first clock domain, and wherein the clock controller is further to receive a second control signal prior to the first control signal, wherein the second control signal comprises an identifier of the second frequency.

13. The device of claim 9, wherein the fabric, the nodes, the clock signal, and the control signal are, respectively, a first fabric, first nodes, a first clock signal, and a first control signal, the device further comprising:

a second fabric comprising second nodes coupled to the first fabric, wherein the processor is coupled to the first fabric via the second fabric;

wherein the clock controller is further coupled to provide a second clock signal to the second nodes, wherein, based on the second clock signal, the second nodes are to communicate with the first nodes while a third clock domain comprises the second nodes;

wherein the clock controller is further to receive a second control signal while the second clock signal is cycled at a third frequency; and wherein, in response to the second control signal, the clock controller is to:
stall the second clock signal throughout a second period of time while the first clock signal is to continue to cycle at one of the first frequency or the second frequency, wherein the second period of time is equal to or greater than a duration of three cycles of a lower one of the third frequency or the fourth frequency; and
after the second period of time, cycle the second clock signal at the fourth frequency.

14. A system comprising:
one or more integrated circuit (IC) chips comprising:
an interconnect fabric comprising one or more nodes;
an end point device coupled to the interconnect fabric via an asynchronous device;
a clock controller coupled to provide a clock signal to the one or more nodes, wherein, based on the clock signal, the one or more nodes are to communicate with the end point device via the asynchronous device while a first clock domain comprises the one or more nodes, and while a second clock domain comprises the end point device; and
a power management (PM) controller to communicate a control signal to the clock controller while the clock signal is cycled at a first frequency, wherein the control signal indicates that the first clock domain is to be transitioned from the first frequency to a second frequency;
wherein, in response to the control signal, the clock controller is to stall the clock signal throughout a period of time which is equal to or greater than a duration of three cycles of a lower one of the first frequency or the second frequency, and after the period of time, to cycle the clock signal at the second frequency; and
a display device coupled to the one or more IC chips, the display device to display an image based on a signal communicated with the one or more IC chips.

15. The system of claim 14, wherein the end point device is to be able to communicate with the asynchronous device throughout the period of time.

16. The system of claim 14, wherein the period of time is equal to or less than a duration of five cycles of the lower one of the first frequency or the second frequency.

17. The system of claim 14, wherein the asynchronous device comprises an asynchronous buffered port.

18. The system of claim 14, the clock controller further comprising a register to store a value representing the period of time, wherein the clock signal is to stall the clock signal based on the value.

19. The system of claim 14, wherein the control signal is a first control signal to trigger a frequency of the first clock domain, and wherein the PM controller is further to communicate a second control signal to the clock controller prior to the first control signal, wherein the second control signal comprises an identifier of the second frequency.

20. The system of claim 14, wherein the interconnect fabric, the one or more nodes, the clock signal, and the control signal are, respectively, a first interconnect fabric, a first one or more nodes, a first clock signal, and a first control signal, the one or more IC chips further comprising:
a second interconnect fabric comprising a second one or more nodes coupled to the first interconnect fabric, wherein the end point device is coupled to the first interconnect fabric via the second interconnect fabric;
wherein the clock controller is further coupled to provide a second clock signal to the second one or more nodes, wherein, based on the second clock signal, the second one or more nodes are to communicate with the first one or more nodes while a third clock domain comprises the second one or more nodes;
wherein the PM controller is further to communicate a second control signal to the clock controller while the second clock signal is cycled at a third frequency, wherein the second control signal indicates that the third clock domain is to be transitioned from the third frequency to a fourth frequency; and
wherein, in response to the second control signal, the clock controller is to:
stall the second clock signal throughout a second period of time while the first clock signal is to continue to cycle at one of the first frequency or the second frequency, wherein the second period of time is equal to or greater than a duration of three cycles of a lower one of the third frequency or the fourth frequency; and
after the second period of time, cycle the second clock signal at the fourth frequency.

* * * * *